US010908274B2

(12) United States Patent
Li et al.

(10) Patent No.: US 10,908,274 B2
(45) Date of Patent: Feb. 2, 2021

(54) FRAMEWORK AND METHODS TO ACKNOWLEDGE THE RANGING CONFIGURATION FOR IEEE 802.15.4Z

(71) Applicant: Samsung Electronics Co., Ltd., Suwon-si (KR)

(72) Inventors: Zheda Li, Plano, TX (US); Aditya V. Padaki, Richardson, TX (US); Seongah Jeong, Seoul (KR); Mingyu Lee, Seongnam-si (KR); Boon Loong Ng, Plano, TX (US)

(73) Assignee: Samsung Electronics Co... Ltd., Suwon-si (KR)

( * ) Notice: Subject to any disclaimer, the term of this patent is extended or adjusted under 35 U.S.C. 154(b) by 0 days.

(21) Appl. No.: 16/737,675

(22) Filed: Jan. 8, 2020

(65) Prior Publication Data

US 2020/0225341 A1 Jul. 16, 2020

Related U.S. Application Data

(60) Provisional application No. 62/791,410, filed on Jan. 11, 2019, provisional application No. 62/798,276, (Continued)

(51) Int. Cl.
*G01S 13/76* (2006.01)
*H04W 72/04* (2009.01)
(Continued)

(52) U.S. Cl.
CPC .......... *G01S 13/765* (2013.01); *H04L 5/0055* (2013.01); *H04W 72/048* (2013.01); *H04W 72/0446* (2013.01); *H04W 84/18* (2013.01)

(58) Field of Classification Search
CPC ............ G01S 13/765; H04W 72/0446; H04W 72/048; H04W 84/18; H04L 5/0055
See application file for complete search history.

(56) References Cited

U.S. PATENT DOCUMENTS 10,021,554 B2  7/2018  Abraham et al.
2008/0108303 A1  5/2008  Okuda
(Continued)

FOREIGN PATENT DOCUMENTS

KR  10-2016-0088366 A  7/2016

OTHER PUBLICATIONS

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.
(Continued)

*Primary Examiner* — Julio R Perez

(57) ABSTRACT

A transmit apparatus and a method of the transmit apparatus in a wireless communication system supporting ranging capability are provided. The transmit apparatus and the method comprise: identifying whether a medium access control (MAC) common part sublayer (CPS) data request (MCPS-DATA.request) primitive received from a higher layer of the transmit apparatus includes a ranging configuration information element (IE) or a ranging IE; transmitting, to a receive apparatus, a ranging control message (RCM) in response to the MCPS-DATA.request primitive including the ranging configuration IE; transmitting, to the receive apparatus, a ranging initiation message (RIM) in response to the MCPS-DATA.request primitive including the ranging IE; receiving, from the receive apparatus, MAC data including a ranging message non-receipt information element (RMNR IE) that indicates a reception failure of the RIM; and identifying the RMNR IE via an MCPS-DATA.indication primitive.

20 Claims, 38 Drawing Sheets

Related U.S. Application Data filed on Jan. 29, 2019, provisional application No. 62/851,439, filed on May 22, 2019, provisional application No. 62/875,080, filed on Jul. 17, 2019.

(51) Int. Cl.
*H04L 5/00* (2006.01)
*H04W 84/18* (2009.01)

(56) References Cited

U.S. PATENT DOCUMENTS

| | | | |
|---|---|---|---|
| 2009/0296661 A1* | 12/2009 | Lee | H04W 64/00 370/335 |
| 2010/0061307 A1 | 3/2010 | Lim et al. | |
| 2011/0034195 A1* | 2/2011 | Lee | H04W 56/0005 455/509 |
| 2012/0014355 A1* | 1/2012 | Jung | H04W 36/0055 370/331 |
| 2012/0320834 A1 | 12/2012 | Branlund et al. | |
| 2013/0010761 A1 | 1/2013 | Fong et al. | |
| 2013/0272265 A1* | 10/2013 | Jung | H04W 36/00 370/331 |
| 2020/0137676 A1* | 4/2020 | Yoon | G01S 13/765 |
| 2020/0183000 A1* | 6/2020 | Li | G01S 13/878 |

OTHER PUBLICATIONS

"IEEE Standard for Low-Rate Wireless Networks", IEEE Computer Society, IEEE Std 802.15.4TM, Dec. 2015, 708 pages.

Notification of Transmittal of the International Search Report and the Written Opinion of the International Searching Authority, or the Declaration dated Apr. 22, 2020 in connection with International Patent Application No. PCT/KR2020/000516, 10 pages.

* cited by examiner

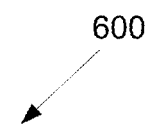
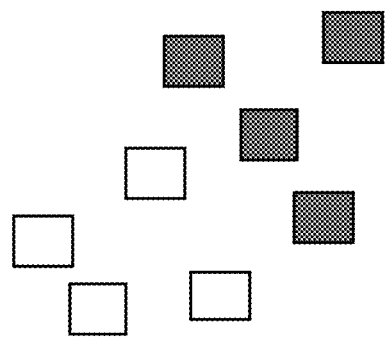
FIG. 6

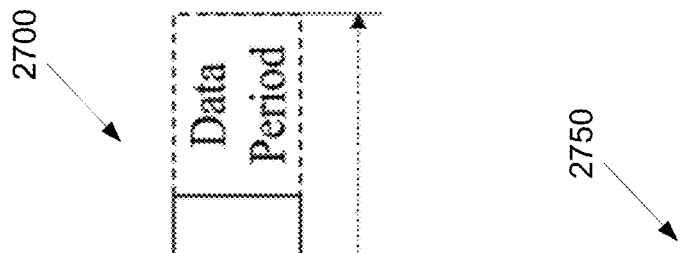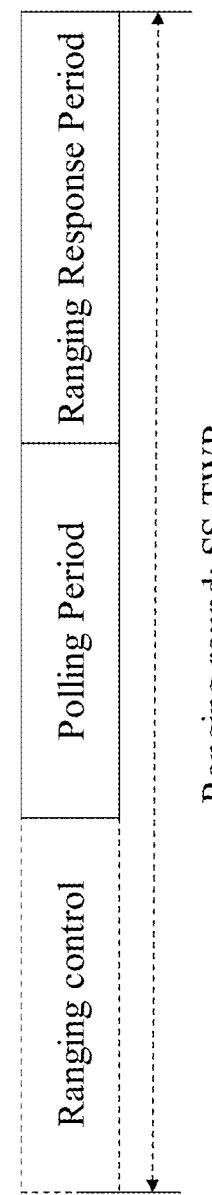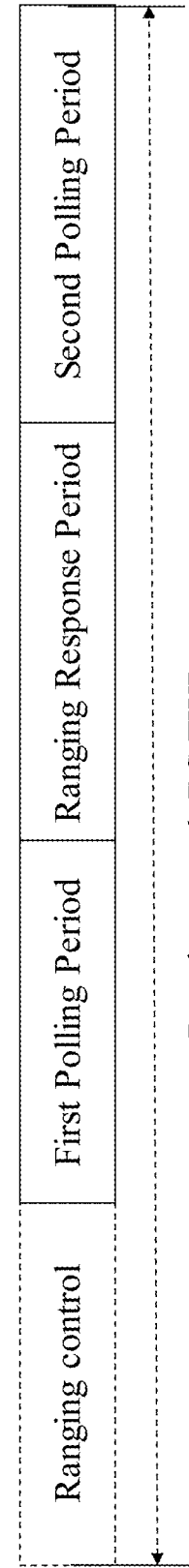
FIG. 27A
FIG. 27B

| Bits: 1 | 2 | 3 | Bits: 1 | 2 | 2 | 3 |
|---|---|---|---|---|---|---|
| Ranging FOM Extension | Ranging Confidence Interval Scaling Factor | Ranging Confidence Level | AOA FOM Extension | AOA Confidence Interval Scaling Factor | AOA Confidence Interval | AOA Confidence Level |

| Octets: 1 | Variable |
|---|---|
| FOM Table Length | FOM Table |

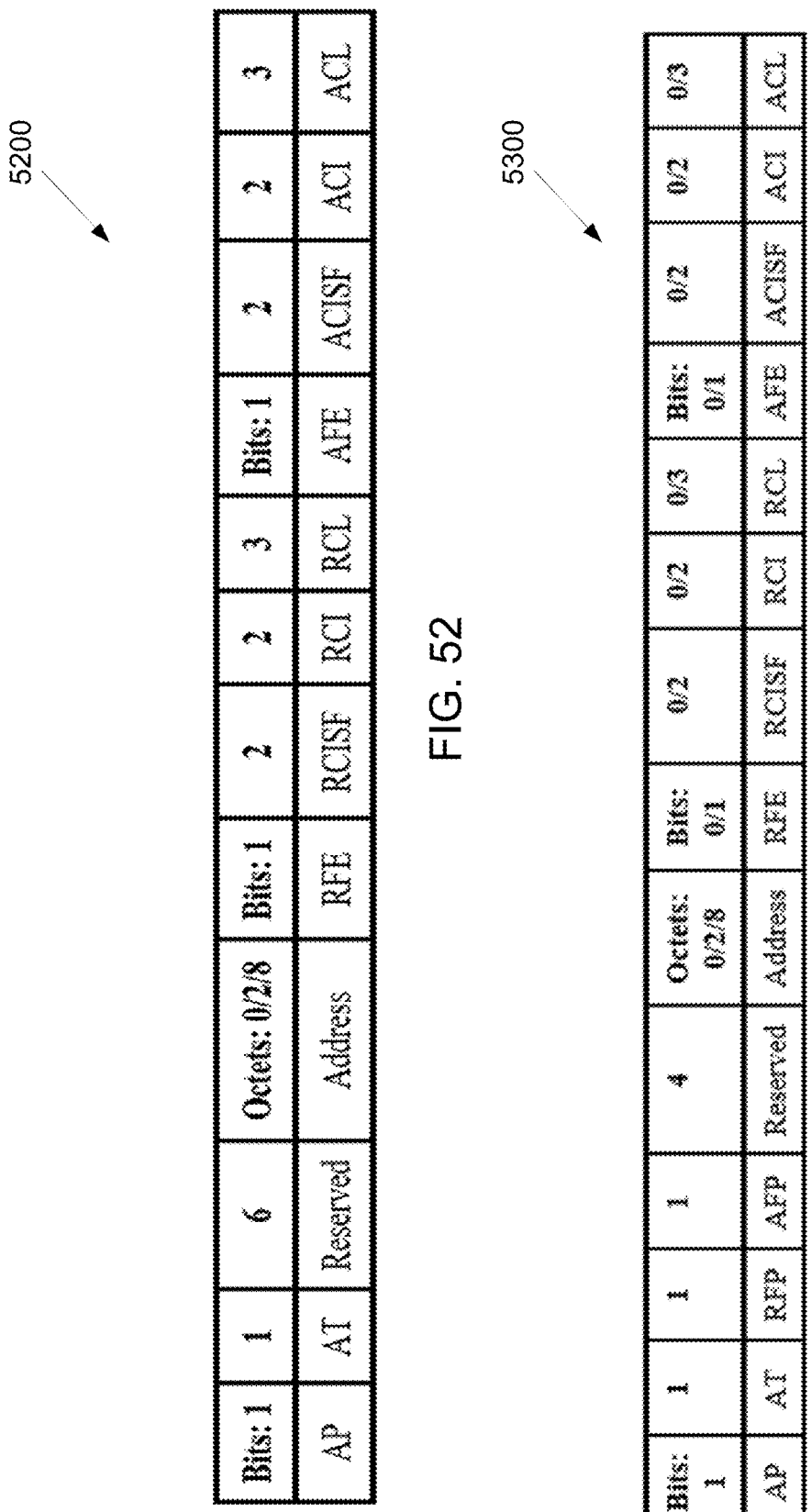

| Bits: 1 | 1 | 1 | 5 | Octets: 0/2/8 | Bits: 0/1 | 0/2 | 0/2 | 0/3 |
|---|---|---|---|---|---|---|---|---|
| AP | AT | RFP | Reserved | Address | RFE | RCISF | RCI | RCL |

FIG. 57

| Bits: 1 | 2 | 2 | 3 |
|---|---|---|---|
| AOA FOM Extension | AOA Confidence Interval Scaling Factor | AOA Confidence Interval | AOA Confidence Level |

FIG. 58

| Octets: 1 | Variable |
|---|---|
| AFOM Table Length | AFOM Table |

FIG. 59

| Bits: 1 | 1 | 6 | Octets: 0/2/8 | Bits: 1 | 2 | 2 | 3 |
|---|---|---|---|---|---|---|---|
| AP | AT | Reserved | Address | AFE | ACISF | ACI | ACL |

FIG. 60

| Bits: 1 | 1 | 1 | 5 | Octets: 0/2/8 | Bits: 0/1 | 0/2 | 0/2 | 0/3 |
|---|---|---|---|---|---|---|---|---|
| AP | AT | AFP | Reserved | Address | AFE | ACISF | ACI | ACL |

FRAMEWORK AND METHODS TO ACKNOWLEDGE THE RANGING CONFIGURATION FOR IEEE 802.15.4Z

CROSS-REFERENCE TO RELATED APPLICATIONS AND CLAIM OF PRIORITY

The present application claims priority to:
U.S. Provisional Patent Application Ser. No. 62/791,410 filed on Jan. 11, 2019;
U.S. Provisional Patent Application Ser. No. 62/798,276 filed on Jan. 29, 2019;
U.S. Provisional Patent Application Ser. No. 62/851,439 filed on May 22, 2019; and
U.S. Provisional Patent Application Ser. No. 62/875,080 filed on Jul. 17, 2019.
The content of the above-identified patent documents is incorporated herein by reference.

TECHNICAL FIELD

The present disclosure relates generally to a framework and methods in a wireless communication system. In particular, acknowledgment of ranging configuration in a wireless communication network is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide acknowledgement of ranging configuration in a wireless communication network.

In one embodiment, a transmit apparatus in a wireless communication system supporting ranging capability is provided. The transmit apparatus comprises a processor configured to identify whether a medium access control (MAC) common part sublayer (CPS) data request (MCPS-DATA.request) primitive received from a higher layer of the transmit apparatus includes a ranging configuration information element (IE) or a ranging IE. The transmit apparatus further comprises a transceiver operably connected to the processor. The transceiver is configured to: transmit, to a receive apparatus, a ranging control message (RCM) in response to the MCPS-DATA.request primitive including the ranging configuration IE; transmit, to the receive apparatus, a ranging initiation message (RIM) in response to the MCPS-DATA.request primitive including the ranging IE; and receive, from the receive apparatus, MAC data including a ranging message non-receipt information element (RIVINR IE) that indicates a reception failure of the RIM. The processor is configured to identify the RMNR IE via an MCPS-DATA.indication primitive.

In another embodiment, a receive apparatus in a wireless communication system supporting ranging capability is provided. The receive apparatus comprises a transceiver configured to: receive, from a transmit apparatus, a ranging control message (RCM), wherein the RCM is transmitted, by the transmit apparatus, in response to a medium access control (MAC) common part sublayer (CPS) data request (MCPS-DATA.request) primitive including a ranging configuration information element (IE); and receive, from the transmit apparatus, a ranging initiation message (RIM), wherein the RIM is transmitted, by the transmit apparatus, in response to the MCPS-DATA.request primitive including the ranging IE. The receive apparatus is further comprises a processor operably connected to the transceiver. The processor is configured to identify the RCM or the RIM via an MCPS-DATA.indication primitive. The transceiver is further configured to transmit, to the transmit apparatus, MAC data including the RIVINR IE that indicates a reception failure of the RIM.

In yet another embodiment, a method of a transmit apparatus in a wireless communication system supporting ranging capability is provided. The method comprises: identifying whether a medium access control (MAC) common part sublayer (CPS) data request (MCPS-DATA.request) primitive received from a higher layer of the transmit apparatus includes a ranging configuration information element (IE) or a ranging IE; transmitting, to a receive apparatus, a ranging control message (RCM) in response to the MCPS-DATA.request primitive including the ranging configuration IE; transmitting, to the receive apparatus, a ranging initiation message (RIM) in response to the MCPS-DATA.request primitive including the ranging IE; receiving, from the receive apparatus, MAC data including a ranging message non-receipt information element (RIVINR IE) that indicates a reception failure of the RIM; and identifying the RMNR IE via an MCPS-DATA.indication primitive.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example many-to-many scenario according to embodiments of the present disclosure;

FIG. 27A illustrates an example general ranging round structure according to embodiments of the present disclosure;

FIG. 27B illustrates an example ranging round structure according to embodiments of the present disclosure;

FIG. 50 illustrates an example ranging and AOA figure of merit (RAFOM) IE content field format according to embodiments of the present disclosure;

FIG. 51 illustrates an example ranging and AOA figure of merit (RAFOM) IE content field format with FOM table according to embodiments of the present disclosure;

FIG. 52 illustrates an example row/element of FOM table according to embodiments of the present disclosure;

FIG. 53 illustrates another example row/element of FOM table according to embodiments of the present disclosure;

FIG. 57 illustrates another example row/element of RFOM table according to embodiments of the present disclosure;

FIG. 58 illustrates an example AOA figure of merit (AFOM) IE content field format according to embodiments of the present disclosure;

FIG. 59 illustrates an example AOA figure of merit (AFOM) IE content field format with AFOM table according to embodiments of the present disclosure;

FIG. 60 illustrates an example row/element of AFOM table according to embodiments of the present disclosure;

FIG. 61 illustrates another example row/element of AFOM table according to embodiments of the present disclosure;

DETAILED DESCRIPTION

Figure 1:
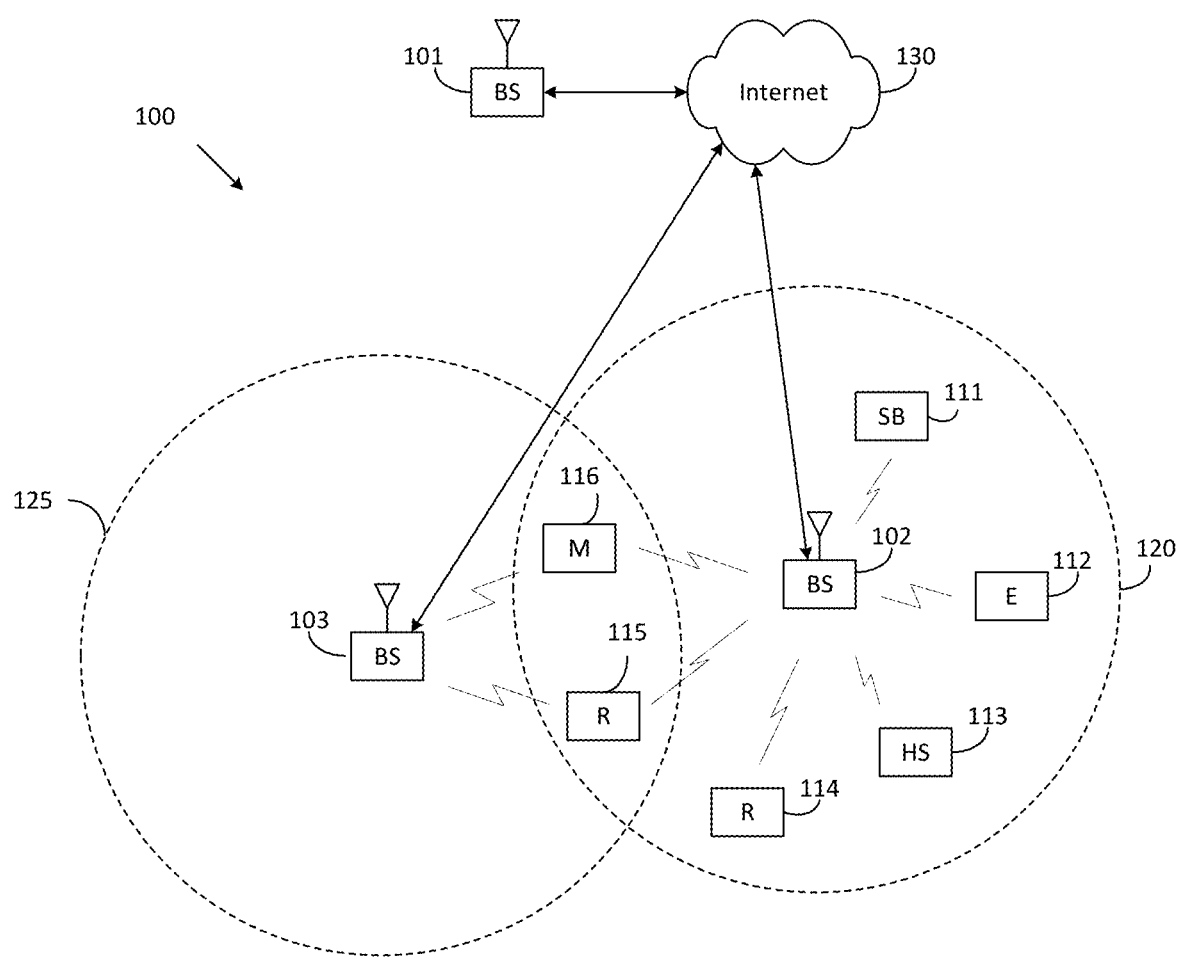
FIG. 1 illustrates an example wireless network according to embodiments of the present disclosure.
Figure 70:
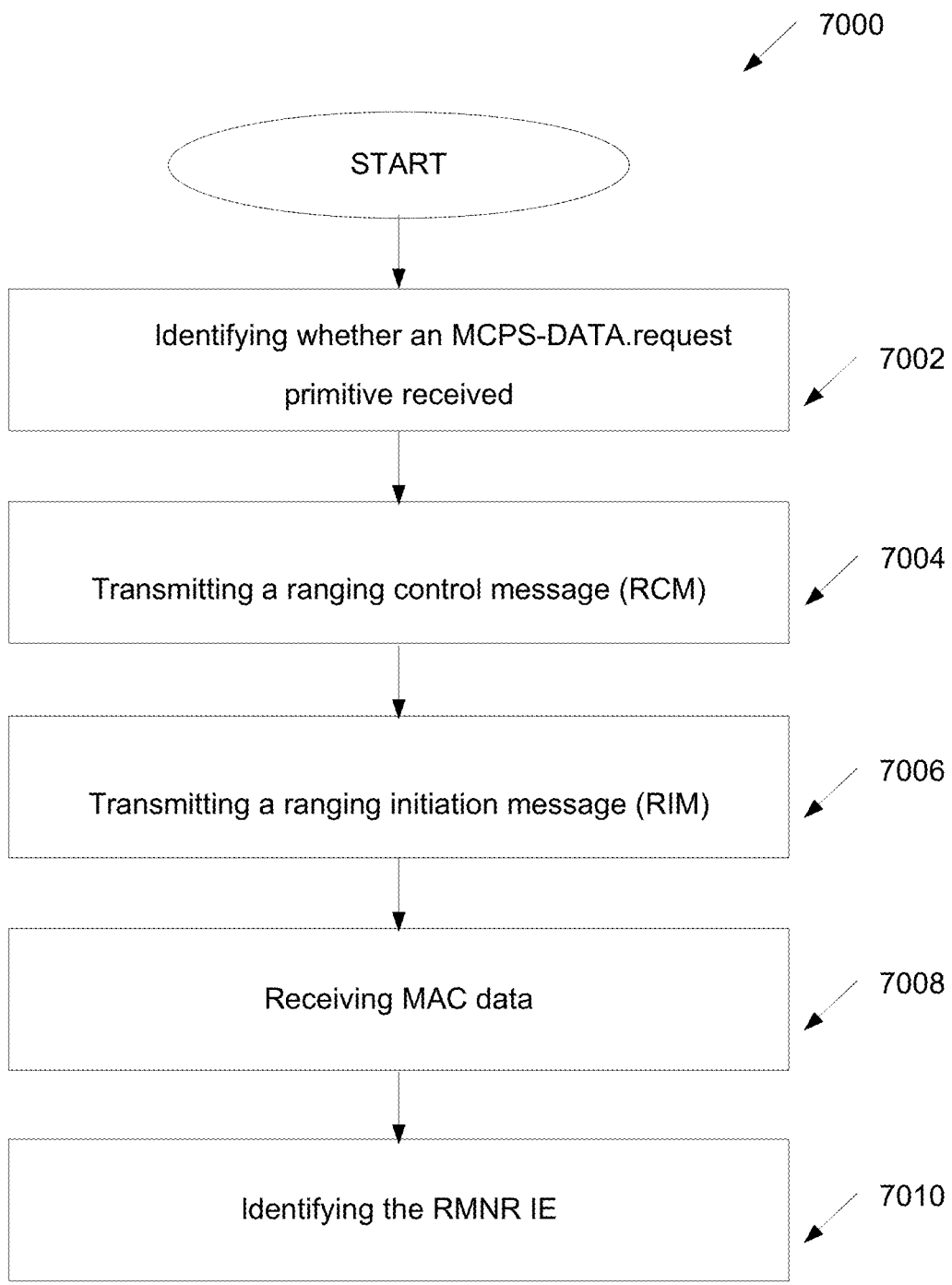
FIG. 70 illustrates a flowchart of a method for secure ranging operation according to embodiments of the present disclosure.

FIG. 1 through FIG. 70, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 2:
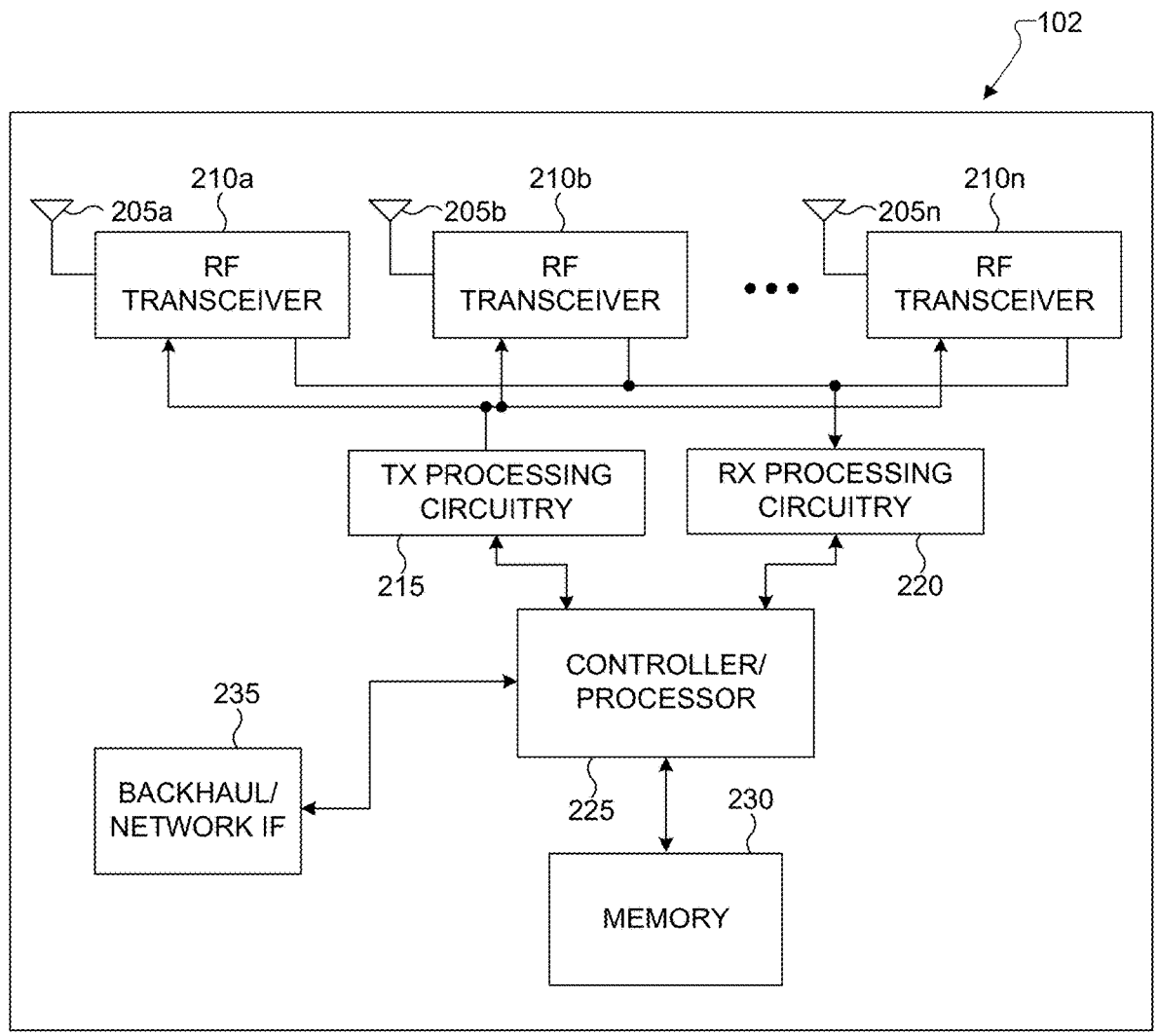
FIG. 2 illustrates an example gNB according to embodiments of the present disclosure.
Figure 3:
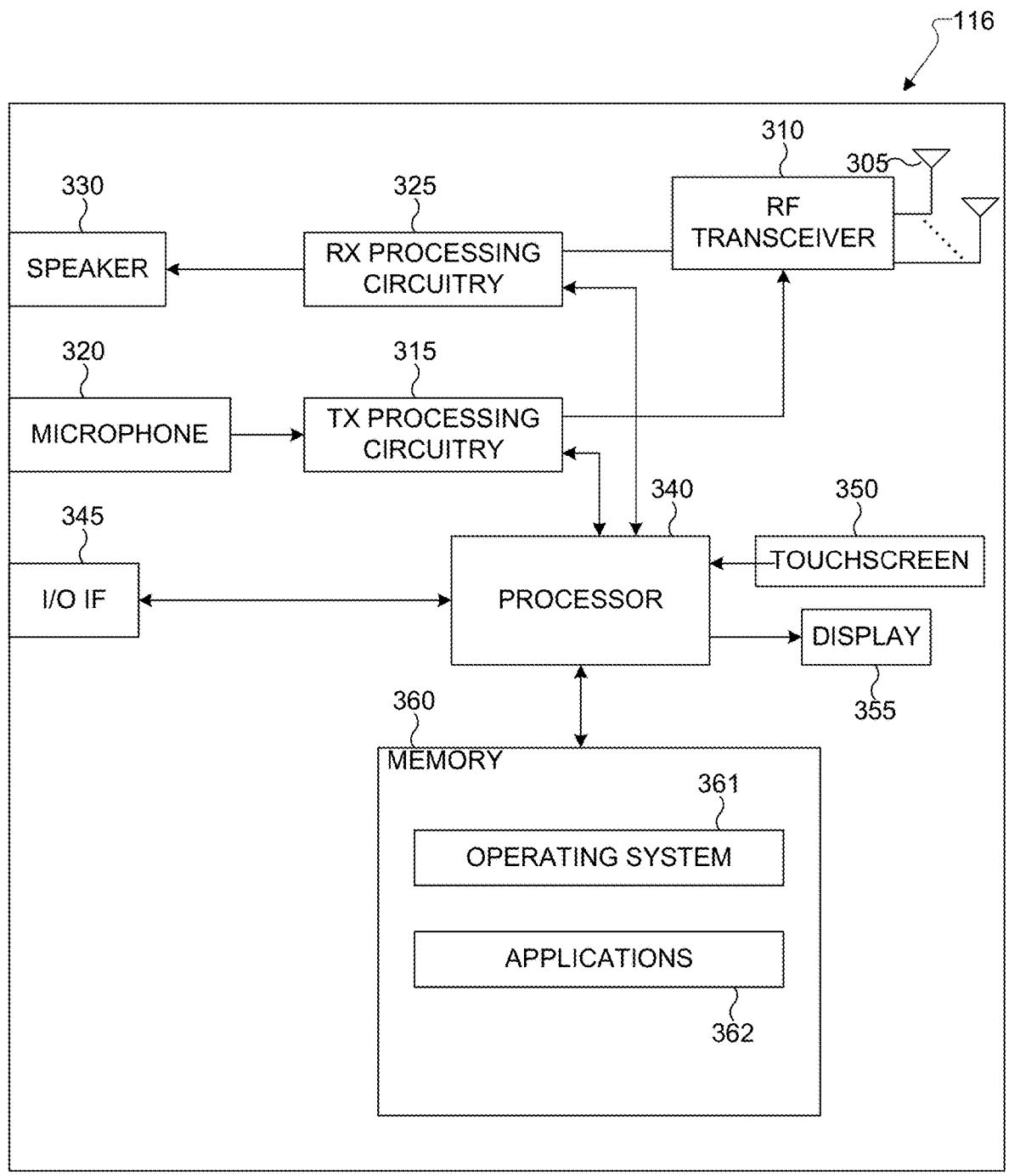
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for CSI reporting in an advanced wireless communication system. In certain embodiments, and one or more of the gNBs 101-103 includes circuitry, programming, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
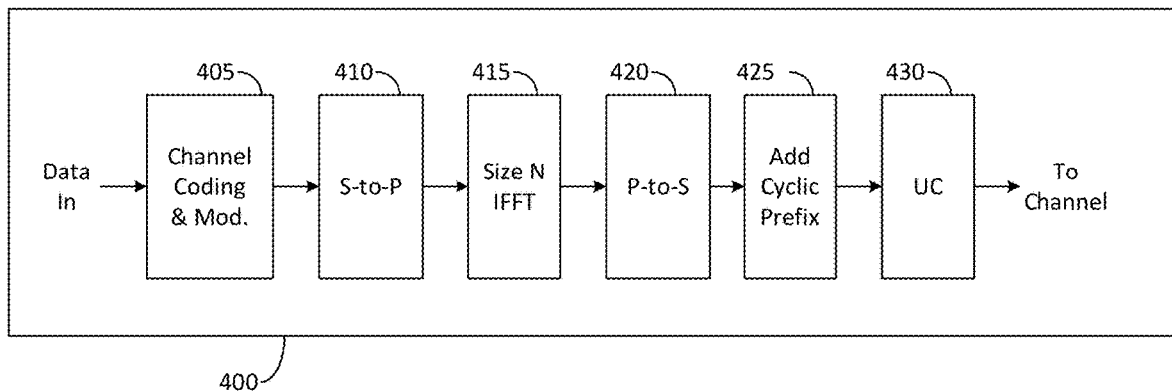
FIG. 4A illustrates a high-level diagram of an orthogonal frequency division multiple access transmit path according to embodiments of the present disclosure.
Figure 4B:
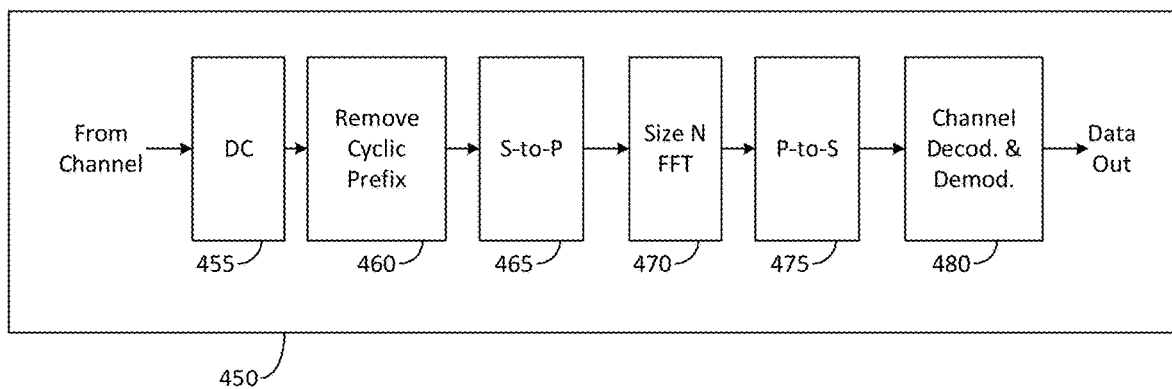
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
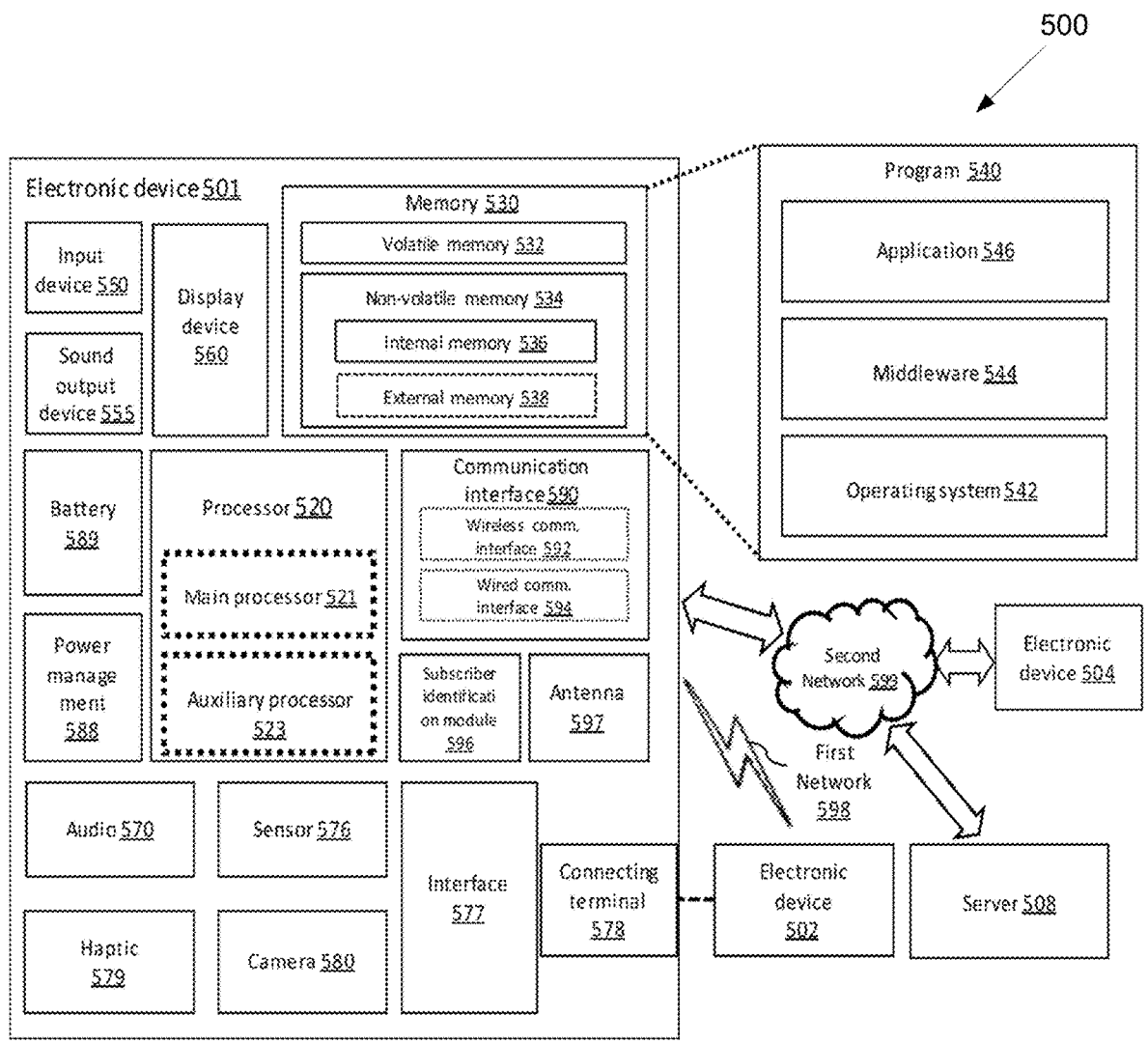
FIG. 5 illustrates an example electronic device according to embodiments of the present disclosure.

FIG. 5 illustrates an example electronic device 500 according to embodiments of the present disclosure. The embodiment of the electronic device 500 illustrated in FIG. 5 is for illustration only. FIG. 5 does not limit the scope of the present disclosure to any particular implementation. The electronic device 500 may be performed a function or functions of 111-116 as illustrated in FIG. 1. In one embodiment, the electronic device may be 111-116 and/or 101-103 as illustrated in FIG. 1.

In one embodiment, the electronic device 500 as illustrated in FIG. 5 may be an initiator and/or a responder in a group-1 and/or a group-2 as illustrated in FIG. 6.

In one embodiment, the electronic device 500 as illustrated in FIG. 5 may be a controller and/or a controlee in a group-1 and/or a group-2 as illustrated in FIG. 6.

PDs can be an electronic device. FIG. 5 illustrates an example electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill the scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation. As illustrated in FIG. 6, each node in group 1 and group 2 may performs a function or functions of 111-116 and 101-103 as illustrated in FIG. 1. In one embodiment, each node in group 1 and group 2 may be one of 111-116 and/or be one of 101-103 as illustrated in FIG. 1.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

There are two aspects neglected in IEEE standard specification, which are essential for future use cases. The first one is the optimized transmission procedure between one or more initiators and one or more responders, which can be critical for energy-saving purpose. Since a poll can be broadcast to multiple responders, an initiator can initialize a multicast, i.e., one-to-many, ranging round by sending a single poll instead of launching multiple unicast ranging rounds. Similarly, since the ranging response can also be broadcast to multiple initiators, a responder can embed the requested data respectively from different initiator in a single ranging response message. Exploiting the broadcast characteristics of wireless channel, the optimized transmission procedure is promising for future UWB network.

The other neglected aspect is the option for the contention-based ranging in an UWB network. In IEEE specification, one ranging round just contains a single pair of devices, i.e., one initiator and one responder. Within one ranging round, transmissions are implicitly scheduled: a responder/initiator expects to receive the message from the far end and may start to transmit afterwards. multiple ranging rounds can be scheduled by the CFP table of the sync frame. However, there can be other use cases that cannot be supported by IEEE standard specification. For example, the initiator broadcasts the poll, but the initiator does not have the prior-knowledge of who may response. Similarly, the responder may not have the prior-knowledge of who may initialize the ranging, so the responder can wait and listen for a certain period of time to collect polls respectively from different initiators.

In the present disclosure, an UWB network is provided with ranging requests between a group of devices and another group of devices. As shown in FIG. 6, one or more devices of group-1 has the ranging request to one or more devices of group-2 or vice versa. To accommodate optimized ranging transmission procedure and other new use cases, the configuration of device role, i.e., whether the configuration of device is an initiator or a responder, and the scheduling information for scheduling-based ranging, need to be determined and exchanged before the ranging round starts. Aiming to build a stand-alone UWB network, the present disclosure defines new control IE, and ranging scheduling IE for initiators and responders, which can be exchanged over the UWB MAC. However, the present disclosure does not preclude other methods to exchange information via the higher layer or out-of-band management.

Figure 7:
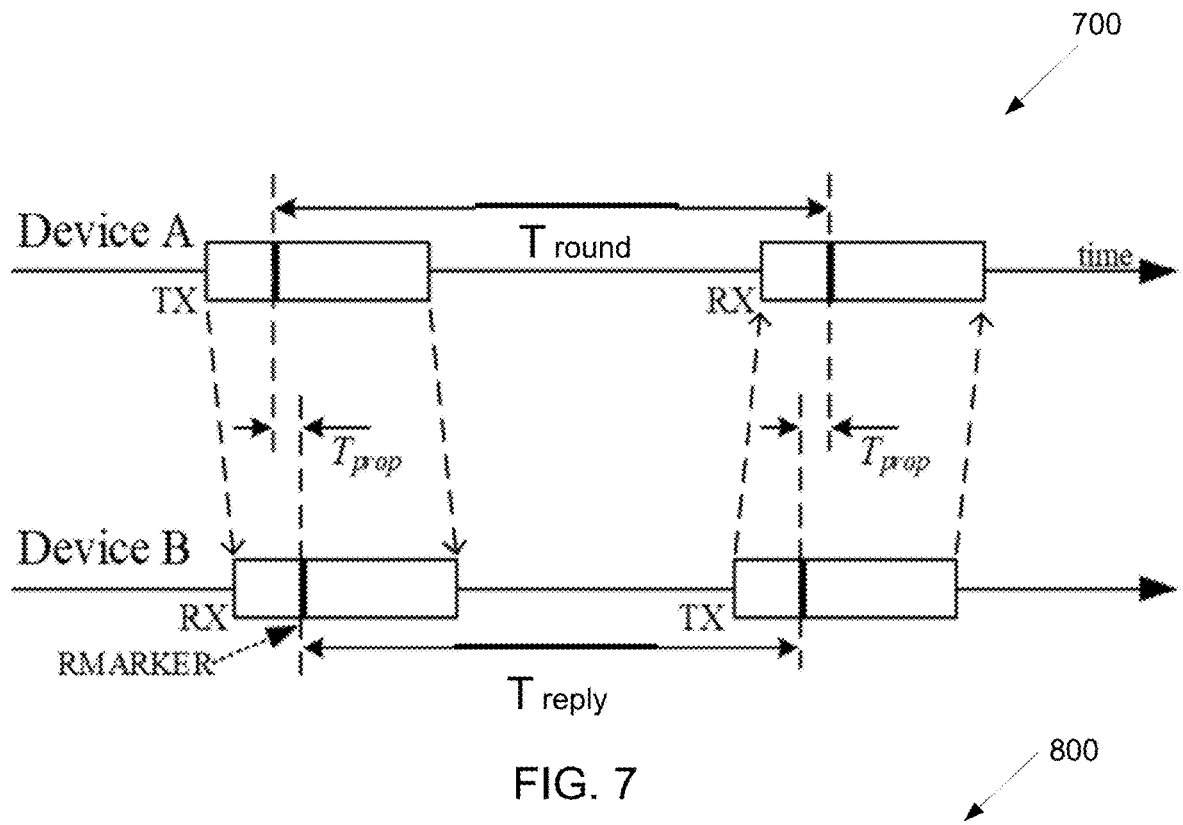
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation. The single-sided two-way ranging 700 may be performed in the electronic device 501 as illustrated in FIG. 5.

In one embodiment, an initiator and/or a responder may use the single-sided two-way ranging 700 as illustrated in FIG. 7.

In one embodiment, a controller and/or a controlee may use the single-sided two-way ranging 700 as illustrated in FIG. 7.

SS-TWR involves a simple measurement of the roundtrip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation:

$$\hat{T}_{prop} = \frac{1}{2}(T_{round} - T_{reply}).$$

Figure 8:
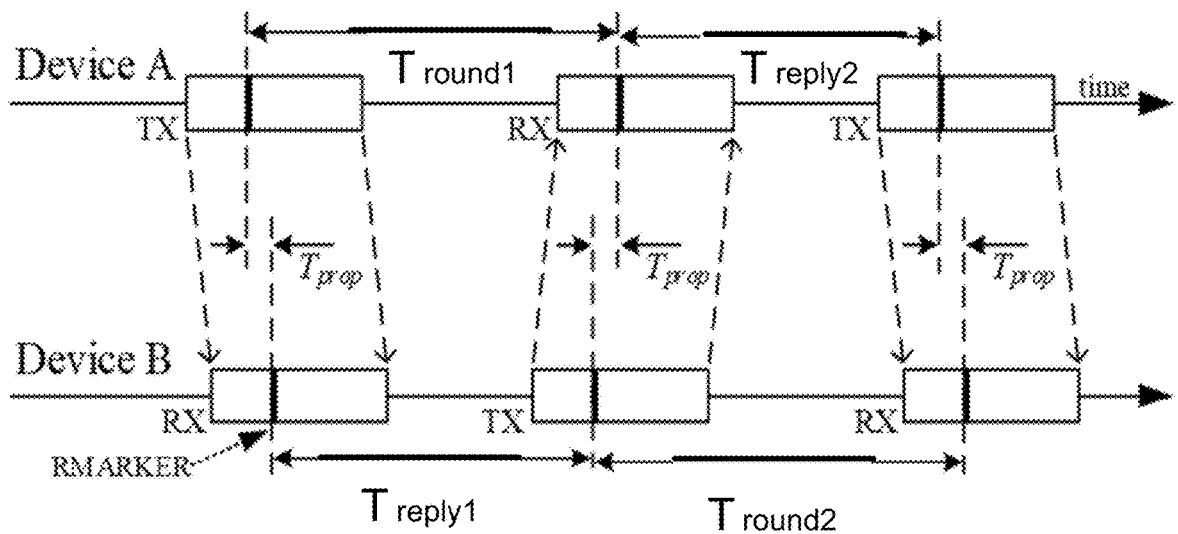
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation. The double-sided two-way ranging with three messages 800 may be performed in the electronic device 501 as illustrated in FIG. 5.

In one embodiment, an initiator and/or a responder may use the single-sided two-way ranging 800 as illustrated in FIG. 8.

In one embodiment, a controller and/or a controlee may use the single-sided two-way ranging 800 as illustrated in FIG. 8.

DS-TWR with three messages is illustrated in FIG. 8, which reduces the estimation error induced by clock drift from long response delays. Device A is the initiator to initialize the first roundtrip measurement, while device B as the responder, responses to complete the first roundtrip measurement, and meanwhile initialize the second roundtrip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

Figure 9:
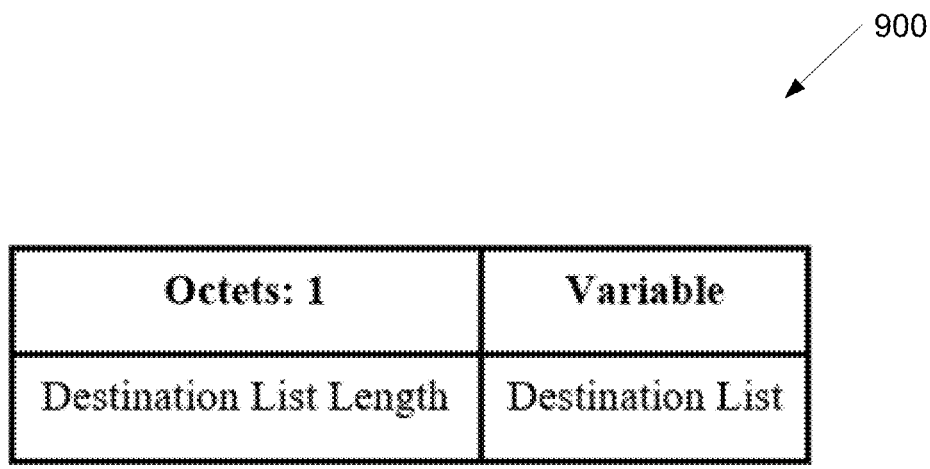
FIG. 9 illustrates an example destination list content field format according to embodiments of the present disclosure.

FIG. 9 illustrates an example destination list content field format 900 according to embodiments of the present disclosure. The embodiment of the destination list content field format 900 illustrated in FIG. 9 is for illustration only. FIG. 9 does not limit the scope of the present disclosure to any particular implementation. As illustrated in FIG. 9, the destination list content field format 900 may be used by the electronic device as illustrated in FIG. 5.

Each row of the destination list includes the field for MAC address of destination device to send the reply time as illustrated in FIG. 9. The MAC address can be a 16-bit short address, 48-bit MAC address, or a 64-bit extended address.

In one embodiment, a controller and controlee that may be one of nodes in a group 1 and/or group 2 as illustrated in FIG. 6 may use the destination list content field format 900. In one embodiment, an initiator and responder may use the destination list content field format 900.

Figure 10:
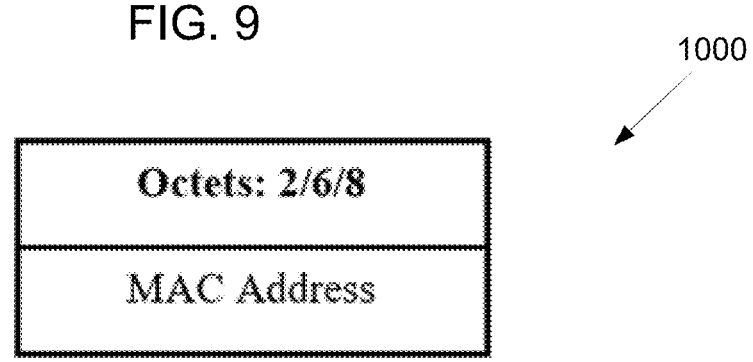
FIG. 10 illustrates an example MAC address according to embodiments of the present disclosure.

FIG. 10 illustrates an example MAC address 1000 according to embodiments of the present disclosure. The embodiment of the MAC address 1000 illustrated in FIG. 10 is for illustration only. FIG. 10 does not limit the scope of the present disclosure to any particular implementation. As illustrated in FIG. 10, the MAC address 1000 may be used by the electronic device as illustrated in FIG. 5.

In one embodiment, a controller and controlee that may be one of nodes in a group 1 and/or group 2 as illustrated in FIG. 6 may use the MAC address 1000. In one embodiment, an initiator and responder may use the MAC address 1000.

Figure 25:
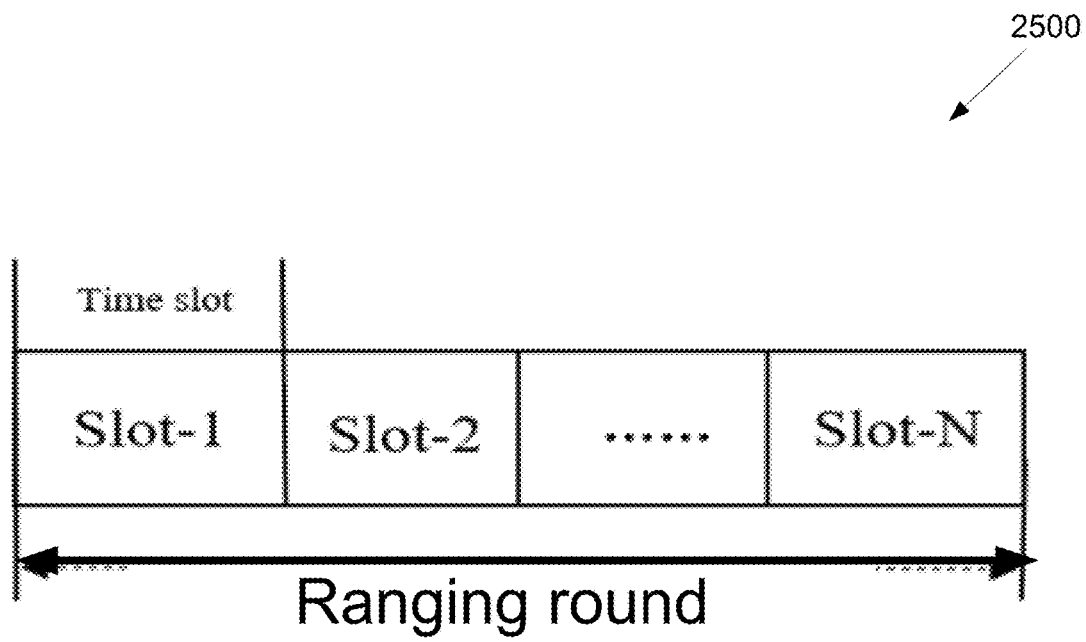
FIG. 25 illustrates an example time structure of ranging round according to embodiments of the present disclosure.

According to IEEE standard specification, the MAC sublayer provides an interface between the next higher layer and the PHY. The MAC sublayer conceptually includes a management entity called the MLME. This entity provides the service interfaces through which layer management may be invoked. The MLME is also responsible for maintaining a database of managed objects pertaining to the MAC sublayer. This database is referred to as the MAC sublayer PIB. FIG. 25 depicts the components and interfaces of the MAC sublayer.

Figure 11:
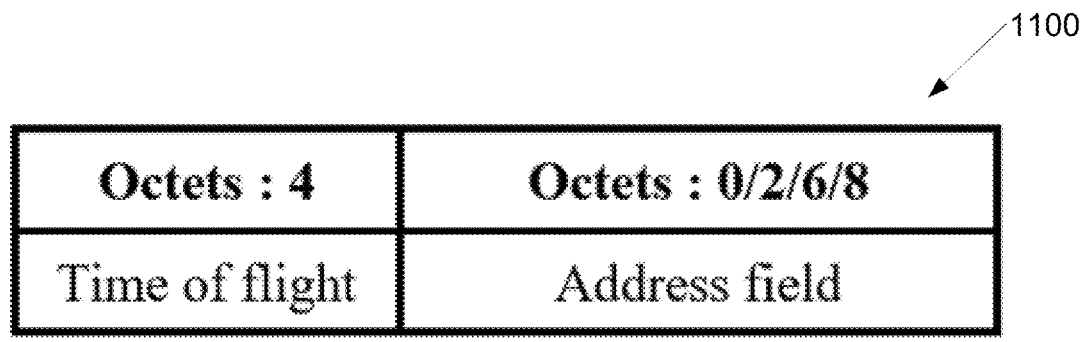
FIG. 11 illustrates an example ranging time-of-flight IE content field format according to embodiments of the present disclosure.

Ranging time-of-flight (RTOF) information element (IE) can be used to communicate the ranging result to the far end if requested. Since multiple ranging results between a device and others can be embedded into one data frame, a MAC address or other short addresses, e.g., a multicast group address can be added to this IE so that the device can extract the ranging result dedicated to it. If a single pair of devices participates in the ranging round, there is no need to use the address field. An example of RTOF IE content field format is shown in FIG. 11. Other examples are not precluded.

FIG. 11 illustrates an example ranging time-of-flight IE content field format 1100 according to embodiments of the present disclosure. The embodiment of the ranging time-of-flight IE content field format 1100 illustrated in FIG. 11 is for illustration only. FIG. 11 does not limit the scope of the present disclosure to any particular implementation. As illustrated in FIG. 11, the ranging time-of-flight IE content field format 1100 may be used by the electronic device as illustrated in FIG. 5.

In one embodiment, a controller and controlee that may be one of nodes in a group 1 and/or group 2 as illustrated in FIG. 6 may use the ranging time-of-flight IE content field format 1100. In one embodiment, an initiator and responder may use the ranging time-of-flight IE content field format 1100.

Figure 12:
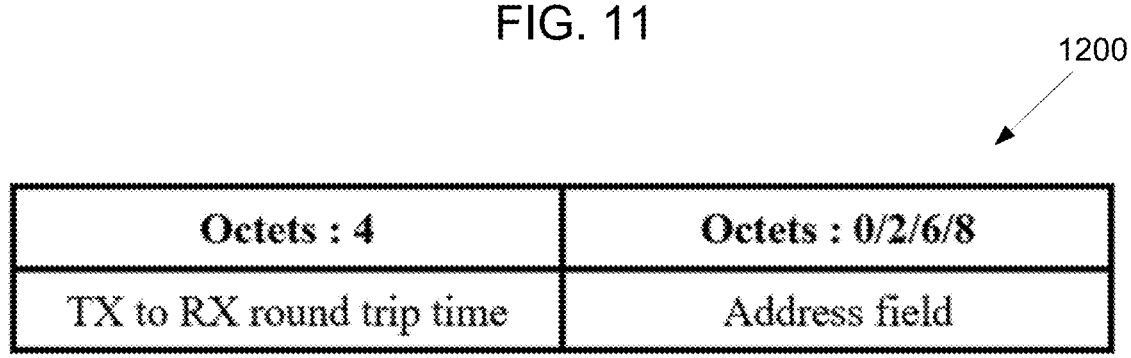
FIG. 12 illustrates an example ranging round trip measurement IE content field format according to embodiments of the present disclosure.

The ranging round trip measurement IE (RRTM IE) content includes the time difference between the transmit time of the ranging frame (RFRAME) initiating a round trip measurement and the receive time of the response RFRAME per source address that completes a round trip. The address field can be a 16-bit short address, a 48-bit MAC address, or a 64-bit extended address. If a single pair of devices participates in the ranging round, there is no need to use the address field. An example RRTM IE content field format is shown in FIG. 12. Other examples are not precluded.

FIG. 12 illustrates an example ranging round trip measurement IE content field format 1200 according to embodiments of the present disclosure. The embodiment of the ranging round trip measurement IE content field format 1200 illustrated in FIG. 12 is for illustration only. FIG. 12 does not limit the scope of the present disclosure to any particular implementation. As illustrated in FIG. 12, the ranging round trip measurement IE content field format 1200 may be used in the electronic device 500 as illustrated in FIG. 5.

In one embodiment, a controller and controlee that may be one of nodes in a group 1 and/or group 2 as illustrated in FIG. 6 may use the ranging round trip measurement IE content field format 1200. In one embodiment, an initiator and responder may use the ranging round trip measurement IE content field format 1200.

Figure 13:
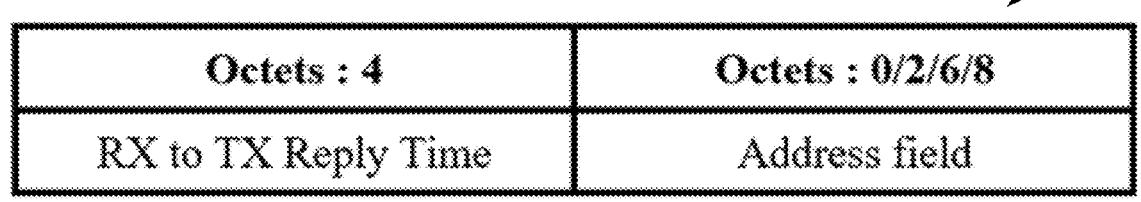
FIG. 13 illustrates an example ranging reply time instantaneous IE content field format according to embodiments of the present disclosure.

The RRTI IE content includes the time difference between the receive time of most recently received RFRAME per source address and the transmit time of the RFRAME containing the IE. The address field can be a 16-bit short address, a 48-bit MAC address, or a 64-bit extended address. If a single pair of devices participates in the ranging round, there is no need to use the address field. An example RRTI IE content field format is shown in FIG. 13. Other examples are not precluded.

FIG. 13 illustrates an example ranging reply time instantaneous IE content field format 1300 according to embodiments of the present disclosure. The embodiment of the ranging reply time instantaneous IE content field format 1300 illustrated in FIG. 13 is for illustration only and may be used in the electronic device as illustrated in FIG. 5. FIG. 13 does not limit the scope of the present disclosure to any particular implementation.

In one embodiment, a controller and controlee that may be one of nodes in a group 1 and/or group 2 as illustrated in FIG. 6 may use the example ranging reply time instantaneous IE content field format 1300. In one embodiment, an initiator and responder may use the example ranging reply time instantaneous IE content field format 1300.

Figure 14:
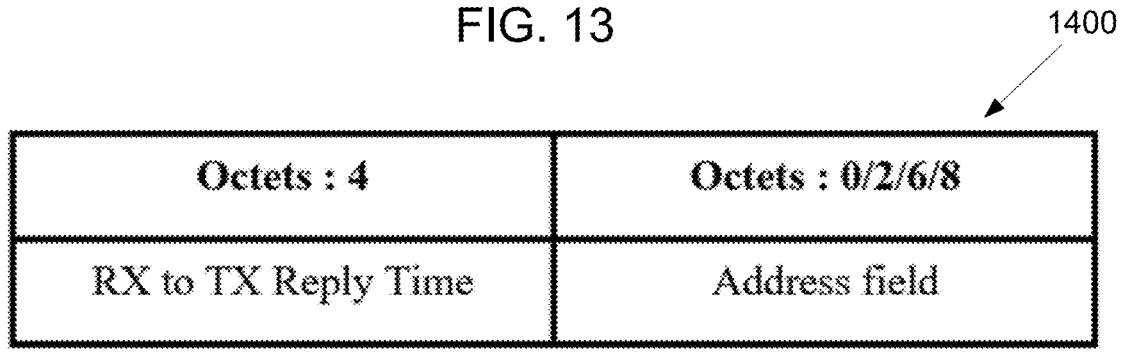
FIG. 14 illustrates an example ranging reply time deferred IE content field format according to embodiments of the present disclosure.

The ranging reply time deferred IE (RRTD IE) content includes the time difference between the receive time of most recently received RFRAME per source address and the transmit time of the responding RFRAME transmitted, sent most recently before the frame containing this IE. The address field can be a 16-bit short address, a 48-bit MAC address, or a 64-bit extended address. If a single pair of devices participates in the ranging round, there is no need to use the address field. An example RRTD IE content field format is shown in FIG. 14. Other examples are not precluded.

FIG. 14 illustrates an example ranging reply time deferred IE content field format 1400 according to embodiments of the present disclosure. The embodiment of the ranging reply time deferred IE content field format 1400 illustrated in FIG. 14 is for illustration only and may be used in the electronic device as illustrated in FIG. 5. FIG. 14 does not limit the scope of the present disclosure to any particular implementation.

In one embodiment, a controller and controlee that may be one of nodes in a group 1 and/or group 2 as illustrated in FIG. 6 may use the ranging reply time deferred IE content field format 1400. In one embodiment, an initiator and responder may use the ranging reply time deferred IE content field format 1400.

The ranging angle-of-arrival (AoA) deferred (RAD) IE content includes the AoA estimation at the device receiving request of AoA. The RAD IE is employed as part of two-way ranging exchanges and used in the case where the device cannot determine the AoA until after the reply has been sent, and in this case the RAD IE carries the AoA in a subsequent frame. When the RAD IE is used in multicast/broadcast frame (e.g., multicast/broadcast/many-to-many ranging), the RAD IE content can include a MAC address or a device ID of source who requests the AoA estimation. The address field can be a 16-bit short address, a 48-bit MAC address, or a 64-bit extended address. Otherwise, the RAD IE has a zero-length content field. The content field of the RAD IE can be formatted as shown in FIG. 15.

Figure 15:
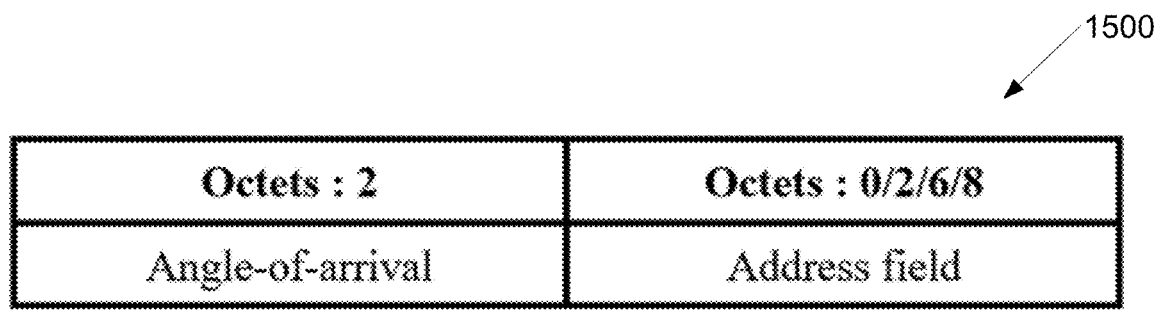
FIG. 15 illustrates an example ranging angle-of-arrival deferred IE content field format according to embodiments of the present disclosure.

FIG. 15 illustrates an example ranging angle-of-arrival deferred IE content field format 1500 according to embodiments of the present disclosure. The embodiment of the ranging angle-of-arrival deferred IE content field format 1500 illustrated in FIG. 15 is for illustration only and may be used in the electronic device as illustrated in FIG. 5. FIG. 15 does not limit the scope of the present disclosure to any particular implementation.

In one embodiment, a controller and controlee that may be one of nodes in a group 1 and/or group 2 as illustrated in FIG. 6 may use the ranging angle-of-arrival deferred IE content field format 1500. In one embodiment, an initiator and responder may use the ranging angle-of-arrival deferred IE content field format 1500.

Figure 16:
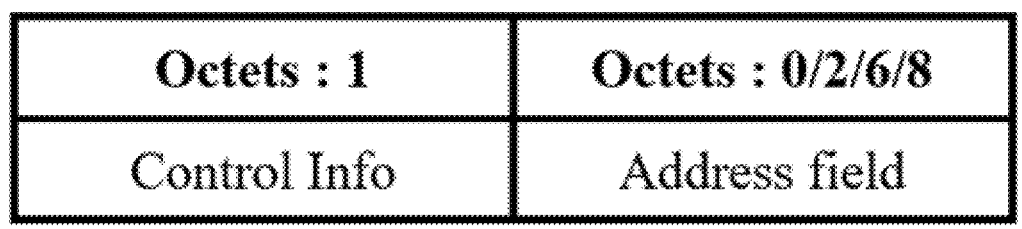
FIG. 16 illustrates an example ranging control single-sided TWR IE content field format according to embodiments of the present disclosure.

The ranging report control single-sided TWR (RRCST) IE is used to control SS-TWR message exchange. An example RCST IE content field format is shown in FIG. 16 and TABLE 1. Other examples are not precluded.

FIG. 16 illustrates an example ranging control single-sided TWR IE content field format 1600 according to embodiments of the present disclosure. The embodiment of the ranging control single-sided TWR IE content field format 1600 illustrated in FIG. 16 is for illustration only and may be used in the electronic device as illustrated in FIG. 5. FIG. 16 does not limit the scope of the present disclosure to any particular implementation.

In one embodiment, a controller and controlee that may be one of nodes in a group 1 and/or group 2 as illustrated in FIG. 6 may use the ranging control single-sided TWR IE content field format 1600. In one embodiment, an initiator and responder may use the ranging control single-sided TWR IE content field format 1600.

TABLE 1

Values of the control info field in the ranging report control single-sided TWR IE

| Control Info value | Meaning |
|---|---|
| 0 | This frame indicates that the responding end does not require TX-to-RX round-trip time and ranging result |
| 1 | This frame indicates that the responding end requires TX-to-RX round-trip time at the end of exchange |
| 2 | This frame indicates that the responding end requires ranging result at the end of exchange |

Figure 17:
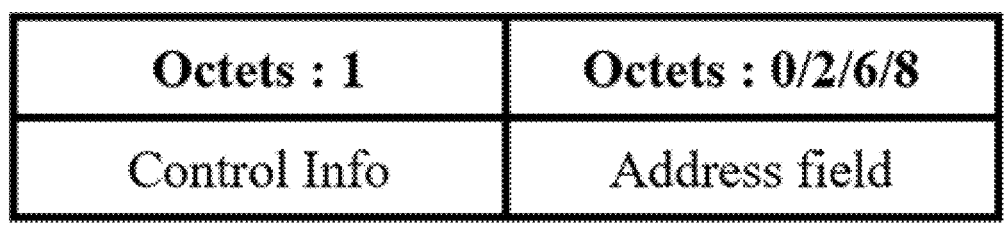
FIG. 17 illustrates an example ranging control double-sided TWR IE content field format according to embodiments of the present disclosure.

The ranging report control double-sided TWR (RRCDT) IE is used to control DS-TWR message exchange. An example RCDT IE content field format is shown in FIG. 17 and TABLE 2. Other examples are not precluded.

FIG. 17 illustrates an example ranging control double-sided TWR IE content field format 1700 according to embodiments of the present disclosure. The embodiment of the ranging control double-sided TWR IE content field format 1700 illustrated in FIG. 17 is for illustration only and may be used in the electronic device as illustrated in FIG. 5.

FIG. 17 does not limit the scope of the present disclosure to any particular implementation.

In one embodiment, a controller and controlee that may be one of nodes in a group 1 and/or group 2 as illustrated in FIG. 6 may use the ranging control double-sided TWR IE content field format 1700. In one embodiment, an initiator and responder may use the ranging control double-sided TWR IE content field format 1700.

TABLE 2

Values of the Control Info field in the Ranging Report Control Double-sided TWR IE

| Control Info value | Meaning |
| --- | --- |
| 0 | This frame is initiating DS-TWR and indicates that the initiating end does not require $1^{st}$ reply time, $2^{nd}$ TX-to-RX round-trip time or the ranging result |
| 1 | This frame is initiating DS-TWR and indicates that initiating end requires $1^{st}$ reply time and $2^{nd}$ TX-to-RX round-trip time at the end of exchange |
| 2 | This frame is initiating DS-TWR and indicates that initiating end requires ranging result at the end of exchange |
| 3 | This frame is continuing the DS-TWR, forming the request for the $2^{nd}$ TX-to-RX round-trip measurement |

Figure 18:
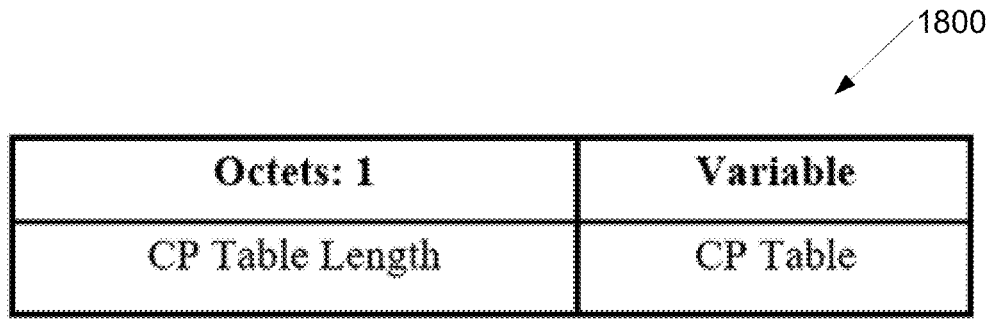
FIG. 18 illustrates an example content fields of contention period (CP) IE according to embodiments of the present disclosure.
Figure 19:
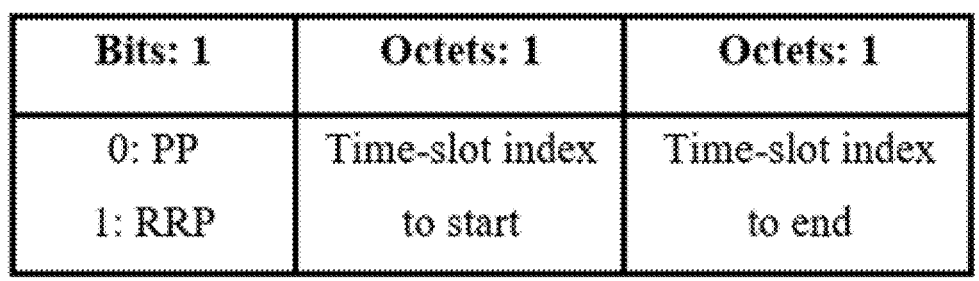
FIG. 19 illustrates an example row of CP table according to embodiments of the present disclosure.

The contention period (CP) IE is used to define separate contention periods in a ranging round, where each contention period is either a PP or an RRP. FIG. 18 and FIG. 19 exhibit one example of the IE content fields to fulfill the functionality of defining different contention periods; other examples are not precluded.

FIG. 18 illustrates an example content fields of contention period (CP) IE 1800 according to embodiments of the present disclosure. The embodiment of the content fields of contention period (CP) IE 1800 illustrated in FIG. 18 is for illustration only and may be used in the electronic device as illustrated in FIG. 5. FIG. 18 does not limit the scope of the present disclosure to any particular implementation.

In one embodiment, a controller and controlee that may be one of nodes in a group 1 and/or group 2 as illustrated in FIG. 6 may use the content fields of contention period (CP) IE 1800. In one embodiment, an initiator and responder may use the content fields of contention period (CP) IE 1800.

FIG. 19 illustrates an example row of CP table 1900 according to embodiments of the present disclosure. The embodiment of the row of CP table 1900 illustrated in FIG. 19 is for illustration only and may be used in the electronic device as illustrated in FIG. 5. FIG. 19 does not limit the scope of the present disclosure to any particular implementation.

In one embodiment, a controller and controlee that may be one of nodes in a group 1 and/or group 2 as illustrated in FIG. 6 may use the row of CP table 1900. In one embodiment, an initiator and responder may use the row of CP table 1900.

Each row of contention period (CP) table represent a contention-based PP/RRP, and the assigned time slots between the start index and the end index. The CP table Length indicates the number of rows in the CP table, which is equivalent to number of contention periods in a round.

Figure 20A:
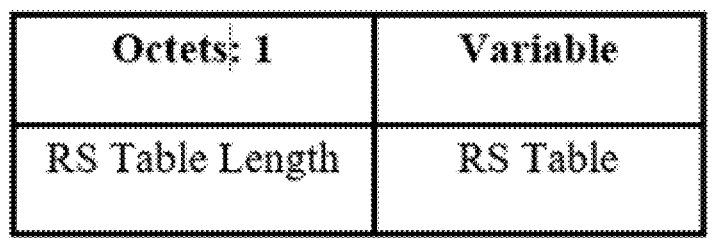
FIG. 20A illustrates an example content fields of ranging scheduling (RS) IE according to embodiments of the present disclosure.

FIG. 20A illustrates an example content fields of ranging scheduling (RS) IE 2000 according to embodiments of the present disclosure. The embodiment of the content fields of ranging scheduling (RS) IE 2000 illustrated in FIG. 20A is for illustration only and may be used in the electronic device as illustrated in FIG. 5. FIG. 20A does not limit the scope of the present disclosure to any particular implementation.

In one embodiment, a controller and controlee that may be one of nodes in a group 1 and/or group 2 as illustrated in FIG. 6 may use the content fields of ranging scheduling (RS) IE 2000. In one embodiment, an initiator and responder may use the content fields of ranging scheduling (RS) IE 2000.

Figure 20B:
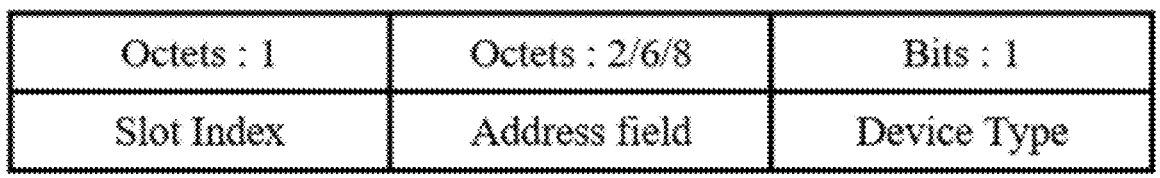
FIG. 20B illustrates an example row of ranging scheduling table according to embodiments of the present disclosure.

FIG. 20B illustrates an example row of ranging scheduling table 2050 according to embodiments of the present disclosure. The embodiment of the row of ranging scheduling table 2050 illustrated in FIG. 20B is for illustration only and may be used in the electronic device as illustrated in FIG. 5. FIG. 20B does not limit the scope of the present disclosure to any particular implementation.

In one embodiment, a controller and controlee that may be one of nodes in a group 1 and/or group 2 as illustrated in FIG. 6 may use the row of ranging scheduling table 2050. In one embodiment, an initiator and responder may use the row of ranging scheduling table 2050.

Figure 21:
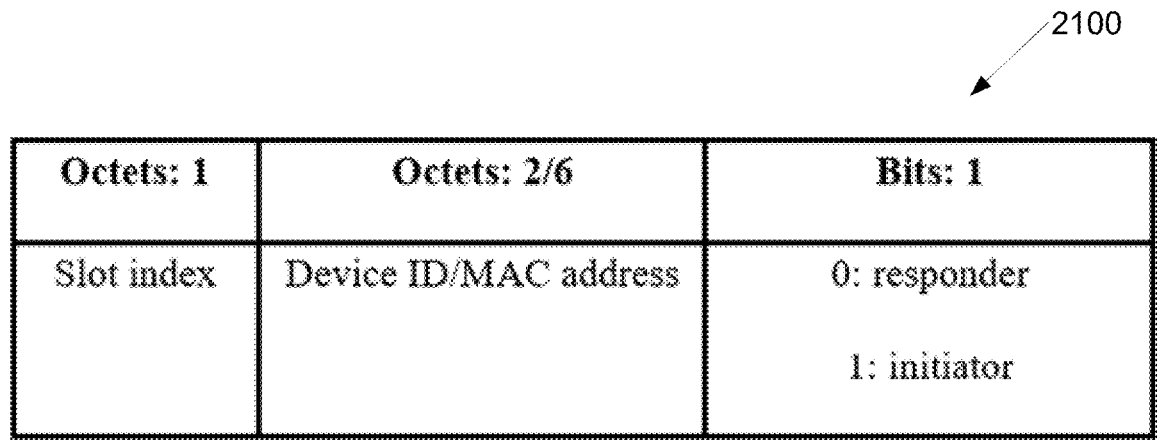
FIG. 21 illustrates an example row of RS table according to embodiments of the present disclosure.

FIG. 21 illustrates an example row of RS table 2100 according to embodiments of the present disclosure. The embodiment of the row of RS table 2100 illustrated in FIG. 21 is for illustration only and may be used in the electronic device as illustrated in FIG. 5. FIG. 21 does not limit the scope of the present disclosure to any particular implementation.

In one embodiment, a controller and controlee that may be one of nodes in a group 1 and/or group 2 as illustrated in FIG. 6 may use the row of RS table 2100. In one embodiment, an initiator and responder may use the row of RS table 2100.

For the scheduling-based ranging, the ranging scheduling (RS) IE can be used to convey the resource assignment. FIG. 20A, FIG. 20B, and FIG. 21 illustrate an example of the content fields of the RS IE; other examples to fulfill the same functionality are not precluded.

The RS IE contains an RS table, where each row consists of a time slot index, the address of device assigned to this slot, and the flag to indicate the role of the assigned device. The field of RS table Length indicate the number of rows in the RS table, which is equivalent to the number of available time slots/resource elements in a ranging round. After successfully exchange this IE in the UWB network, controller and controlees know their respective roles, and scheduling assignment in this ranging round. Then, devices can behave accordingly once the ranging round starts.

Figure 22:
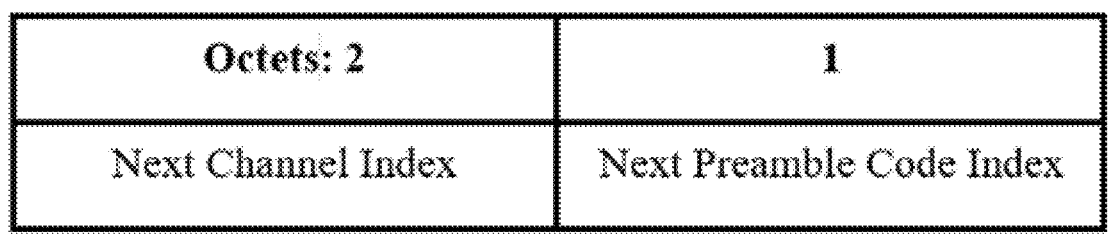
FIG. 22 illustrates an example ranging next channel and preamble IE content field format according to embodiments of the present disclosure.

FIG. 22 illustrates an example ranging next channel and preamble IE content field format 2200 according to embodiments of the present disclosure. The embodiment of the ranging next channel and preamble IE content field format 2200 illustrated in FIG. 22 is for illustration only and may be used in the electronic device as illustrated in FIG. 5. FIG. 22 does not limit the scope of the present disclosure to any particular implementation.

In one embodiment, a controller and controlee that may be one of nodes in a group 1 and/or group 2 as illustrated in FIG. 6 may use the ranging next channel and preamble IE content field format 2200. In one embodiment, an initiator and responder may use the ranging next channel and preamble IE content field format 2200.

The ranging next channel and preamble (RNCP) IE is used to specify the channel index and preamble code index of next ranging block. The ranging next channel and preamble IE content field may be formatted as illustrated in FIG. 22.

Figure 23:
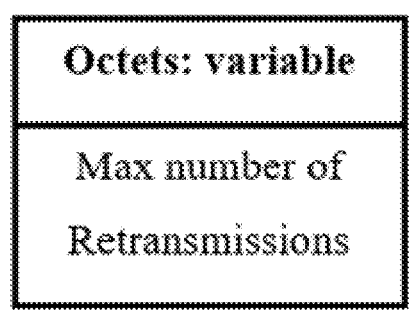
FIG. 23 illustrates an example ranging max retransmission IE content field format according to embodiments of the present disclosure.

FIG. 23 illustrates an example ranging max retransmission IE content field format 2300 according to embodiments of the present disclosure. The embodiment of the ranging max retransmission IE content field format 2300 illustrated in FIG. 23 is for illustration only and may be used in the electronic device as illustrated in FIG. 5. FIG. 23 does not limit the scope of the present disclosure to any particular implementation.

In one embodiment, a controller and controlee that may be one of nodes in a group 1 and/or group 2 as illustrated in FIG. 6 may use the ranging max retransmission IE content field format 2300. In one embodiment, an initiator and responder may use the ranging max retransmission IE content field format 2300.

The ranging max retransmission (RMR) IE is to specify the maximum number of retries for initiators/responders to contend in multiple contention-based ranging rounds. An example of IE content fields is illustrated in FIG. 23; other examples are not precluded.

Figure 24:
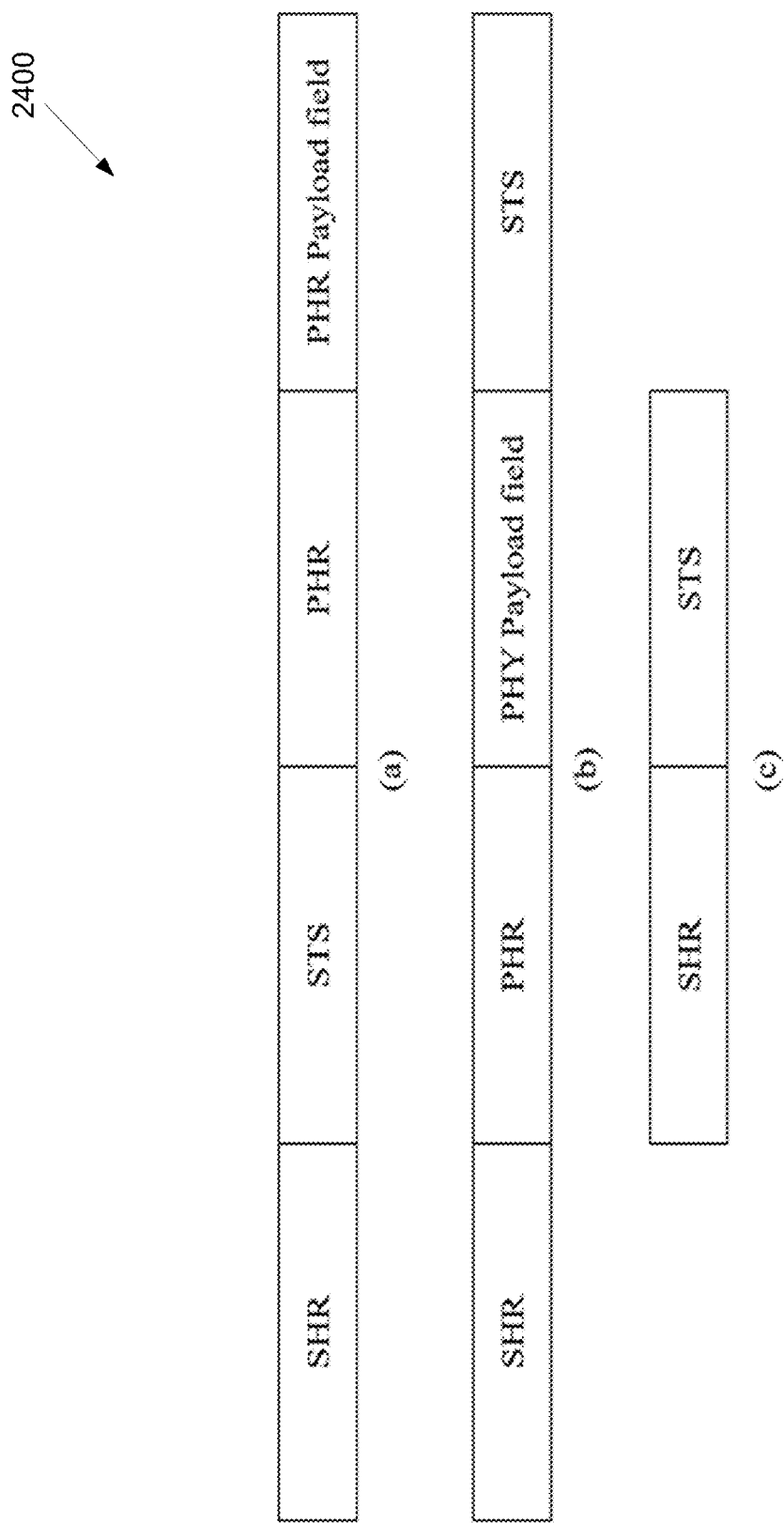
FIG. 24 illustrates an example three secure ranging PPDU formats according to embodiments of the present disclosure.

FIG. 24 illustrates an example three secure ranging PPDU formats 2400 according to embodiments of the present disclosure. The embodiment of the three secure ranging PPDU formats 2400 illustrated in FIG. 24 is for illustration only and may be used in the electronic device as illustrated in FIG. 5. FIG. 24 does not limit the scope of the present disclosure to any particular implementation.

In one embodiment, a controller and controlee that may be one of nodes in a group 1 and/or group 2 as illustrated in FIG. 6 may use the three secure ranging PPDU formats 2400. In one embodiment, an initiator and responder may use the three secure ranging PPDU formats 2400.

In the development of IEEE 802.15.4z, the main enhancement for secure ranging is the inclusion a scrambled timestamp sequence (STS) in the basic PHY protocol data unit (PPDU) format. Since the unique STS of a device is known by one or more far ends in a trusted group, the secure ranging can be performed within the trusted group, and the chance of being attacked is significantly reduced. In the present disclosure, a framework is provided that STSs of devices have been exchanged successfully, which can be done via, e.g., a higher layer control or out-of-band management. How to initialize/update STS and exchange the STS between devices is out of the scope of the present disclosure.

Three secure ranging PPDU formats may be supported, the difference between the formats being the location of the STS and existence of a PHR and PHY payload field as FIG. 16. Abbreviations in FIG. 24 represent the following definitions, respectively: synchronization header (SHR); scrambled timestamp sequence (STS); and PHY header (PHY).

The locations of STS are different in FIG. 24. For the format of FIG. 24 (e.g., (c) in FIG. 24), there is no PHY header or data field (NHD). The ranging based on PPDU format of FIGURE (e.g., (c) in FIG. 24) is called as NHD secure ranging. Other conventions which fulfill similar concepts are not precluded in the present disclosure.

In the present disclosure, an UWB network is considered with ranging requests between a group of devices and another group of devices. As FIG. 6 exhibits, one or more devices of group-1 has the ranging request to one or more devices of group-2 or vice versa.

By utilizing the broadcast characteristics of wireless channel, optimized schemes with reduced number of transmissions can be realized for use cases where there are one or more initiators and one or more responders. To accommodate the secure ranging and optimized transmission scheme, the present disclosure modifies primitives of MAC service and define new PIB attributes in IEEE standard specification for the development of IEEE 802.15.4z.

FIG. 25 illustrates an example time structure of ranging round 2500 according to embodiments of the present disclosure. The embodiment of the time structure of ranging round 2500 illustrated in FIG. 25 is for illustration only and may be used by the electronic device as illustrated in FIG. 5. FIG. 25 does not limit the scope of the present disclosure to any particular implementation.

In one embodiment, a controller and controlee that may be one of nodes in a group 1 and/or group 2 as illustrated in FIG. 6 may use the time structure of ranging round 2500. In one embodiment, an initiator and responder may use the time structure of ranging round 2500.

A ranging configuration incorporates the control information of a ranging round, which consists of multiple time slots as illustrated in FIG. 25. Time slot is the basic time unit to fulfill a message exchange. Other conventions to fulfill the same functionalities as ranging round and time slot are not precluded in the present disclosure. Depending on the device capabilities, slot duration and number of time slots in a ranging round can be adjusted in the ranging configuration, or the slot duration and number of time slots are fixed to a default setting. One or multiple pairs of devices can participate in a ranging round to fulfill the ranging requests.

Figure 26:
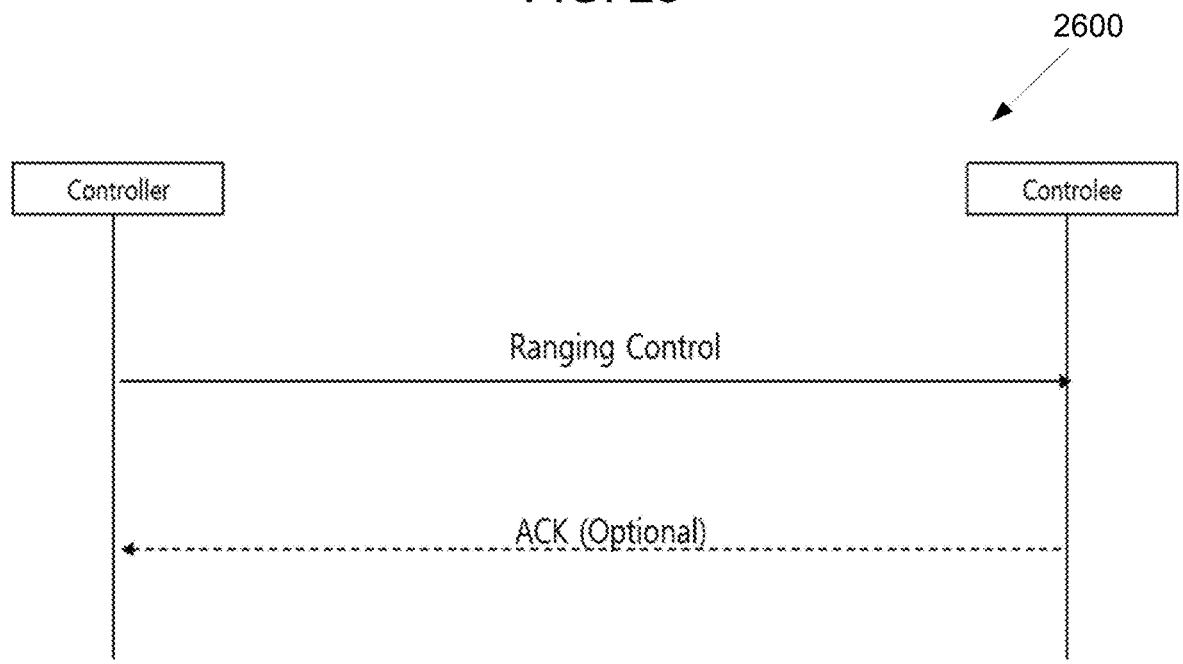
FIG. 26 illustrates an example ranging device nomenclatures: controller and controlee according to embodiments of the present disclosure.

FIG. 26 illustrates an example ranging device nomenclatures 2600 (a controller and a controlee) according to embodiments of the present disclosure. The embodiment of the ranging device nomenclatures 2600 illustrated in FIG. 26 is for illustration only. FIG. 26 does not limit the scope of the present disclosure to any particular implementation. As illustrated in FIG. 26, the controller and the controlee may be the electronic device 501 as illustrated in FIG. 5. In one embodiment, the controller and the controlee as illustrated in FIG. 26 may be one of nodes in the group 1 and/or group 2 as illustrated in FIG. 6.

In one embodiment, an initiator and responder may use the ranging device nomenclatures 2600.

The setting of a ranging configuration determined by the next higher layer can be sent to one or more ranging controlees from a ranging controller (lead device) as illustrated in FIG. 26. With different network formations, the ranging configuration can be conveyed via a dedicated data frame sent to one or more devices, or the ranging configuration can be embedded into a sync frame broadcast to devices in the network. Meanwhile, the present disclosure does not preclude other methods to exchange the ranging configuration information, e.g., via the higher layer or our-of-band management.

FIG. 27A illustrates an example general ranging round structure 2700 according to embodiments of the present disclosure. The embodiment of the general ranging round structure 2700 illustrated in FIG. 27A is for illustration only and may be used by the electronic device as illustrated in FIG. 5. FIG. 27A does not limit the scope of the present disclosure to any particular implementation.

In one embodiment, a controller and controlee that may be one of nodes in a group 1 and/or group 2 as illustrated in FIG. 6 may use the general ranging round structure 2700. In one embodiment, an initiator and responder may use the general ranging round structure 2700.

Ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s). A general ranging round structure can be found in FIG. 27A, where one or more ranging periods may be used to transmit RFRAMEs, and one or more data periods can be used to exchange ranging results or other data frames.

FIG. 27B illustrates an example ranging round structure 2750 according to embodiments of the present disclosure. The embodiment of the ranging round structure 2750 illustrated in FIG. 27B is for illustration only and may be used by the electronic device as illustrated in FIG. 5. FIG. 27B does not limit the scope of the present disclosure to any particular implementation.

In one embodiment, a controller and controlee that may be one of nodes in a group 1 and/or group 2 as illustrated in FIG. 6 may use the ranging round structure 2750. In one embodiment, an initiator and responder may use the ranging round structure 2750.

Figure 28A:
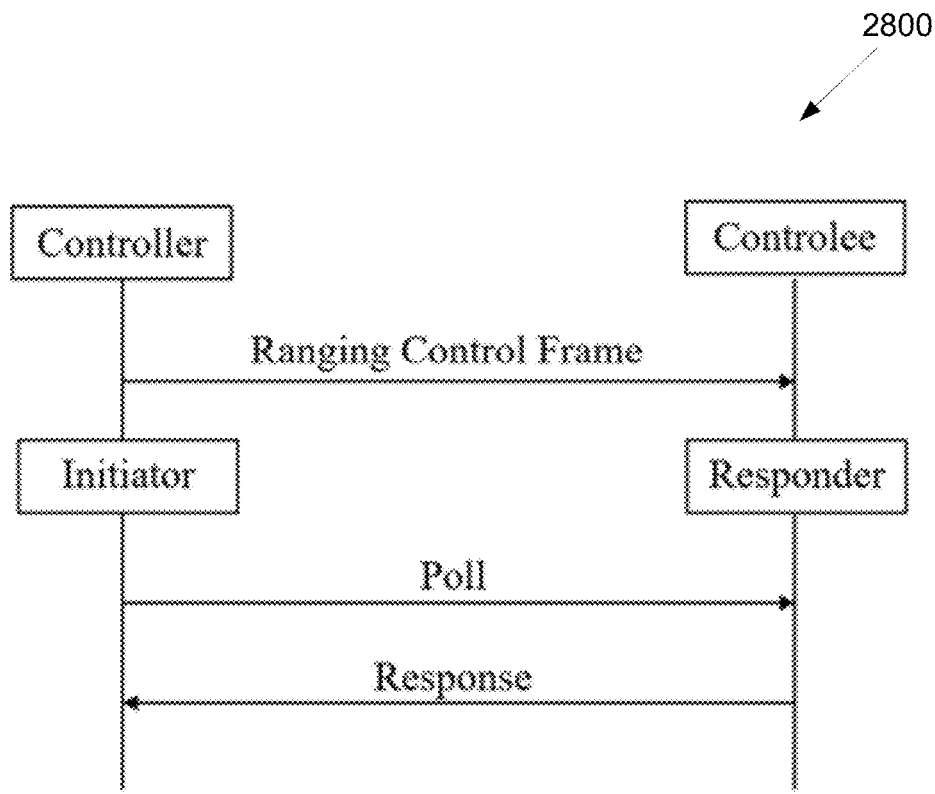
FIG. 28A illustrates an example ranging controller as initiator according to embodiments of the present disclosure.

FIG. 28A illustrates an example ranging controller as initiator 2800 according to embodiments of the present disclosure, as may be performed by an electronic device (e.g., 111-116 and/or 101-103 as illustrated in FIGS. 1 and 500 as illustrated in FIG. 5). The embodiment of the ranging controller as initiator 2800 illustrated in FIG. 28A is for illustration only. FIG. 28A does not limit the scope of the present disclosure to any particular implementation.

In one embodiment, a controller and controlee as illustrated in FIG. 28A that may be one of nodes in a group 1 and/or group 2 as illustrated in FIG. 6.

Figure 28B:
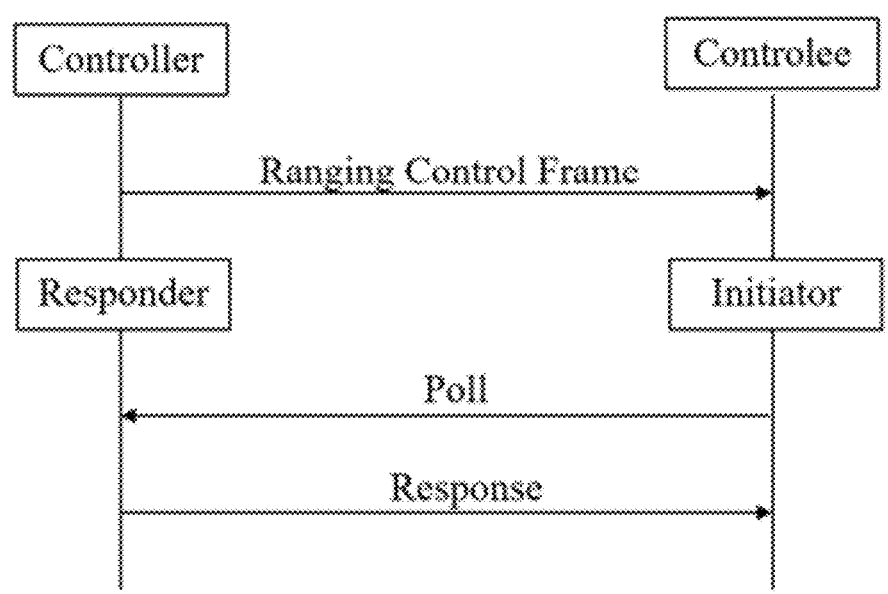
FIG. 28B illustrates an example ranging controller as responder according to embodiments of the present disclosure.

FIG. 28B illustrates an example ranging controller as responder 2850 according to embodiments of the present disclosure, as may be performed by an electronic device (e.g., 111-116 and/or 101-103 as illustrated in FIGS. 1 and 500 as illustrated in FIG. 5). The embodiment of the ranging controller as responder 2850 illustrated in FIG. 28B is for illustration only. FIG. 28B does not limit the scope of the present disclosure to any particular implementation.

In one embodiment, a controller and controlee, as illustrated in FIG. 28B, that may be one of nodes in a group 1 and/or group 2 as illustrated in FIG. 6.

As illustrated in FIGS. 28A and 28B, a controller transmits the ranging control frame to let controlee(s) know the ranging configuration, e.g., round structure (see FIG. 27A) and ranging scheduling information (see FIG. 20A and FIG. 20B). Controller can act as either a ranging initiator or a responder. When controller is an initiator, both ranging control frame and poll message can be implicitly acknowledged by the ranging response frame from the controlee/responder.

When controller is a responder, ranging control frame can be implicitly acknowledged by the poll message from the controlee/initiator. However, if the poll fails to be received by the controller or if the ranging control frame fails to be received by the controlee, and controller hears nothing from controlee(s) in FIGS. 28A and 28B, controller does not know whether the ranging configuration has been exchanged successfully. Embodiments in the present disclosure develop mechanisms to enhance the reliability of ranging configuration exchange.

Before the ranging session starts, controlee(s) can be waiting in the listening mode to acquire the ranging configuration from controller. If a ranging control frame is transmitted successfully from controller to a controlee, a time structure of a ranging round is known by the controlee. Specifically, the controlee has the knowledge of assigned time slots to transmit and receive expected frames. When the expected RFRAME is not received by controlee(s), the controlee(s) can send negative-acknowledgement to the controller in assigned time slots, indicating the ranging failure. Via the negative-acknowledgement frame from controlee(s), controller not only know occurrence of ranging failures, but also confirm the exchange of ranging configuration among controlee(s).

Figure 29:
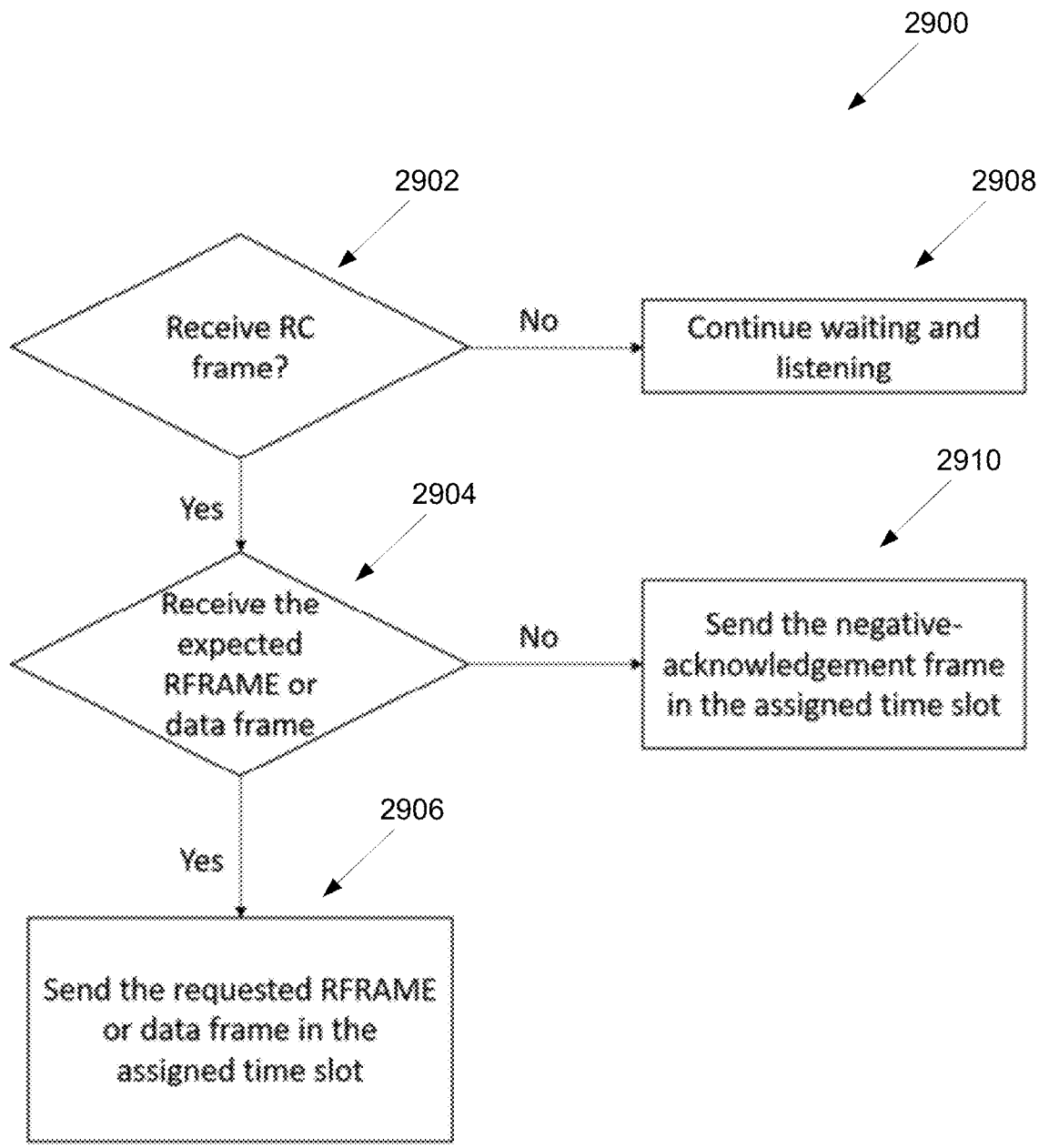
FIG. 29 illustrates a flow chart of a method for determining to send negative-acknowledgement for controlee according to embodiments of the present disclosure.

FIG. 29 illustrates a flow chart of a method 2900 for determining to send negative-acknowledgement for controlee according to embodiments of the present disclosure, as may be performed by an electronic device (e.g., 111-116 and/or 101-103 as illustrated in FIGS. 1 and 501 as illustrated in FIG. 5). The embodiment of the method 2900 illustrated in FIG. 29 is for illustration only and may be used in the electronic device as illustrated in FIG. 5. FIG. 29 does not limit the scope of the present disclosure to any particular implementation.

In one embodiment, a controller and controlee that may be one of nodes in a group 1 and/or group 2 as illustrated in FIG. 6 may perform the method 2900. In one embodiment, an initiator and responder may perform the method 2900.

As illustrated in FIG. 29, the method 2900 begins at step 2902. In step 2902, an electronic device determines whether the electronic device receives an RC frame. In step 2902, if the electronic device receives RC frame the method 2900 performs step 2904. In step 2904, the electronic device determines whether the electronic device receives the expected RFRAME or data frame. In step 2904, the electronic device receives the expected RFRAME or the data frame, the electronic device performs step 2906. In step 2906, the electronic device sends the requested RFRAME or the data frame in the assigned time slot. In step 2902, the electronic device does not receive, the electronic device continues waiting and listening in step 2908. In step 2904, the electronic device does not receive, the electronic device sends the negative-acknowledgement frame in the assigned time slot in step 2910.

Figure 30:
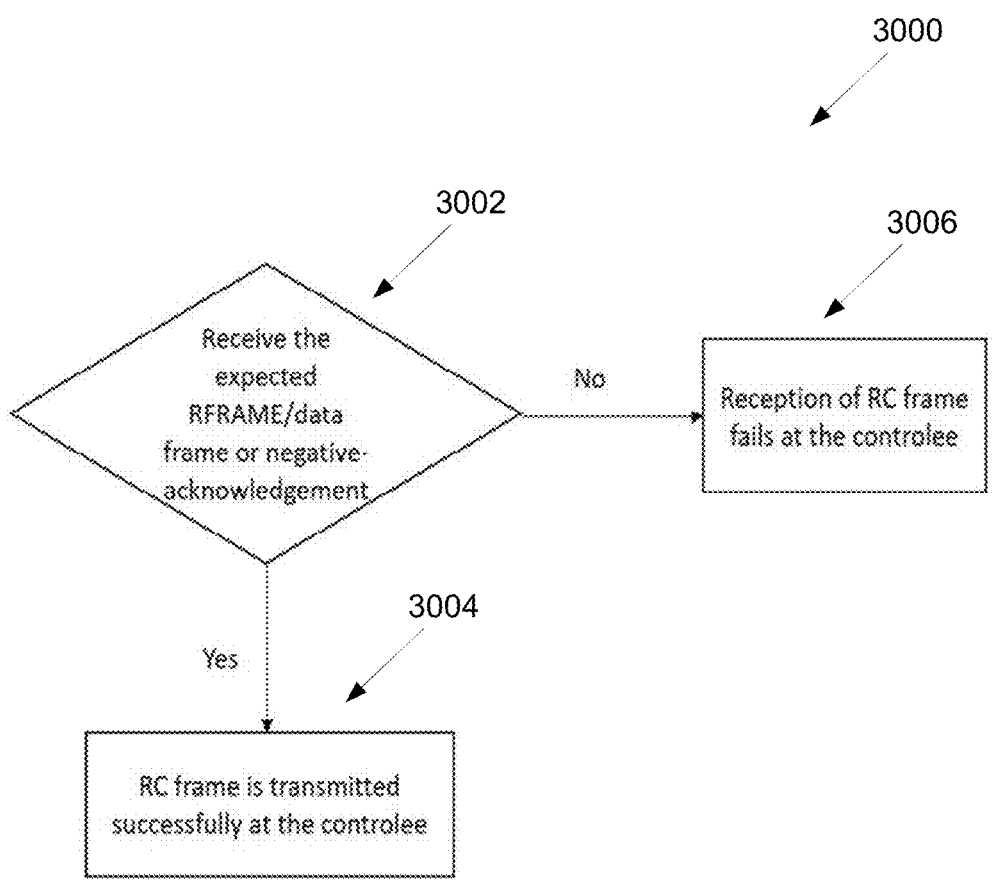
FIG. 30 illustrates a flow chart of a method for determining failure of RC frame transmission for controller according to embodiments of the present disclosure.

FIG. 30 illustrates a flow chart of a method 3000 for determining failure of RC frame transmission for controller according to embodiments of the present disclosure, as may be performed by an electronic device (e.g., 111-116 and/or 101-103 as illustrated in FIGS. 1 and 500 as illustrated in FIG. 5). The embodiment of the method 3000 illustrated in FIG. 30 is for illustration only and may be used in the electronic device as illustrated in FIG. 5. FIG. 30 does not limit the scope of the present disclosure to any particular implementation.

In one embodiment, a controller and controlee that may be one of nodes in a group 1 and/or group 2 as illustrated in FIG. 6 may perform the method 3000. In one embodiment, an initiator and responder may perform the method 3000.

As illustrated in FIG. 3-, the method 300 begins at step 3902. In step 3002, an electronic device determines if the electronic device receives the expected RFRAME/data frame or negative-acknowledgement. In step 3002, if the electronic device receives the expected RFRAME/data frame or negative-acknowledgement, the electronic device performs the step 3004. In step 3004, an RC frame is transmitted successfully at the controlee. In step 3002, the electronic device does not receive, the electronic device performs step 3006. In step 3006, reception of RC frame fails at the controlee.

When neither RFRAME nor negative-acknowledgement frame is received by controller from a controlee, controller can assume that the transmission of ranging control frame fails at the controlee. This mechanism is illustrated in FIG. 29 and FIG. 30.

In FIG. 29, since ranging slots are already scheduled in the RC frame via controller, a controlee(s) can utilize these slots to send a negative-acknowledgment. RFRAME, a data frame, or a negative-acknowledgement from controlee implicitly confirm the successful exchange of RC frame, which can alleviate the cost for controller to exchange ranging configuration again. If there is no response from the controlee after a certain period of time, a controller determines that the exchange of RC frame fails, and the controller can send the RC frame again, since controlee(s) can still be waiting and listening. Various frame formats and implementation methods of negative-acknowledgement can be found in the present disclosure.

In one embodiment, procedures of message exchange for a negative-acknowledgement are provided for use cases where controller acts as a ranging initiator or responder, respectively. Examples of use case with one ranging initiator and multiple ranging responders are illustrated for SS-TWR and DS-TWR in following schemes. Other examples are not precluded.

Figure 31:
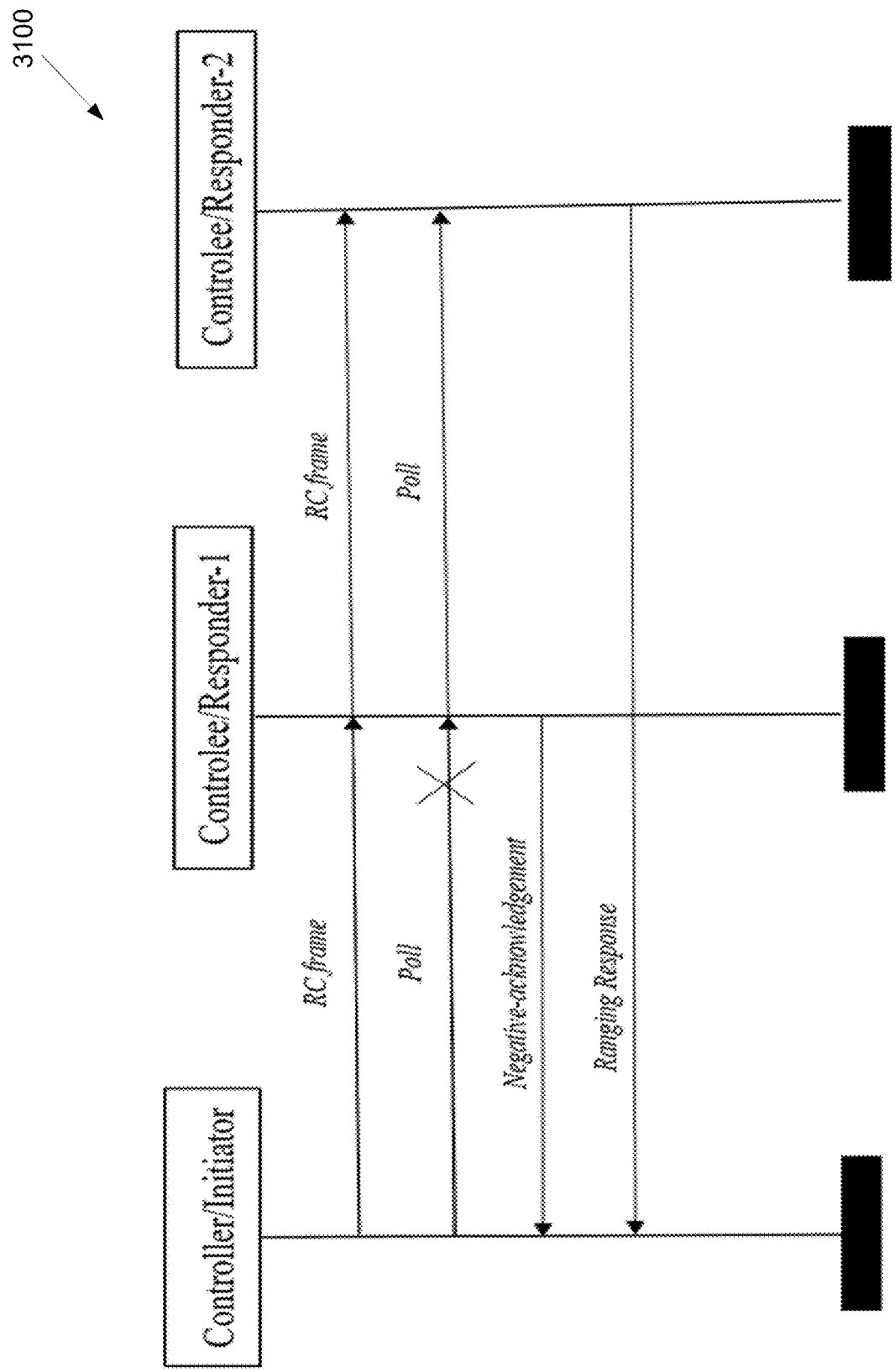
FIG. 31 illustrates an example message exchange chart for SS-TWR with one initiator and multiple responders: controller is ranging initiator according to embodiments of the present disclosure.

FIG. 31 illustrates an example message exchange chart 3100 for SS-TWR with one initiator and multiple responders: controller is ranging initiator according to embodiments of the present disclosure, as may be performed by an electronic device (e.g., 111-116 and/or 101-103 as illustrated in FIGS. 1 and 500 as illustrated in FIG. 5). The embodiment of the message exchange chart 3100 illustrated in FIG. 31 is for illustration only and may be used in the electronic device as illustrated in FIG. 5. FIG. 31 does not limit the scope of the present disclosure to any particular implementation.

As illustrated in FIG. 31, SS-TWR (see FIG. 7) is implemented for ranging between one initiator and two responders, where controller acts as the initiator. Although an RC frame is received successfully, a responder-1 does not receive the expected poll from the ranging initiator/controller. Rather than maintaining idle in an assigned time slot for ranging response, a responder-1 can send a negative-acknowledgement frame to indicate the failure of poll message, and implicitly confirm the successful exchange of RC frame. For the responder-2, once the controller receives a ranging response, the controller also knows that RC frame has been received by the responder-2.

Figure 32:
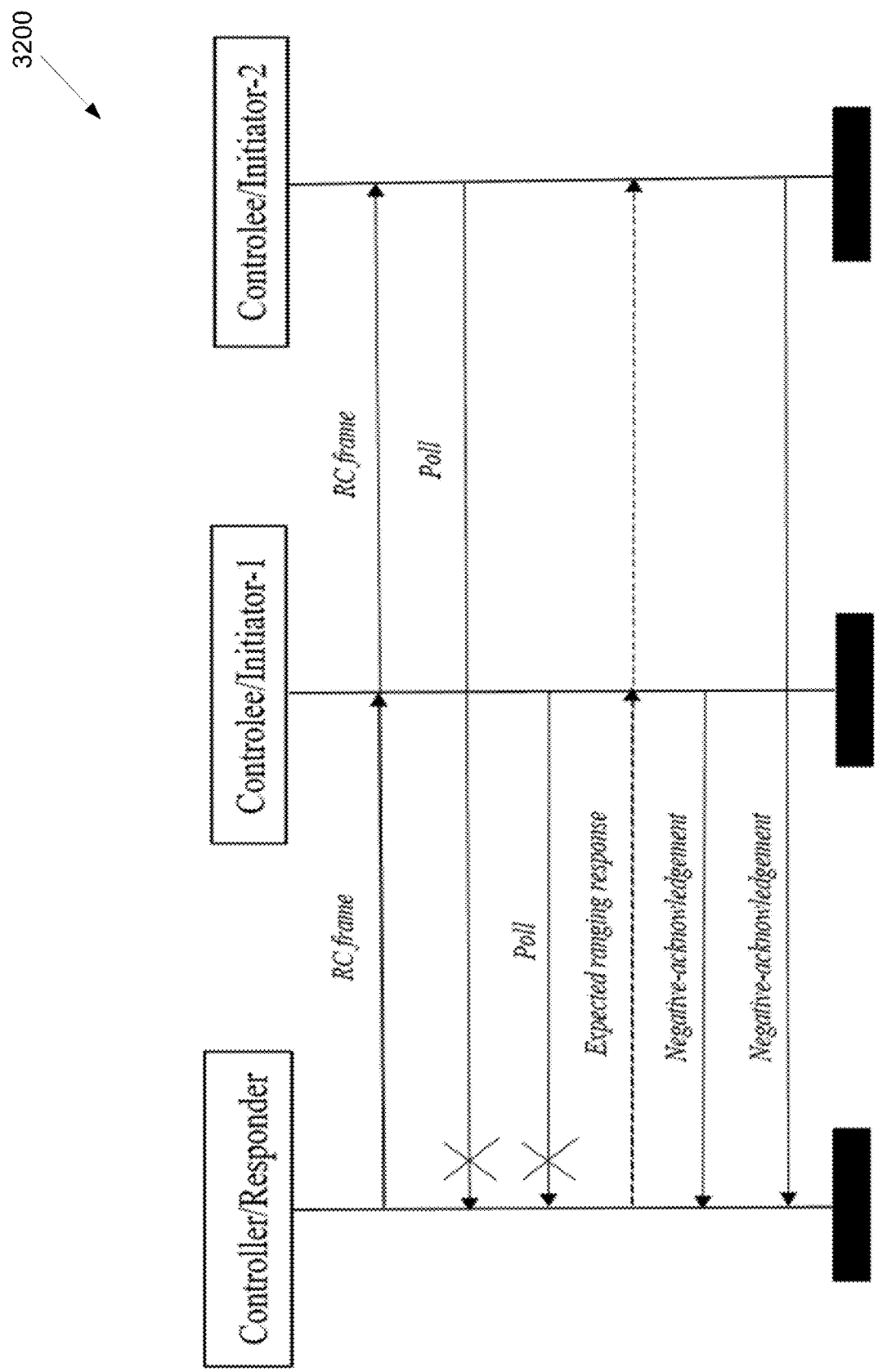
FIG. 32 illustrates an example message exchange chart for DS-TWR with one responder and multiple initiators: controller is ranging responder according to embodiments of the present disclosure.

FIG. 32 illustrates an example message exchange chart 3200 for DS-TWR with one responder and multiple initiators: controller is ranging responder according to embodiments of the present disclosure, as may be performed by an electronic device (e.g., 111-116 and/or 101-103 as illustrated in FIGS. 1 and 500 as illustrated in FIG. 5). The embodiment of the message exchange chart 3200 illustrated in FIG. 32 is for illustration only and may be used in the electronic device as illustrated in FIG. 5. FIG. 32 does not limit the scope of the present disclosure to any particular implementation.

As illustrated in FIG. 32, DS-TWR with three messages (See FIG. 8) is implemented for the use case with one responder and two initiators, where a controller acts as a responder. After receiving RC frame, two ranging initiators separately transmit ranging poll in assigned time slots. However, a reception of both ranging poll transmissions fails at the controller/responder side, and the controller/responder remains idle in the time slot where the time slot is supposed to transmit ranging response. Since both controlees do not receive expected ranging response frame from the controller/responder, both controlees can send the negative-acknowledgement frame in assigned time slots for the second ranging poll. Via the received negative-acknowledgement frames, controller knows that ranging failures occur, but transmission of RC frame is successful at both far ends.

Figure 33:
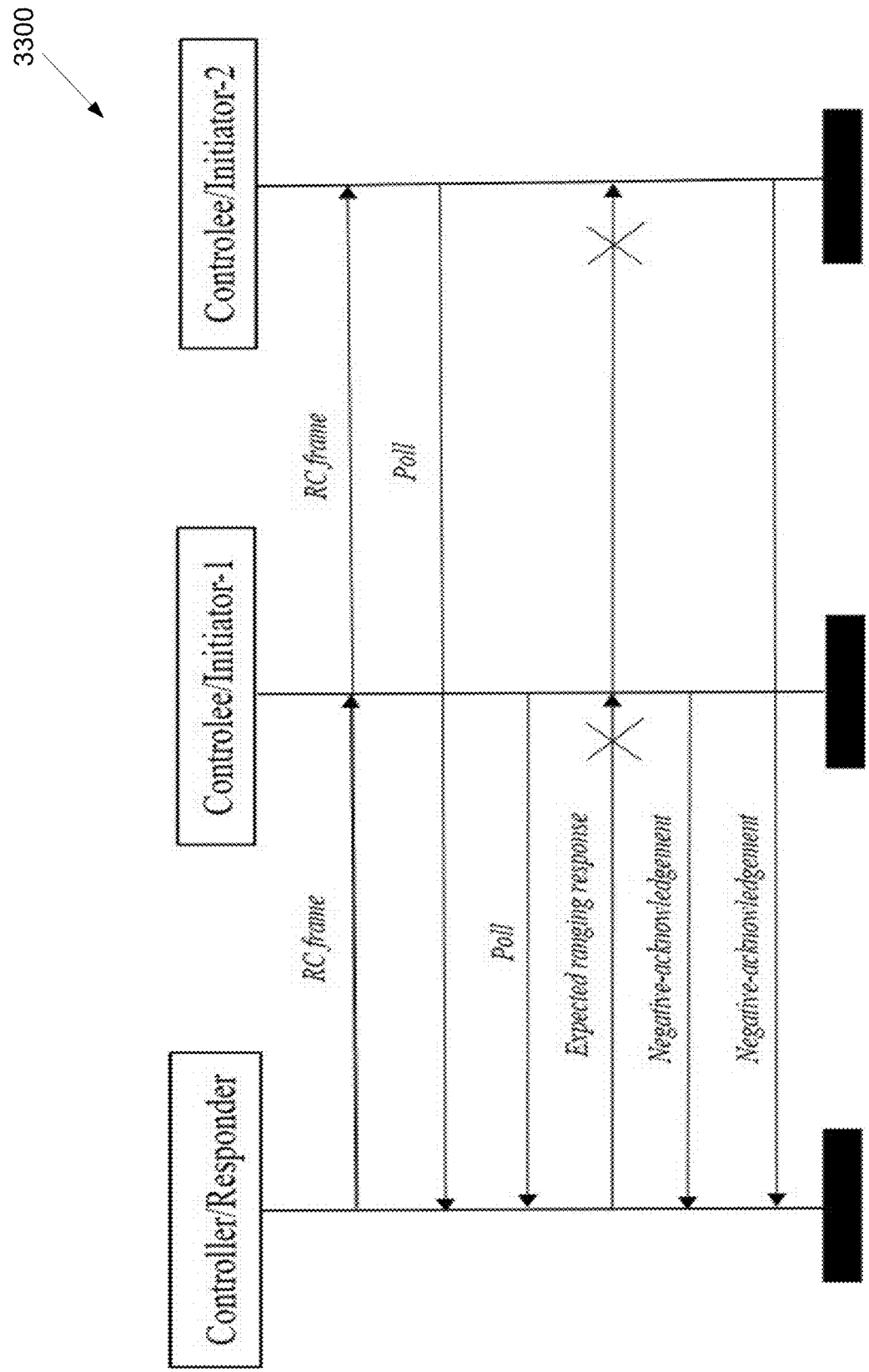
FIG. 33 illustrates an example message exchange chart for DS-TWR with one responder and multiple initiators: controller is ranging responder according to embodiments of the present disclosure.

FIG. 33 illustrates an example message exchange chart 3300 for DS-TWR with one responder and multiple initiators: controller is ranging responder according to embodiments of the present disclosure, as may be performed by an electronic device (e.g., 111-116 and/or 101-103 as illustrated in FIGS. 1 and 500 as illustrated in FIG. 5). The embodiment of the message exchange chart 3300 illustrated in FIG. 33 is for illustration only and may be used in the electronic device as illustrated in FIG. 5. FIG. 33 does not limit the scope of the present disclosure to any particular implementation.

As illustrated in FIG. 33, the receptions of both ranging poll transmissions are successfully at the controller/responder side but the receptions of the corresponding ranging response transmitted by the controller/responder fails at the two ranging initiators/controlees, then the controlees can also send the negative-acknowledgement frame in assigned time slots for the second ranging poll. Via the received negative-acknowledgement frames, controller knows that ranging failures occur, but transmission of RC frame is successful at both far ends.

The current IEEE standard specification only defines an ACK frame, but nothing to convey a negative acknowledgement. The procedures as described in the aforementioned embodiments can be supported with a new definition of the negative acknowledgement frames.

Figure 34:
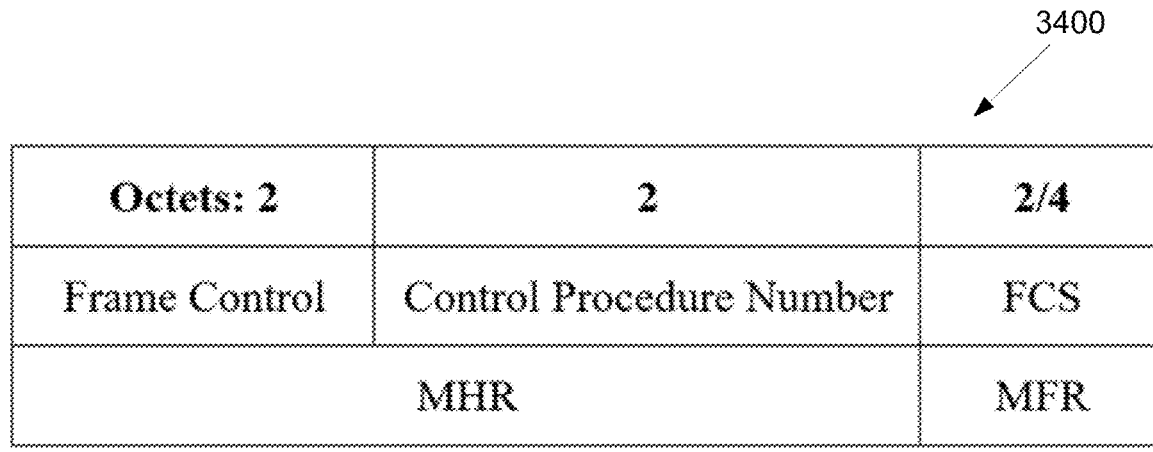
FIG. 34 illustrates an example Type 1 immediate NACK frame format according to embodiments of the present disclosure.

FIG. 34 illustrates an example Type 1 immediate NACK frame format 3400 according to embodiments of the present disclosure. The embodiment of the Type 1 immediate NACK frame format 3400 illustrated in FIG. 34 is for illustration only and may be used in the electronic device as illustrated in FIG. 5. FIG. 34 does not limit the scope of the present disclosure to any particular implementation.

In one embodiment, a controller and controlee that may be one of nodes in a group 1 and/or group 2 as illustrated in FIG. 6 may use the Type 1 immediate NACK frame format 3400. In one embodiment, an initiator and responder may use the Type 1 immediate NACK frame format 3400.

Figure 35:
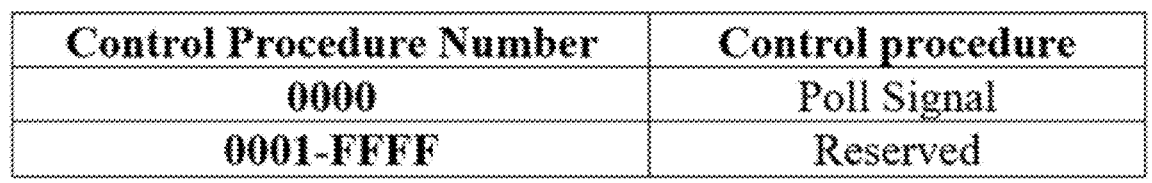
FIG. 35 illustrates an example control procedure number table for which NACK is being sent according to embodiments of the present disclosure.

FIG. 35 illustrates an example control procedure number table 3500 for which NACK is being sent according to embodiments of the present disclosure. The embodiment of the control procedure number table 3500 illustrated in FIG. 35 is for illustration only and may be used in the electronic device as illustrated in FIG. 5. FIG. 35 does not limit the scope of the present disclosure to any particular implementation.

In one embodiment, a controller and controlee that may be one of nodes in a group 1 and/or group 2 as illustrated in FIG. 6 may use the control procedure number table 3500. In one embodiment, an initiator and responder may use the control procedure number table 3500.

In order to fulfil the conveyance of negative acknowledgement (NACK), a short frame for NACK comprising only of MAC header and MAC footer can be used. A Type 1 immediate NACK frame format can be defined as shown in FIGS. 34 and 35.

A frame type value in the frame control field can be used to convey that the frame is a NACK. For example, frame type value of 100 is reserved within the IEEE 802.15.4, which can be used for this purpose.

Figure 36:
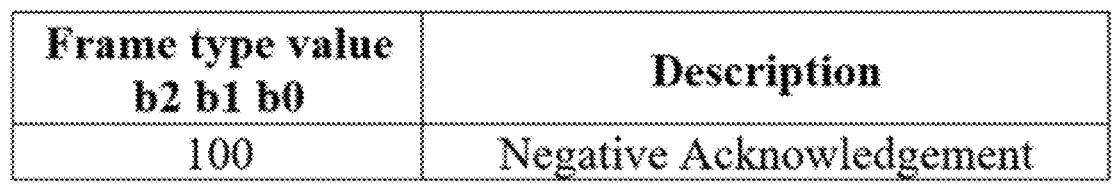
FIG. 36 illustrates an example frame type field in frame control indicating a NACK frame according to embodiments of the present disclosure.

FIG. 36 illustrates an example frame type field 3600 in frame control indicating a NACK frame according to embodiments of the present disclosure. The embodiment of the frame type field 3600 illustrated in FIG. 36 is for illustration only and may be used in the electronic device as illustrated in FIG. 5. FIG. 36 does not limit the scope of the present disclosure to any particular implementation.

In one embodiment, a controller and controlee that may be one of nodes in a group 1 and/or group 2 as illustrated in FIG. 6 may use the frame type field 3600. In one embodiment, an initiator and responder may use the frame type field 3600.

Figure 37:
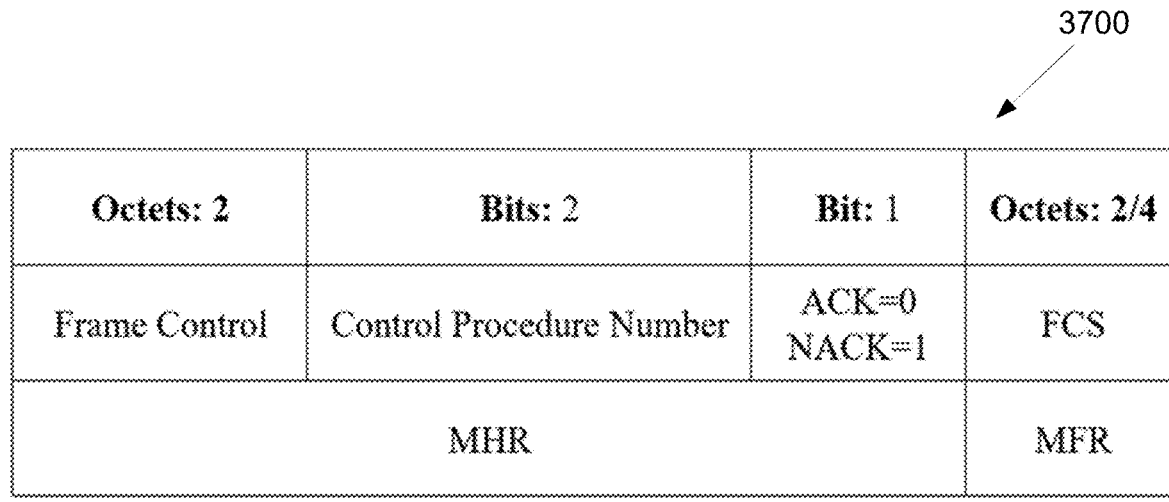
FIG. 37 illustrates an example type 2 immediate NACK frame format according to embodiments of the present disclosure.

FIG. 37 illustrates an example Type 2 immediate NACK frame format 3700 according to embodiments of the present disclosure. The embodiment of the Type 2 immediate NACK frame format 3700 illustrated in FIG. 37 is for illustration only and may be used in the electronic device as illustrated in FIG. 5. FIG. 37 does not limit the scope of the present disclosure to any particular implementation.

In one embodiment, a controller and controlee that may be one of nodes in a group 1 and/or group 2 as illustrated in FIG. 6 may use the Type 2 immediate NACK frame format 3700. In one embodiment, an initiator and responder may use the Type 2 immediate NACK frame format 3700.

Figure 38:
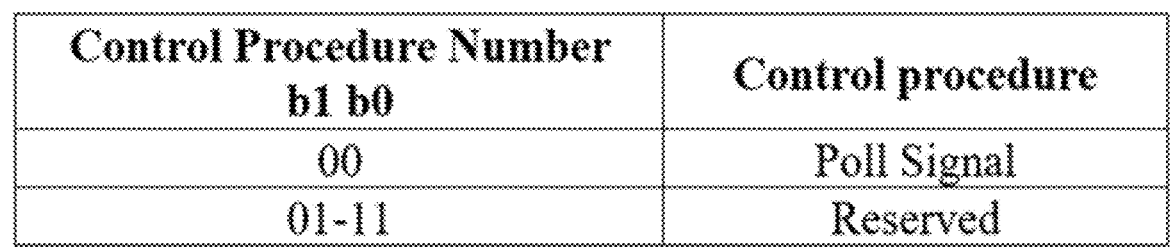
FIG. 38 illustrates an example control procedure number table for which NACK is being sent according to embodiments of the present disclosure.

FIG. 38 illustrates an example control procedure number table 3800 for which NACK is being sent according to embodiments of the present disclosure. The embodiment of the control procedure number table 3800 illustrated in FIG. 38 is for illustration only and may be used in the electronic device as illustrated in FIG. 5. FIG. 38 does not limit the scope of the present disclosure to any particular implementation.

In one embodiment, a controller and controlee that may be one of nodes in a group 1 and/or group 2 as illustrated in FIG. 6 may use the control procedure number table 3800. In one embodiment, an initiator and responder may use the control procedure number table 3800.

A Type 2 immediate NACK frame format can be defined as shown in FIGS. 37 and 38. Additional bits can also be assigned to indicate the control number procedure. This frame can also be used to convey an ACK.

Figure 39:
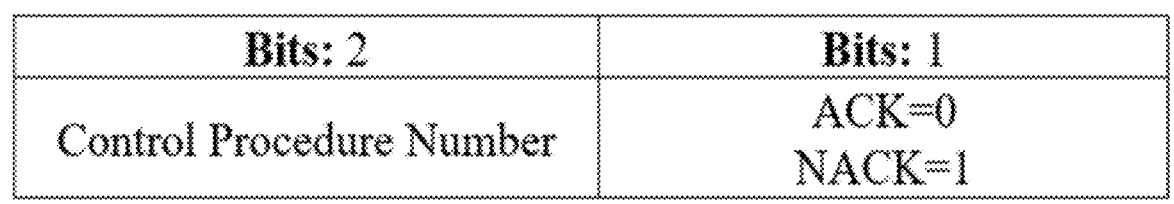
FIG. 39 illustrates an example ranging control procedure acknowledgement (RCPA) IE according to embodiments of the present disclosure.

FIG. 39 illustrates an example ranging control procedure acknowledgement (RCPA) IE 3900 according to embodiments of the present disclosure. The embodiment of the ranging control procedure acknowledgement (RCPA) IE 3900 illustrated in FIG. 39 is for illustration only and may be used in the electronic device as illustrated in FIG. 5. FIG. 39 does not limit the scope of the present disclosure to any particular implementation.

In one embodiment, a controller and controlee that may be one of nodes in a group 1 and/or group 2 as illustrated in FIG. 6 may use the ranging control procedure acknowledgement (RCPA) IE 3900. In one embodiment, an initiator and responder may use the ranging control procedure acknowledgement (RCPA) IE 3900.

The enhanced acknowledgement frame within the IEEE 802.15.4z has provision to include information elements (IEs) as a part of the frame format. A ranging control procedure acknowledgement (RCPA) IE can be defined to convey the ACK or NACK of relevant fields. An example of the IE content field is as shown in FIG. 39. A control procedure number follows the same format as FIG. 38.

Acknowledging the ranging control configuration may not always be required. In one embodiment, a framework is provided through which acknowledgements or negative acknowledgements can be requested.

Figure 40:
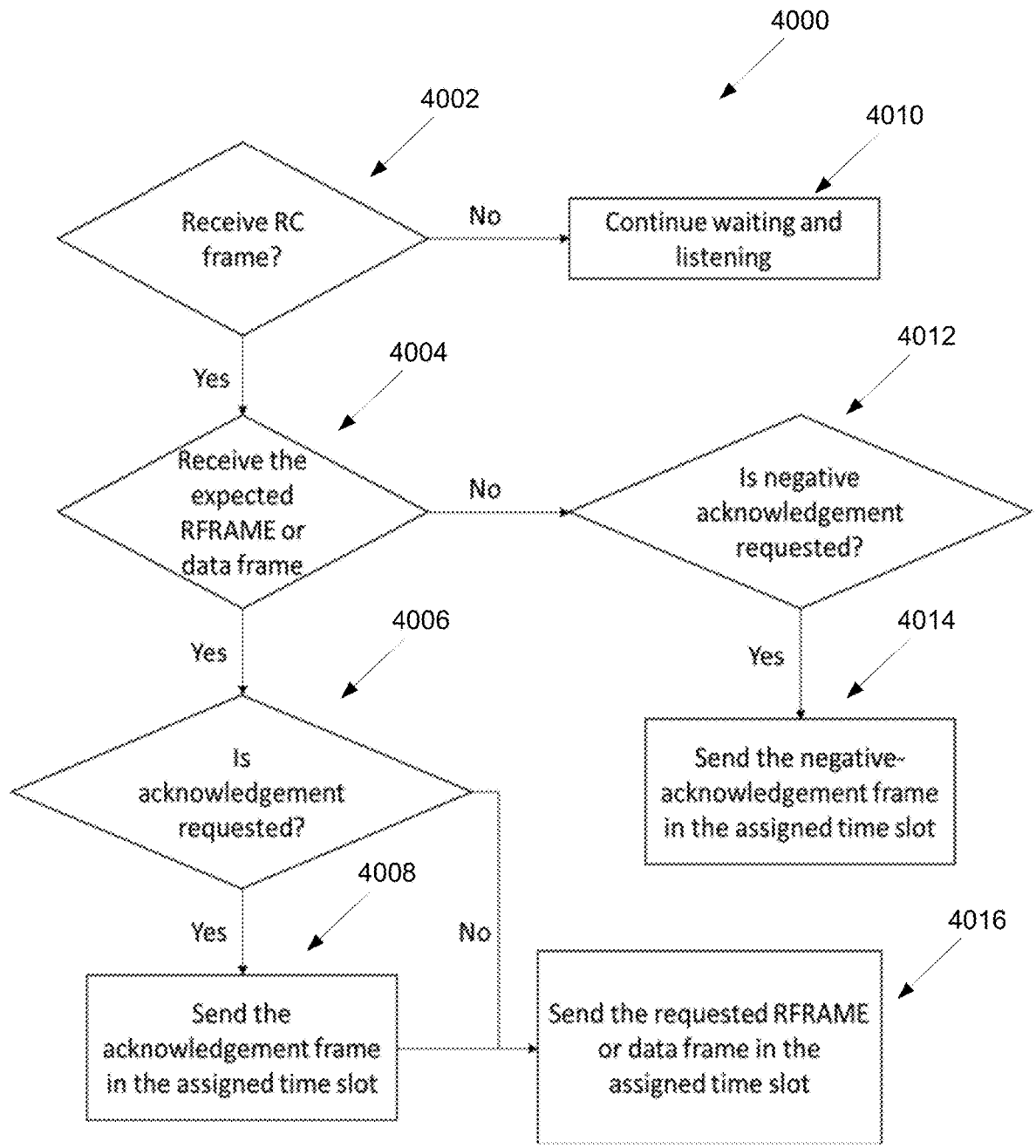
FIG. 40 illustrates a flow chart of a method for determining whether ACK/NACK needs to be sent according to embodiments of the present disclosure.

FIG. 40 illustrates a flow chart of a method 4000 for determining whether ACK/NACK needs to be sent according to embodiments of the present disclosure, as may be performed by an electronic device (e.g., 111-116 and/or 101-103 as illustrated in FIGS. 1 and 500 as illustrated in FIG. 5). The embodiment of the method 4000 illustrated in FIG. 40 is for illustration only and may be used in the electronic device as illustrated in FIG. 5. FIG. 40 does not limit the scope of the present disclosure to any particular implementation.

In one embodiment, a controller and controlee that may be one of nodes in a group 1 and/or group 2 as illustrated in FIG. 6 may use the method 4000. In one embodiment, an initiator and responder may use the method 4000.

The overall procedure for ascertaining whether or not to send the acknowledgement can be accomplished using certain information elements to request the acknowledgement as a part of the RC frame. An example flowchart for this is given in FIG. 40.

Figure 41:
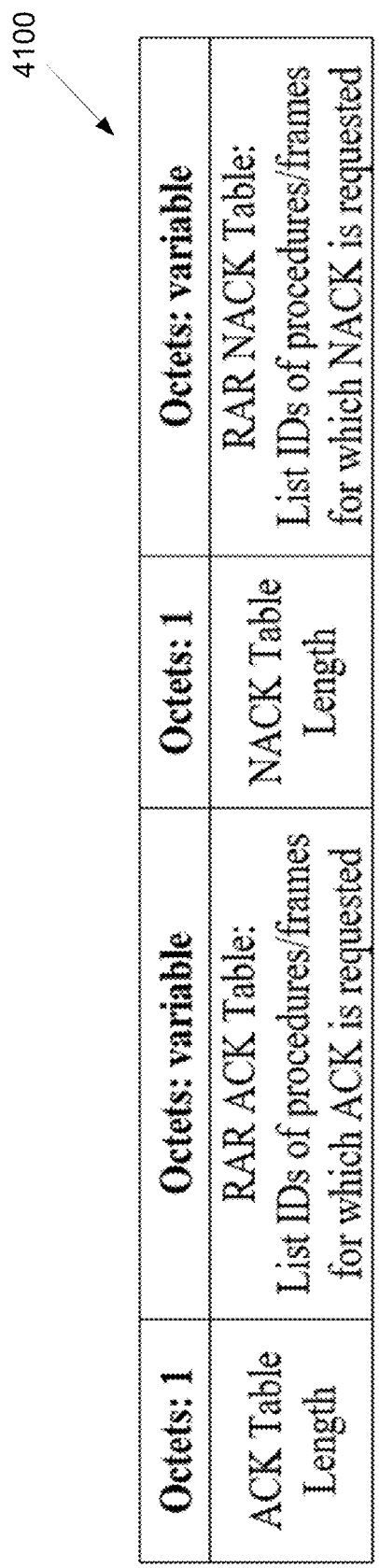
FIG. 41 illustrates an example ranging acknowledgement request (RAR) IE according to embodiments of the present disclosure.

FIG. 41 illustrates an example ranging acknowledgement request (RAR) IE 4100 according to embodiments of the present disclosure. The embodiment of the ranging acknowledgement request (RAR) IE 4100 illustrated in FIG. 41 is for illustration only and may be used in the electronic device as illustrated in FIG. 5. FIG. 41 does not limit the scope of the present disclosure to any particular implementation.

In one embodiment, a controller and controlee that may be one of nodes in a group 1 and/or group 2 as illustrated in FIG. 6 may use the ranging acknowledgement request (RAR) IE 4100. In one embodiment, an initiator and responder may use the ranging acknowledgement request (RAR) IE 4100.

A ranging acknowledgement request (RAR) IE can be formulated as a list of frames and/or procedures for which ACK or NACK is requested. The content field of the IE can be formatted as shown in FIG. 41 and includes number of ACK/NACK requested (indicated by ACK/NACK table length, also gives number of rows of the RAR ACK/NACK table) and the IDs of the procedures/frames.

Figure 42:
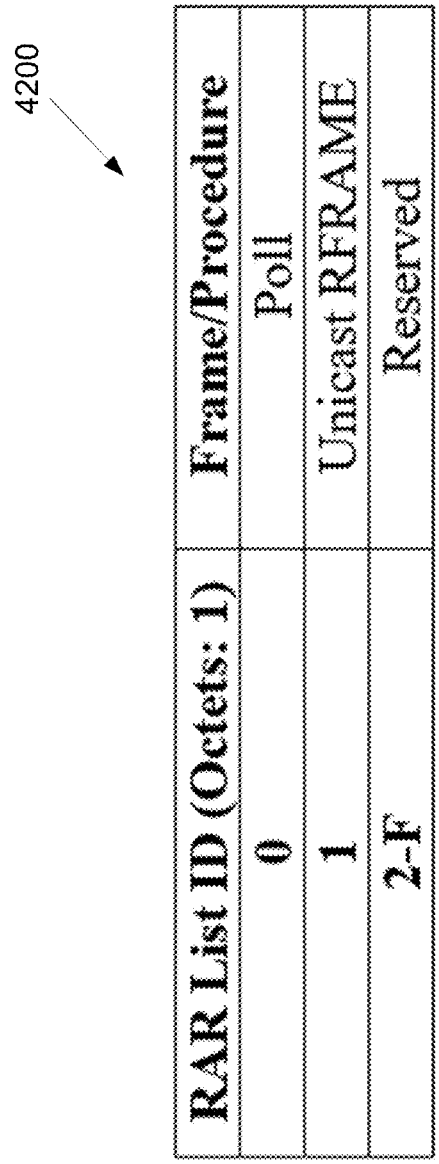
FIG. 42 illustrates an example list from which the required procedures for which ACK/NACK is required can be chosen according to embodiments of the present disclosure.

FIG. 42 illustrates an example list 4200 from which the required procedures for which ACK/NACK is required can be chosen according to embodiments of the present disclosure. The embodiment of the list 4200 illustrated in FIG. 42 is for illustration only and may be used in the electronic device as illustrated in FIG. 5. FIG. 42 does not limit the scope of the present disclosure to any particular implementation.

In one embodiment, a controller and controlee that may be one of nodes in a group 1 and/or group 2 as illustrated in FIG. 6 may use the list 4200. In one embodiment, an initiator and responder may use the list 4200.

The list of ACK and NACK can be chosen from a pre-defined list. The number of octets/bits can be changed within the IE depending on the anticipated list size. An example list is shown in FIG. 42.

Figure 43:
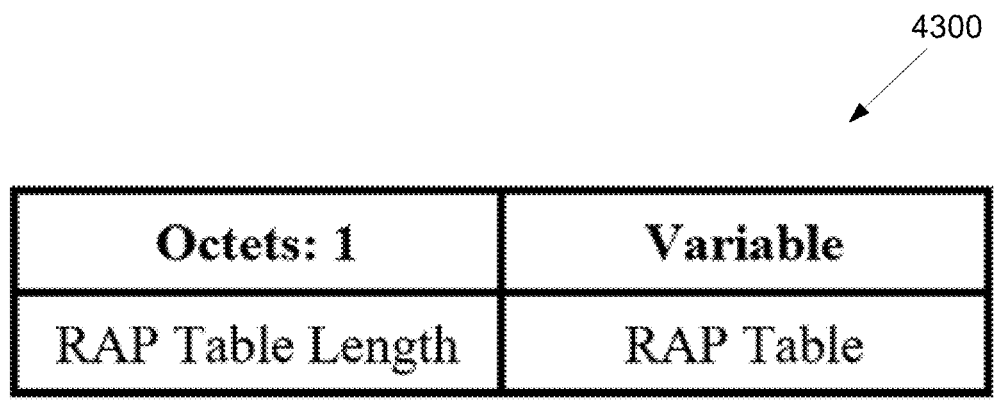
FIG. 43 illustrates an example ranging acknowledgement reply IE content field format according to embodiments of the present disclosure.

FIG. 43 illustrates an example ranging acknowledgement reply IE content field format 4300 according to embodiments of the present disclosure. The embodiment of the ranging acknowledgement reply IE content field format 4300 illustrated in FIG. 43 is for illustration only and may be used in the electronic device as illustrated in FIG. 5. FIG. 43 does not limit the scope of the present disclosure to any particular implementation.

In one embodiment, a controller and controlee that may be one of nodes in a group 1 and/or group 2 as illustrated in FIG. 6 may use the example ranging acknowledgement reply IE content field format 4300. In one embodiment, an initiator and responder may use the example ranging acknowledgement reply IE content field format 4300.

In order to reply for the RAR IE, a new ranging acknowledgement reply (RAP) IE is defined which can be used along with the enhanced acknowledgement IE. The content field of this IE can be formatted as shown in FIG. 43. This includes the field of RAP table and RAP table length. The field of RAP table length indicates the number of rows in the RAP table.

Each row of the RAP table consists of list ID, and one bit to indicate ACK or NACK. For example, ACK=0 and NACK=1.

Figure 44:
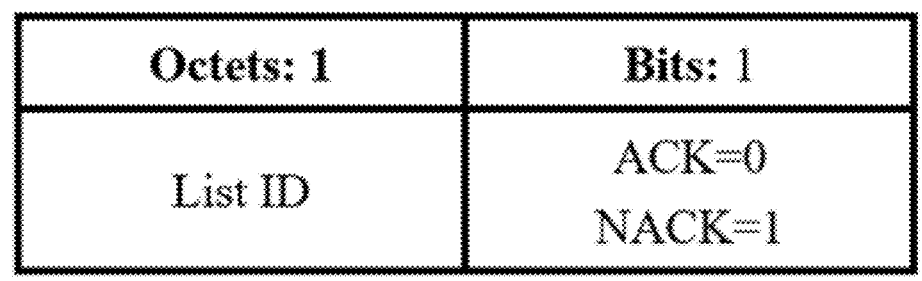
FIG. 44 illustrates an example row of RAP table according to embodiments of the present disclosure.

FIG. 44 illustrates an example row of RAP table 4400 according to embodiments of the present disclosure. The embodiment of the row of RAP table 4400 illustrated in FIG. 44 is for illustration only and may be used in the electronic device as illustrated in FIG. 5. FIG. 44 does not limit the scope of the present disclosure to any particular implementation.

In one embodiment, a controller and controlee that may be one of nodes in a group 1 and/or group 2 as illustrated in FIG. 6 may use the row of RAP table 4400. In one embodiment, an initiator and responder may use the row of RAP table 4400.

Another example of ranging control procedure acknowledgement (RCPA) IE introduced in the aforementioned embodiments can have no content field. RCPA IE may follow the format of nested IE, while other formats of IEEE standard specification, e.g., header IE format, are not precluded.

If a controlee does not receive the expected frame from the controller, as illustrated in FIGS. 41 to 43, the controlee can simply send the RCPA IE without a content field to a controller in a scheduled time slot, or the controlee can contend to transmit RCPA IE in the contention-based ranging. Therefore, the controller can know that ranging failure occurs, but the ranging control message/frame as shown in FIG. 28 and FIGS. 31 to 33, has been exchanged successfully.

Figure 45:
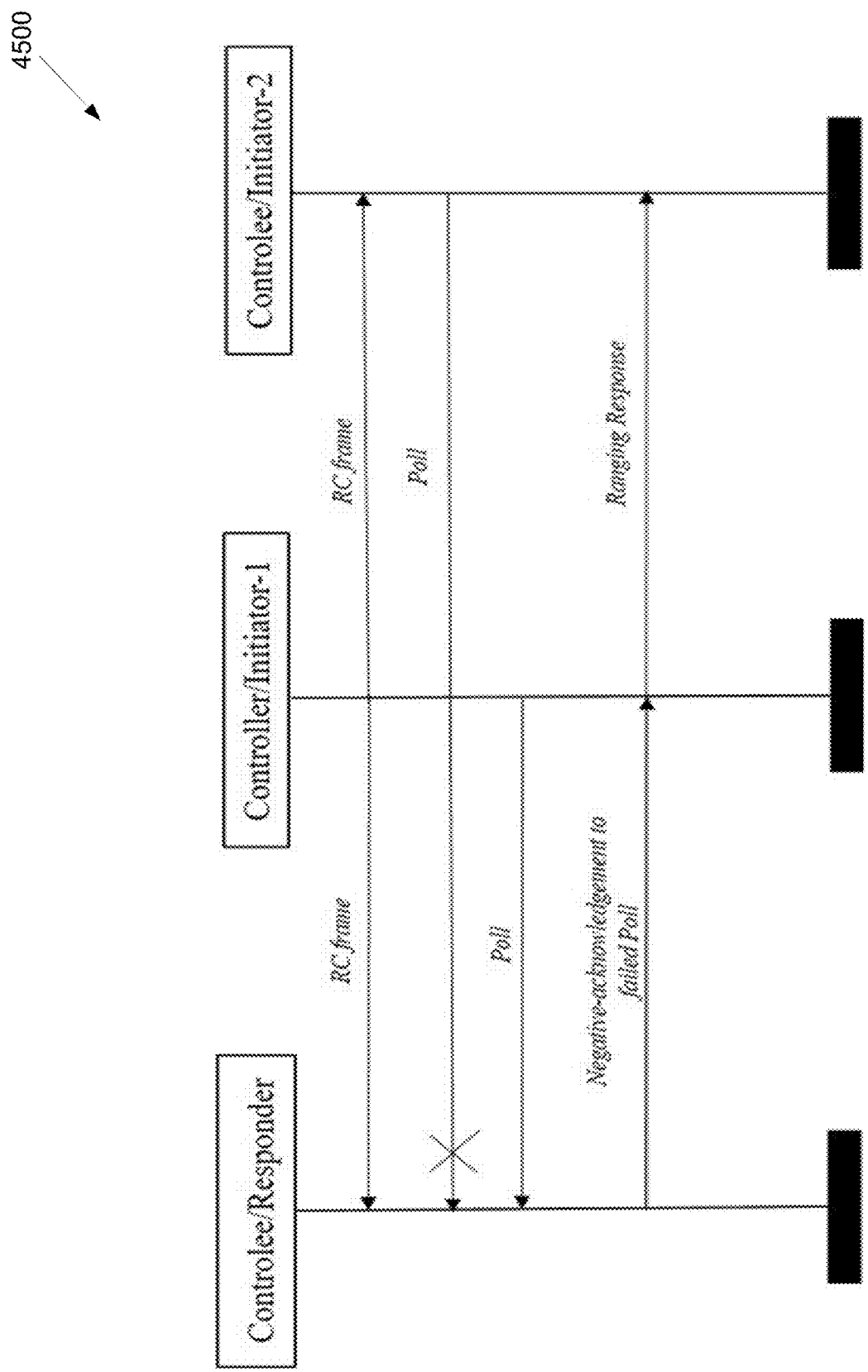
FIG. 45 illustrates an example message exchange chart for negative acknowledgement to failed ranging transmission(s) in a broadcast message according to embodiments of the present disclosure.

FIG. 45 illustrates an example message exchange chart 4500 for negative acknowledgement to failed ranging transmission(s) in a broadcast message according to embodiments of the present disclosure, as may be performed by an electronic device (e.g., 111-116 and/or 101-103 as illustrated in FIGS. 1 and 500 as illustrated in FIG. 5). The embodiment of the message exchange chart 4500 illustrated in FIG. 45 is for illustration only and may be used in the electronic device as illustrated in FIG. 5. FIG. 45 does not limit the scope of the present disclosure to any particular implementation.

In a multi-node ranging, a ranging controlee may expect to receive RFRAMEs from multiple devices as shown in FIG. 45. The poll message from a controller/initiator-1 succeeds, while the poll message from a controlee/initiator-2 fails. In the scheduled time slot for a controlee/responder to broadcast a ranging response message, an RCPA IE with address field of destination(s) which fails to transmit expected message can be conveyed. Therefore, after a ranging round, partial pairs of multi-node ranging may still fulfill a successful ranging cycle, while controller and controlee(s) know the failed ranging pairs of this round.

Figure 46:
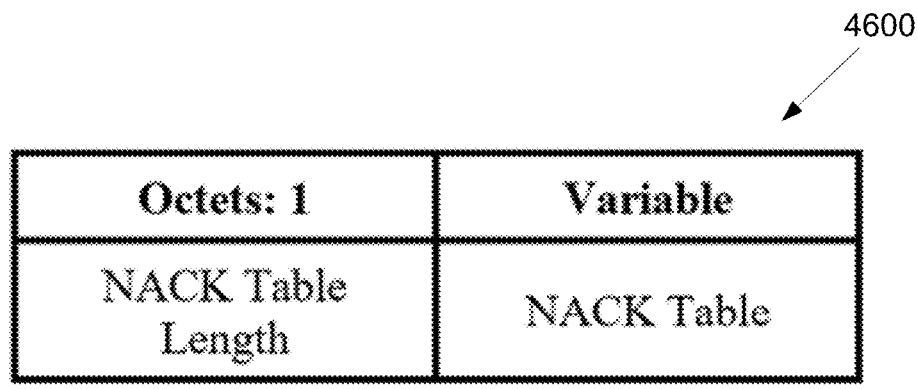
FIG. 46 illustrates an example ranging control procedure acknowledgement (RCPA) IE content field format according to embodiments of the present disclosure.

FIG. 46 illustrates an example ranging control procedure acknowledgement (RCPA) IE content field format 4600 according to embodiments of the present disclosure. The embodiment of the ranging control procedure acknowledgement (RCPA) IE content field format 4600 illustrated in FIG. 46 is for illustration only and may be used in the electronic device as illustrated in FIG. 5. FIG. 46 does not limit the scope of the present disclosure to any particular implementation.

In one embodiment, a controller and controlee that may be one of nodes in a group 1 and/or group 2 as illustrated in FIG. 6 may use the ranging control procedure acknowledgement (RCPA) IE content field format 4600. In one embodiment, an initiator and responder may use the ranging control procedure acknowledgement (RCPA) IE content field format 4600.

Instead of using the RCPA IE without content field, the revised content field format of RCPA IE can include the address fields, so that the revised content field format can fulfill the feature of negative acknowledgement to multiple ranging transmissions from different devices. FIG. 46 illustrates an example of the content field format for the revised RCPA IE.

The field of NACK table length in FIG. 46 denotes the number of devices which failed to transmit expected RFRAME or other data frames to a controlee. Then, this controlee can stack addresses of these devices in the NACK table, form the RCPA IE, and broadcast the NACK table in a scheduled time slot (or contend to transmit for contention-based ranging).

Figure 47:
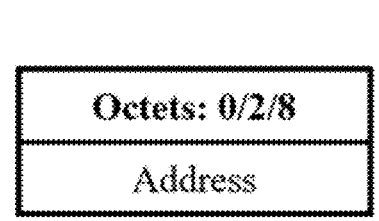
FIG. 47 illustrates an example row/element of NACK table according to embodiments of the present disclosure.

FIG. 47 illustrates an example row/element of NACK table 4700 according to embodiments of the present disclosure. The embodiment of the row/element of NACK table 4700 illustrated in FIG. 47 is for illustration only and may be used in the electronic device as illustrated in FIG. 5. FIG. 47 does not limit the scope of the present disclosure to any particular implementation.

In one embodiment, a controller and controlee that may be one of nodes in a group 1 and/or group 2 as illustrated in FIG. 6 may use the row/element of NACK table 4700. In one embodiment, an initiator and responder may use the row/element of NACK table 4700.

In FIG. 47, the type of address, i.e., 2-octet short address or 8-octet extended address, can be determined by the DstAddrMode in MCPS-DATA.request. RCPA IE format can follow that of nested IE in IEEE standard specification, while other formats, e.g., header IE format, are not precluded.

If a controlee sends this negative acknowledgement message with RCPA IE to the controller, and the destination address field in MHR is filled with the controller address, RCPA IE does not need to contain the address field, and the NACK table length is zero.

If receptions of all expected frames from different devices fail at the controlee, the controlee forms RCPA IE without a content field as described in the aforementioned embodiments, uses the content format as illustrated in FIG. 46, and sets the NACK table length to be zero. Other ranging devices, including ranging controller, receives the broadcast message conveying this RCPA IE, and know that previous ranging transmissions have failed.

Figure 48:
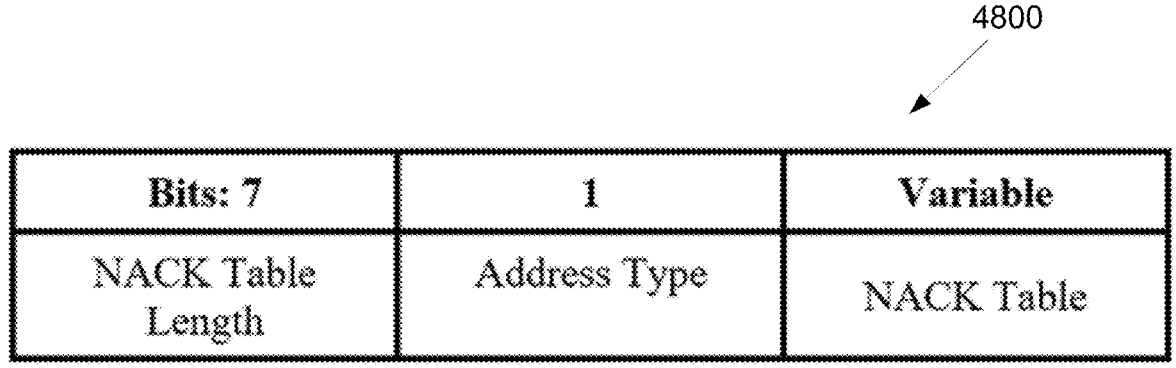
FIG. 48 illustrates an example ranging control procedure acknowledgement (RCPA) IE content field format with address type indicator according to embodiments of the present disclosure.

FIG. 48 illustrates an example ranging control procedure acknowledgement (RCPA) IE content field format with address type indicator 4800 according to embodiments of the present disclosure. The embodiment of the ranging control procedure acknowledgement (RCPA) IE content field format with address type indicator 4800 illustrated in FIG. 48 is for illustration only and may be used in the electronic device as illustrated in FIG. 5. FIG. 48 does not limit the scope of the present disclosure to any particular implementation.

In one embodiment, a controller and controlee that may be one of nodes in a group 1 and/or group 2 as illustrated in FIG. 6 may use the ranging control procedure acknowledgement (RCPA) IE content field format with address type indicator 4800. In one embodiment, an initiator and responder may use the ranging control procedure acknowledgement (RCPA) IE content field format with address type indicator 4800.

Depending on specific implementations, the address type can also be distinguished by an indicator field in the RCPA IE. FIG. 48 illustrates an example of RCPA IE content field format with an address type indicator, while each row of NACK Table remains the same as that of FIG. 47.

When the value of address type field is one, 2-octet short address may be used for each row/element of NACK Table as shown in FIG. 47, otherwise 8-octet extended address may be used. The present disclosure illustrates FIG. 48 as an example of RCPA IE content field format with address type indicator. More bits may be used for the field of address type to distinguish more types of address, which is not precluded.

If ranging devices of a UWB network contains different types of address, e.g., 2-octet short address and 8-octet extended address, then the address type field may be present at the beginning of each row/element of NACK table. The content format of RCPA IE remains the same as that of FIG. 46, while each row/element of NACK table becomes FIG. 49.

Figure 49:
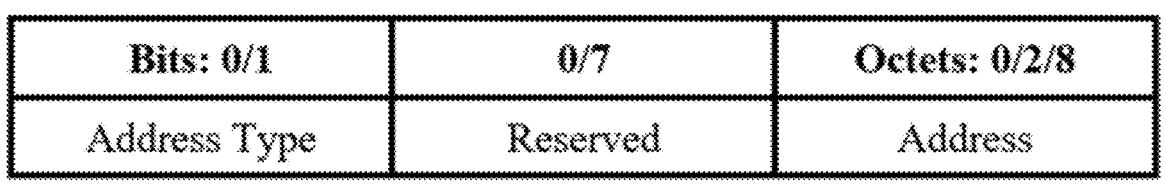
FIG. 49 illustrates an example row/element of NACK table with the address type indicator according to embodiments of the present disclosure.

FIG. 49 illustrates an example row/element of NACK table with the address type indicator 4900 according to embodiments of the present disclosure. The embodiment of the row/element of NACK table with the address type indicator 4900 illustrated in FIG. 49 is for illustration only and may be used in the electronic device as illustrated in FIG. 5. FIG. 49 does not limit the scope of the present disclosure to any particular implementation.

In one embodiment, a controller and controlee that may be one of nodes in a group 1 and/or group 2 as illustrated in FIG. 6 may use the row/element of NACK table with the address type indicator 4900. In one embodiment, an initiator and responder may use the row/element of NACK table with the address type indicator 4900.

When the value of NACK table length is zero, the NACK table is not present in FIG. 46, and also the row of NACK table illustrated in FIG. 49 has no content field. When the NACK table is present, the first bit-field of each row can be used to indicate the address type: with value 1, the address type is 2-octet short address, otherwise the address type is 8-octet extended address, or the vice versa. More bits may be used for the field of address type to distinguish more types of address, which is not precluded by the present disclosure.

FIG. 50 illustrates an example ranging and AOA figure of merit (RAFOM) IE content field format 5000 according to embodiments of the present disclosure. The embodiment of the ranging and AOA figure of merit (RAFOM) IE content field format 5000 illustrated in FIG. 50 is for illustration only and may be used in the electronic device as illustrated in FIG. 5. FIG. 50 does not limit the scope of the present disclosure to any particular implementation.

In one embodiment, a controller and controlee that may be one of nodes in a group 1 and/or group 2 as illustrated in FIG. 6 may use the ranging and AOA figure of merit (RAFOM) IE content field format 5000. In one embodiment, an initiator and responder may use the ranging and AOA figure of merit (RAFOM) IE content field format 5000.

A new IE, namely ranging&AOA figure of merit (RAFOM) IE, to report the angle and/or ranging estimation confidence can also be used to fulfill the function of negative acknowledgement. An example of RAFOM IE content field format is illustrated in FIG. 50.

The first octet, namely ranging FOM value, is used to characterize the accuracy of the timestamp related report, e.g., reply time in RRTD/RRTI IE, round-trip time in RRTM IE. The structure of content fields is similar to that of the ranging FoM in IEEE standard specification. A ranging confidence level (RCL) field can be defined in TABLE 3.

A ranging confidence level specifies the probability that true reply time and/or round-trip time are within the confidence interval centered at the reported value. A ranging confidence interval (RCI) denotes the interval width, which can be defined as TABLE 4 illustrates. The ranging confidence interval scaling factor (RCISF) can be defined as shown in TABLE 5. Consequently, the overall confidence interval equals the multiplication of RCI and RCISF. When ranging FOM extension (RFE) is set to zero, fields of RCL, RCI, and RCISF have the normal meanings given in TABLE 3 to 5. When RFE is set to one, the first octet to report ranging FoM has the meaning given in TABLE 6.

TABLE 3

| Ranging confidence level (RCL) | |
|---|---|
| Confidence level | Bits: 3 |
| No FoM | 000 |
| 20% | 001 |
| 55% | 010 |
| 75% | 011 |
| 85% | 100 |
| 92% | 101 |
| 97% | 110 |
| 99% | 111 |

TABLE 4

| Ranging confidence interval (RCI) | |
|---|---|
| Confidence interval | Bits: 2 |
| 100 ps | 00 |
| 300 ps | 01 |
| 1 ns | 10 |
| 3 ns | 11 |

TABLE 5

| Ranging confidence interval scaling factor (RCISF) | |
|---|---|
| Confidence interval Scaling factor | Bits: 2 |
| Confidence interval × ½ | 00 |
| Confidence interval × 1 | 01 |
| Confidence interval × 2 | 10 |
| Confidence interval × 4 | 11 |

TABLE 6

| Ranging FOM value with extension bit RFE | | | | |
|---|---|---|---|---|
| | RFE | RCISF | RCI | RCL |
| Negative acknowledgement to ranging estimation | 1 | 00 | 00 | 000 |
| Reserved | 1 | Any nonzero value | | |

The second octet in FIG. 50, namely AOA FOM value, is used to characterize the accuracy of the angle-of-arrival (AOA) report, e.g., AOA in ranging AOA report (RAR) IE. The structure of content fields can be similar to that of the ranging FoM in the IEEE standard specification. AOA confidence level (ACL) field can be defined in TABLE 7.

An AOA confidence level specifies the probability that true AOA is within the confidence interval centered at the reported value. AOA confidence interval (ACI) denotes the interval width, which can be defined as illustrated in TABLE 8. The AOA confidence interval scaling factor (ACISF) can be defined as shown in TABLE 9.

Consequently, the overall confidence interval equals the multiplication of ACI and ACISF. When AOA FOM extension (AFE) is set to zero, fields of ACL, ACI, and ACISF have the normal meanings given in TABLE 7 to 9. When AFE is set to one, the second octet to report AOA FoM has the meaning given in TABLE 10.

TABLE 7

AOA confidence level (ACL)

| Confidence level | Bits: 3 |
|---|---|
| No FoM | 000 |
| 20% | 001 |
| 55% | 010 |
| 75% | 011 |
| 85% | 100 |
| 92% | 101 |
| 97% | 110 |
| 99% | 111 |

TABLE 8

AOA confidence interval (ACI)

| Confidence interval | Bits: 2 |
|---|---|
| 1° | 00 |
| 3° | 01 |
| 10° | 10 |
| 15° | 11 |

TABLE 9

AOA confidence interval scaling factor (ACISF)

| Confidence interval Scaling factor | Bits: 2 |
|---|---|
| Confidence interval × ½ | 00 |
| Confidence interval × 1 | 01 |
| Confidence interval × 2 | 10 |
| Confidence interval × 4 | 11 |

TABLE 10

AOA FOM value with extension bit AFE

| | AFE | ACISF | ACI | ACL |
|---|---|---|---|---|
| Negative acknowledgement to AOA estimation | 1 | 00 | 00 | 000 |
| Reserved | 1 | Any nonzero value | | |

Ranging/AOA FOM value "10000000" is used to let the other end know that ranging/AOA estimation fails. Therefore, RAFOM IE can be used as a negative acknowledgement to an expected ranging transmission. For example, as illustrated in FIGS. 31 to 33, a controlee can send RAFOM IE with FOM value "10000000" to negative-acknowledge an expected ranging transmission if failure occurs.

When a value of RFE and/or AFE is not zero, RAFOM IE may be used along with the timestamp-related report and/or AoA report, so that receiver(s) can know the accuracy of these reports. TABLE 3 to 10 are examples of setting for different fields, but TABLE 3 to 10 can also be adjusted for specific use cases and implementations, which are not precluded by the present disclosure.

FIG. 51 illustrates an example ranging and AOA figure of merit (RAFOM) IE content field format with FOM table 5100 according to embodiments of the present disclosure. The embodiment of the ranging and AOA figure of merit (RAFOM) IE content field format with FOM table 5100 illustrated in FIG. 51 is for illustration only and may be used in the electronic device as illustrated in FIG. 5. FIG. 51 does not limit the scope of the present disclosure to any particular implementation.

In one embodiment, a controller and controlee that may be one of nodes in a group 1 and/or group 2 as illustrated in FIG. 6 may use the ranging and AOA figure of merit (RAFOM) IE content field format with FOM table 5100. In one embodiment, an initiator and responder may use the ranging and AOA figure of merit (RAFOM) IE content field format with FOM table 5100.

FIG. 52 illustrates an example row/element of FOM table 5200 according to embodiments of the present disclosure. The embodiment of the row/element of FOM table 5200 illustrated in FIG. 52 is for illustration only and may be used in the electronic device as illustrated in FIG. 5. FIG. 52 does not limit the scope of the present disclosure to any particular implementation.

In one embodiment, a controller and controlee that may be one of nodes in a group 1 and/or group 2 as illustrated in FIG. 6 may use the row/element of FOM table 5200. In one embodiment, an initiator and responder may use the row/element of FOM table 5200.

If a broadcast message conveys timestamp-related report and/or AOA report to different ranging devices, address fields can be included in the RAFOM IE to distinguish different destinations. The revised content field format of RAFOM IE is illustrated in FIGS. 51 and 52.

The value of FOM table length denotes the number of destinations to whom the broadcast message conveying RAFOM IE, timestamp-related reports and/or AOA reports is sent, which equals the number of rows in the FOM table. When the FOM table length is zero, FOM table is not present, but RAFOM IE can still be used as the negative acknowledgement to previous ranging transmission, which is similar to RCPA IE without content field in the aforementioned embodiments.

When an FOM table length is non-zero, and the FOM table is present, FIG. 52 illustrates an example of each row/element of FOM table. The first octet is used to control the address presence and address type. If a field of address presence (AP) is one, an address field is present, otherwise the address field is not. Address type (AT) field indicates the type of following address field: when AT value is 1, the 2-octet short address is used, otherwise 8-octet extended address is used. If the address type of destinations can be specified by DstAddrMode of MCPS-DATA.request as illustrated in IEEE standard specification, the first octet to control address field in FIG. 52 can be removed. Fields after the address field are the same as those of FIG. 50.

FIG. 53 illustrates another example row/element of FOM table 5300 according to embodiments of the present disclosure. The embodiment of the row/element of FOM table 5300 illustrated in FIG. 53 is for illustration only and may be used in the electronic device as illustrated in FIG. 5. FIG. 53 does not limit the scope of the present disclosure to any particular implementation.

In one embodiment, a controller and controlee that may be one of nodes in a group 1 and/or group 2 as illustrated in FIG. 6 may use the row/element of FOM table 5300. In one embodiment, an initiator and responder may use the row/element of FOM table 5300.

With the first octet field to control address field, two of reserved bits can be used to indicate the presence of ranging FOM and AOA FOM. The revised row/element of FOM table is illustrated in FIG. 53.

Compared to FIG. 52, FIG. 53 introduces two additional bit fields, i.e., ranging FOM presence (RFP) and AOA FOM presence (AFP). When value of RFP is 1, the ranging FOM is present, including RFE, RCISF, RCI, and RCL, otherwise these fields are not present. When value of AFP is 1, AOA FOM is present, including AFE, ACISF, ACI, and ACL, otherwise these fields are not present.

Figure 54:
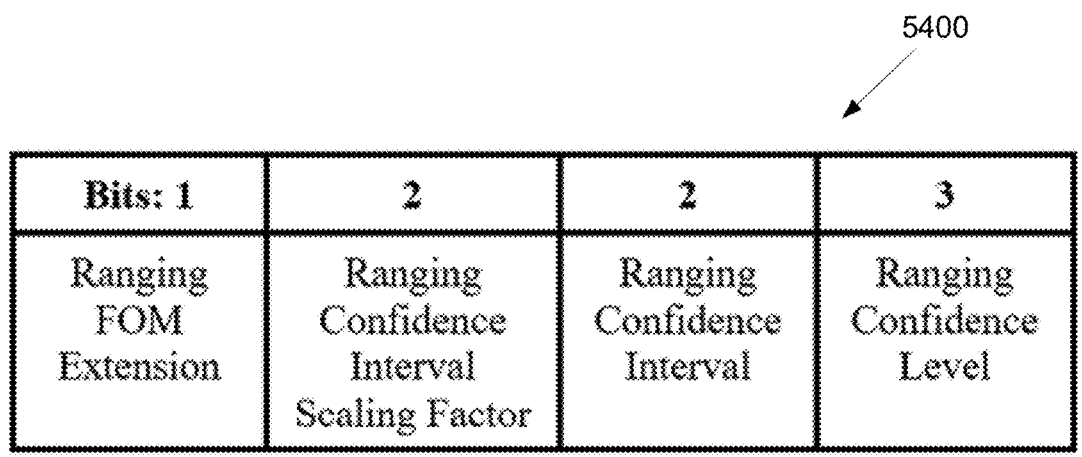
FIG. 54 illustrates an example ranging figure of merit (RFOM) IE content field format according to embodiments of the present disclosure.

FIG. 54 illustrates an example ranging figure of merit (RFOM) IE content field format 5400 according to embodiments of the present disclosure. The embodiment of the example ranging figure of merit (RFOM) IE content field format 5400 illustrated in FIG. 54 is for illustration only and may be used in the electronic device as illustrated in FIG. 5. FIG. 54 does not limit the scope of the present disclosure to any particular implementation.

In one embodiment, a controller and controlee that may be one of nodes in a group 1 and/or group 2 as illustrated in FIG. 6 may use the ranging figure of merit (RFOM) IE content field format 5400. In one embodiment, an initiator and responder may use the ranging figure of merit (RFOM) IE content field format 5400.

If only ranging FOM is supported by particular use cases and implementations, the RAFOM is reduced to ranging figure of merit (RFOM) IE. An example of RFOM IE's content field can be found in FIG. 54, where definitions of fields are the same as those in FIG. 50.

Figure 55:
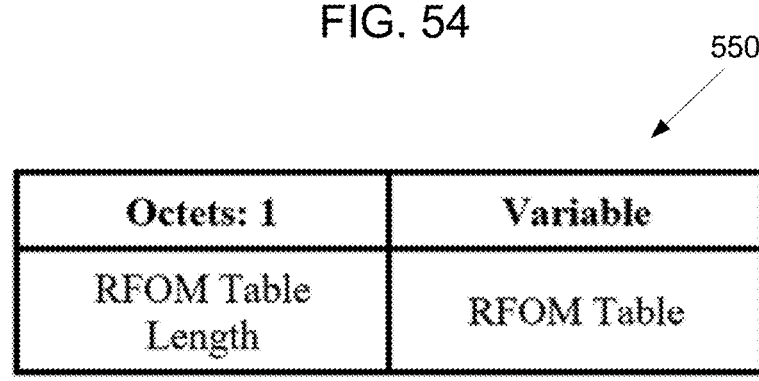
FIG. 55 illustrates an example ranging figure of merit (RFOM) IE content field format with RFOM table according to embodiments of the present disclosure.

To send the FOM report to multiple destinations in a broadcast message, a ranging FOM table can be used to stack multiple FOM reports, which is similar to FIG. 51. FIG. 55 illustrates an example of RFOM IE content field format with the RFOM table.

FIG. 55 illustrates an example ranging figure of merit (RFOM) IE content field format with RFOM 5 table 5500 according to embodiments of the present disclosure. The embodiment of the ranging figure of merit (RFOM) IE content field format with RFOM 5 table 5500 illustrated in FIG. 55 is for illustration only and may be used in the electronic device as illustrated in FIG. 5. FIG. 55 does not limit the scope of the present disclosure to any particular implementation.

In one embodiment, a controller and controlee that may be one of nodes in a group 1 and/or group 2 as illustrated in FIG. 6 may use the ranging figure of merit (RFOM) IE content field format with RFOM 5 table 5500. In one embodiment, an initiator and responder may use the ranging figure of merit (RFOM) IE content field format with RFOM 5 table 5500.

Figure 56:
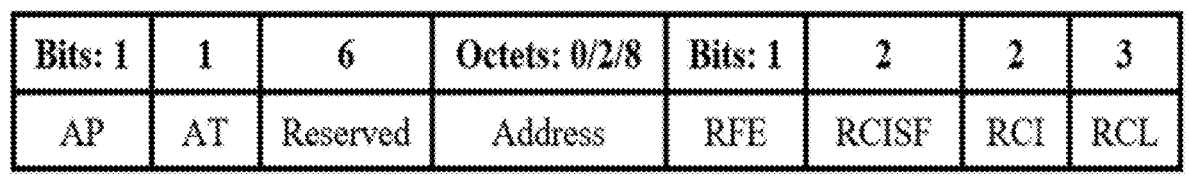
FIG. 56 illustrates an example row/element of RFOM table according to embodiments of the present disclosure.

FIG. 56 illustrates an example row/element of RFOM table 5600 according to embodiments of the present disclosure. The embodiment of the row/element of RFOM table 5600 illustrated in FIG. 56 is for illustration only and may be used in the electronic device as illustrated in FIG. 5. FIG. 56 does not limit the scope of the present disclosure to any particular implementation.

In one embodiment, a controller and controlee that may be one of nodes in a group 1 and/or group 2 as illustrated in FIG. 6 may use the row/element of RFOM table 5600. In one embodiment, an initiator and responder may use the row/element of RFOM table 5600.

FIG. 57 illustrates another example row/element of RFOM table 5700 according to embodiments of the present disclosure. The embodiment of the row/element of RFOM table 5700 illustrated in FIG. 57 is for illustration only and may be used in the electronic device as illustrated in FIG. 5. FIG. 57 does not limit the scope of the present disclosure to any particular implementation.

In one embodiment, a controller and controlee that may be one of nodes in a group 1 and/or group 2 as illustrated in FIG. 6 may use the row/element of RFOM table 5700. In one embodiment, an initiator and responder may use the row/element of RFOM table 5700.

FIG. 56 and FIG. 57 illustrate two examples for the row/element of RFOM table. The definitions of fields are the same as those in the FIG. 52 and FIG. 53.

FIG. 58 illustrates an example AOA figure of merit (AFOM) IE content field format 5800 according to embodiments of the present disclosure. The embodiment of the AOA figure of merit (AFOM) IE content field format 5800 illustrated in FIG. 58 is for illustration only and may be used in the electronic device as illustrated in FIG. 5. FIG. 58 does not limit the scope of the present disclosure to any particular implementation.

In one embodiment, a controller and controlee that may be one of nodes in a group 1 and/or group 2 as illustrated in FIG. 6 may use the AOA figure of merit (AFOM) IE content field format 5800. In one embodiment, an initiator and responder may use the AOA figure of merit (AFOM) IE content field format 5800.

If only AOA FOM is supported by particular use cases and implementations, the RAFOM is reduced to AOA figure of merit (AFOM) IE. An example of AFOM IE's content field can be found in FIG. 58, where definitions of fields are the same as those in FIG. 50.

FIG. 59 illustrates an example AOA figure of merit (AFOM) IE content field format with AFOM table 5900 according to embodiments of the present disclosure. The embodiment of the AOA figure of merit (AFOM) IE content field format with AFOM table 5900 illustrated in FIG. 59 is for illustration only and may be used in the electronic device as illustrated in FIG. 5. FIG. 59 does not limit the scope of the present disclosure to any particular implementation.

In one embodiment, a controller and controlee that may be one of nodes in a group 1 and/or group 2 as illustrated in FIG. 6 may use the AOA figure of merit (AFOM) IE content field format with AFOM table 5900. In one embodiment, an initiator and responder may use the AOA figure of merit (AFOM) IE content field format with AFOM table 5900.

To send the FOM report to multiple destinations in a broadcast message, a ranging FOM table can be used to stack multiple FOM reports, which is similar to FIG. 51. FIG. 59 illustrates an example of AFOM IE content field format with the AFOM table.

FIG. 60 illustrates an example row/element of AFOM table 6000 according to embodiments of the present disclosure. The embodiment of the row/element of AFOM table 6000 illustrated in FIG. 60 is for illustration only and may be used in the electronic device as illustrated in FIG. 5. FIG. 60 does not limit the scope of the present disclosure to any particular implementation.

In one embodiment, a controller and controlee that may be one of nodes in a group 1 and/or group 2 as illustrated in FIG. 6 may use the row/element of AFOM table 6000. In one embodiment, an initiator and responder may use the row/element of AFOM table 6000.

FIG. 61 illustrates another example row/element of AFOM table 6100 according to embodiments of the present disclosure. The embodiment of the row/element of AFOM table 6100 illustrated in FIG. 61 is for illustration only and may be used in the electronic device as illustrated in FIG. 5. FIG. 61 does not limit the scope of the present disclosure to any particular implementation.

In one embodiment, a controller and controlee that may be one of nodes in a group 1 and/or group 2 as illustrated in FIG. 6 may use the row/element of AFOM table 6100. In one embodiment, an initiator and responder may use the row/element of AFOM table 6100.

FIG. 60 and FIG. 61 illustrate two examples for the row/element of AFOM table. The definitions of fields are the same as those in the FIG. 52 and FIG. 53.

The IEEE 802.15.4z may support four different PPDU formats with different STS packet configurations, i.e., SP0, SP1, SP2, and SP3. Newly defined IEs, i.e., RCPA IE and FOM related IEs (RAFOM, RFOM, AFOM IE), can be inserted in an RFRAME based on PPDU format SP0/SP1/SP2 to negative-acknowledge expected ranging transmission(s) if failure occurs.

However, for SP3 ranging, RFRAME does not include MAC header and payload. IEs for negative-acknowledgement, timestamp-related report, AOA report, and FOM report, may be inserted in the data frame with SP0/SP1/SP2 PPDU format in the data period/measurement report phase as illustrated in FIG. 27.

Figure 62:
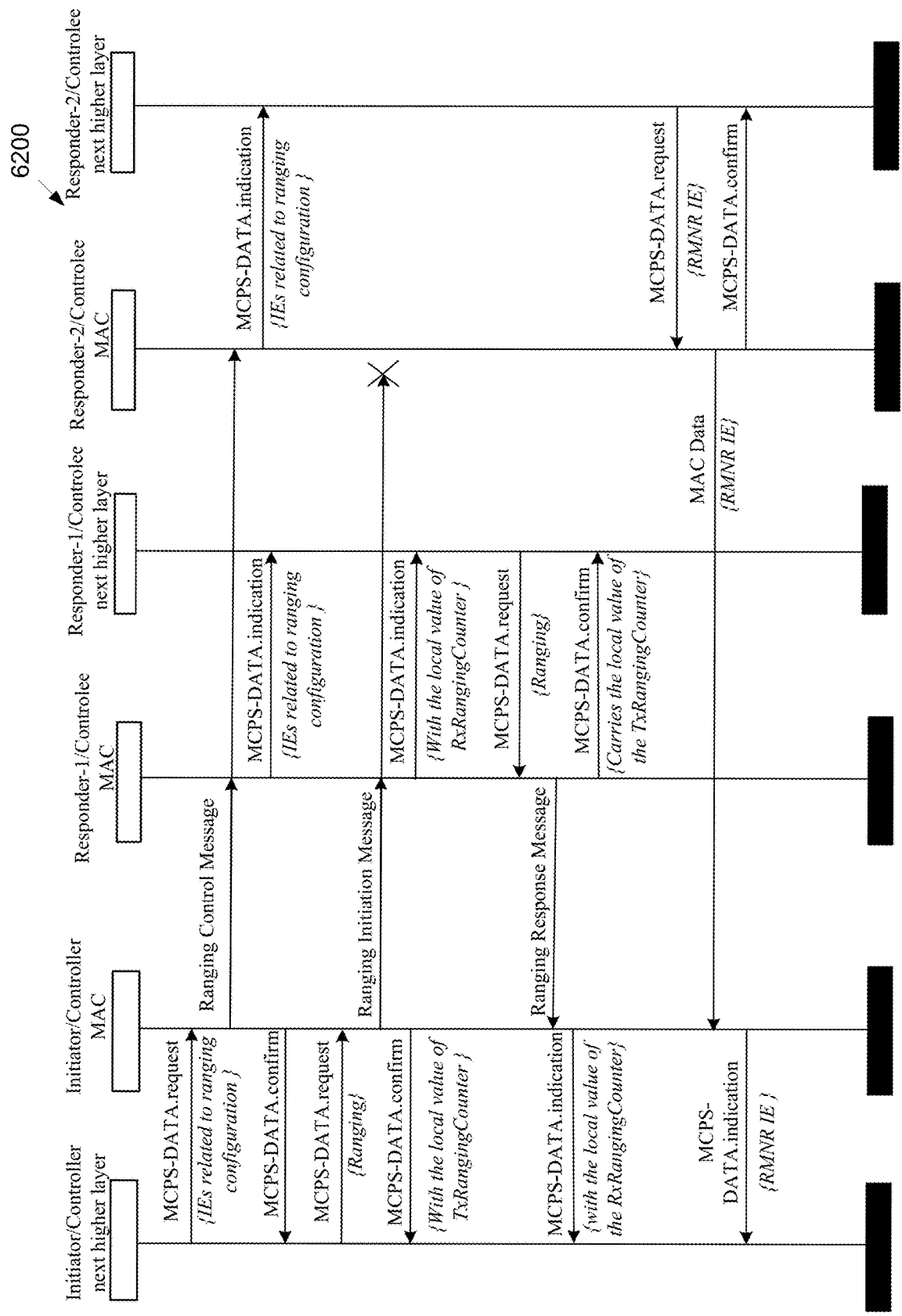
FIG. 62 illustrates an example message sequence chart for the negative acknowledgement/confirmation of failed ranging transmission(s) according to embodiments of the present disclosure.

FIG. 62 illustrates an example message sequence chart 6200 for the negative acknowledgement/confirmation of failed ranging transmission(s) according to embodiments of the present disclosure, as may be performed by an electronic device (e.g., 111-116 and/or 101-103 as illustrated in FIGS. 1 and 500 as illustrated in FIG. 5). The embodiment of the message sequence chart 6200 illustrated in FIG. 62 is for illustration only and may be used in the electronic device as illustrated in FIG. 5. FIG. 62 does not limit the scope of the present disclosure to any particular implementation.

In one embodiment, an example of message sequence chart is illustrated for the negative acknowledgement of ranging transmission(s) as shown in FIG. 62. The present disclosure does not preclude other semantics of the IEs to fulfill this functionality.

In the aforementioned embodiments, RCPA, RAFOM, RFOM, AFOM IEs can be used to report negative acknowledgement/confirmation of expected RFRAMEs. RAFOM, RFOM, AFOM IEs can also be used to report the quality of the estimation result, i.e., ranging and/or AOA. In FIG. 62, ranging message non-receipt IE (RMNR IE) is used. A content field format can be one of the examples illustrated before for the RCPA, RAFOM, RFOM, or AFOM IE.

Similar to the procedure exhibited in FIG. 31, responders/controlees receive the ranging control message (RCM) broadcast from the controller, which fulfills the ranging configuration. However, some controlees may not receive one or more expected RFRAMEs in the scheduling-based ranging. The controlees can send the negative acknowledgement/confirmation to the controller/initiator. Then, the controller knows that ranging failure occur at particular responders/controlees. Moreover, this negative acknowledgement/confirmation also implicitly let the controller know that the RCM has been exchanged successfully, and the time structure (as illustrated in FIGS. 25, 26, and 27A) is known by these responders/controlees.

For the SS-TWR, one ranging round contains a PP and an RRP. For the DS-TWR with three messages, one ranging round contains a first PP, an RRP, and a second PP. Each period includes one or more time slots, where transmissions from initiator(s)/responder(s) can be scheduled as determined by the next higher layer or the initiator(s)/responder(s) can contend time slots in the corresponding periods, respectively.

Figure 63:
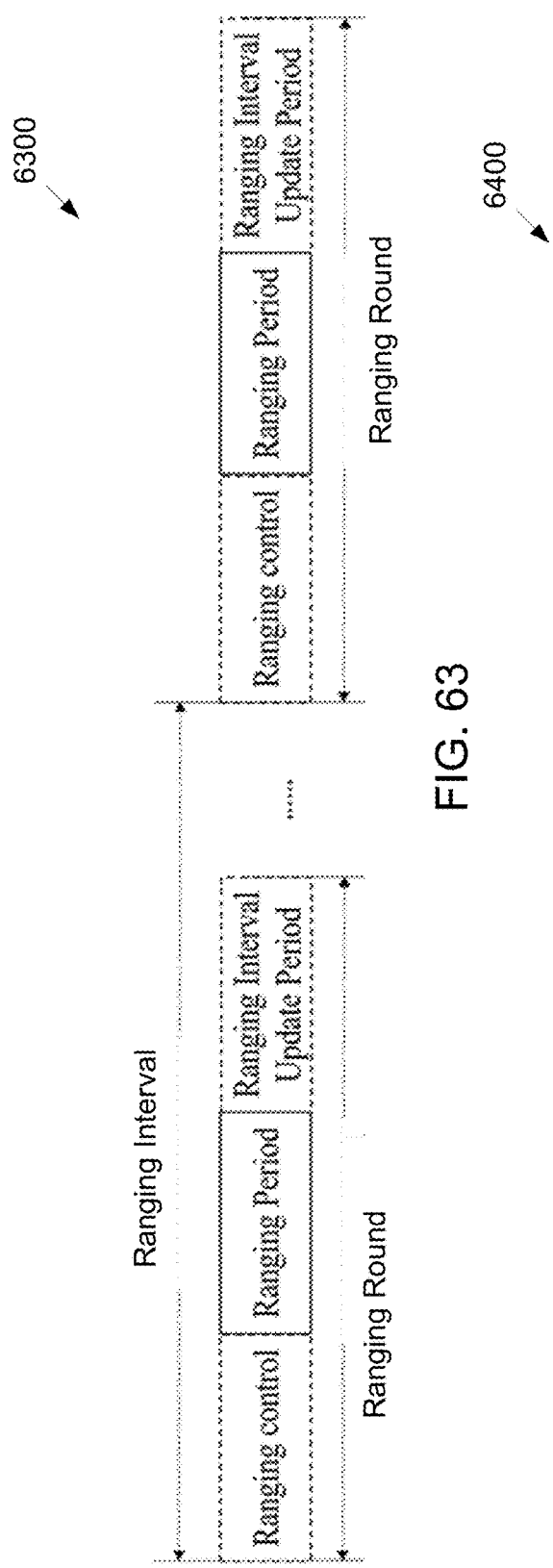
FIG. 63 illustrates an example scheduled ranging rounds with ranging interval update period according to embodiments of the present disclosure.

FIG. 63 illustrates an example scheduled ranging rounds with ranging interval update period 6300 according to embodiments of the present disclosure. The embodiment of the scheduled ranging rounds with ranging interval update period 6300 illustrated in FIG. 63 is for illustration only and may be used in the electronic device as illustrated in FIG. 5. FIG. 63 does not limit the scope of the present disclosure to any particular implementation.

In one embodiment, a controller and controlee that may be one of nodes in a group 1 and/or group 2 as illustrated in FIG. 6 may use the scheduled ranging rounds with ranging interval update period 6300. In one embodiment, an initiator and responder may use the scheduled ranging rounds with ranging interval update period 6300.

Besides the control IEs to adjust the ranging configuration in the RC frame, the scheduled time of next ranging round can be a separate payload IE or payload field in the RC frame. Ranging interval can be defined as the relative time between the start of the next ranging round and the start of the current ranging round as illustrated in FIG. 63. After the ranging period, the controller can adjust the ranging interval by sending an update IE to all controlees in the ranging interval update period (RIUP).

Figure 64:
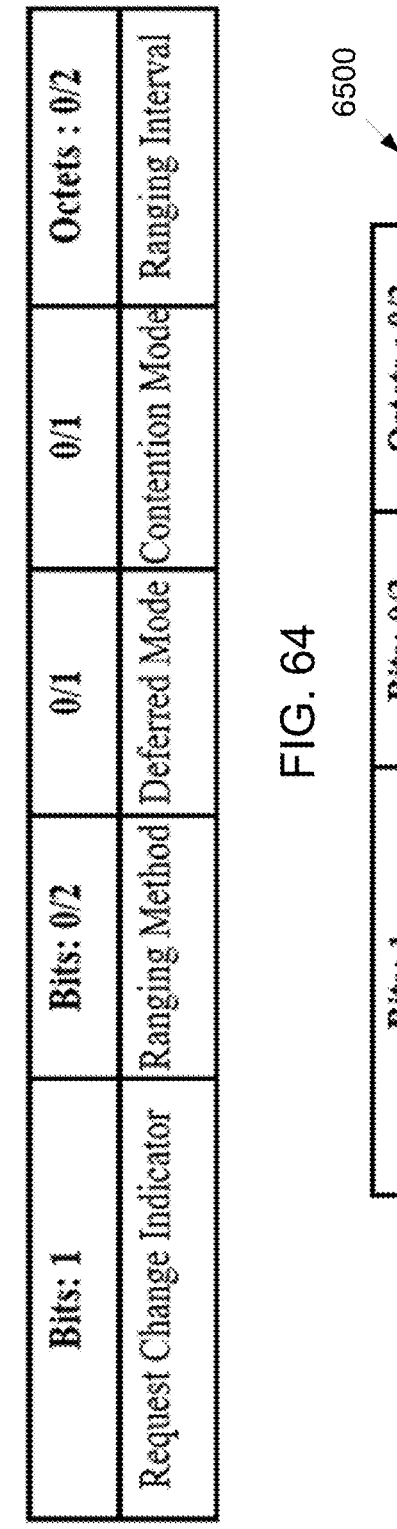
FIG. 64 illustrates an example RCR IE content fields according to embodiments of the present disclosure.

FIG. 64 illustrates an example RCR IE content fields 6400 according to embodiments of the present disclosure. The embodiment of the RCR IE content fields 6400 illustrated in FIG. 64 is for illustration only and may be used in the electronic device as illustrated in FIG. 5. FIG. 64 does not limit the scope of the present disclosure to any particular implementation.

In one embodiment, a controller and controlee that may be one of nodes in a group 1 and/or group 2 as illustrated in FIG. 6 may use the RCR IE content fields 6400. In one embodiment, an initiator and responder may use the RCR IE content fields 6400.

Ranging change request (RCR) IE can be used to convey the request from a ranging controlee to a ranging controller. The general IE format can be referred to the IEEE standard specification, which is not restricted by the present disclosure. An example of the content fields of RCR IE is exhibited in FIG. 64.

The first bit is the request change indicator. If the first bit is zero, it means that the controlee who sends this IE agrees with the current ranging configuration and ranging interval setting for the next ranging round, and the following content fields have zero-length. If the request change indicator is one, the controlee sending this IE requests to change the ranging configuration or the ranging interval for the next ranging round, and the preference of the controlee can be found in following content fields. In another example, the controlee transmits the RCR IE if the controlee needs to request change in certain ranging parameters; and does not transmit the RCR IE if the controlee does not need to request change. In this case, the 1 bit "request change indicator" may not be present in the content fields.

The contents for change request can include one or more of ranging method, deferred mode, contention mode and ranging interval. Other contents are also possible.

The field of ranging method occupies 2-bit, where "00" represents the one-way ranging (OWR), "01" represents the SS-TWR, "10" represents the DS-TWR, and "11" is reserved. The present disclosure does not preclude to incorporate more ranging methods, which needs more bits to distinguish.

The deferred mode indicates that the timestamps or angle information are exchanged at the end of the ranging round with one or more data frames instead of inserting them into the ranging frame(s). Depending on capabilities of devices, different UWB ranging devices may or may not use the deferred mode. For the field of deferred mode in the RCR IE, if the field of deferred mode is one, it denotes that the controlee prefers the deferred mode for next ranging round(s); if the field of deferred mode is zero, the controlee prefers to disable the deferred mode for next ranging round(s).

The field of contention mode is an indicator to reflect the preference of contention-based ranging. If the field of contention mode is one, it means that controlee prefers to participate in contention-based ranging for next ranging round(s). If the field of contention mode is zero, a controlee prefers the scheduling-based ranging in next ranging round(s).

The field of ranging interval reflects the controlee preference for scheduled time of next ranging round. In the present disclosure, an example of ranging interval field in the unit of minimum MAC time step, and 2-octet field size is provided. However, other examples of ranging Interval field with different units or field size are not precluded.

Figure 65:
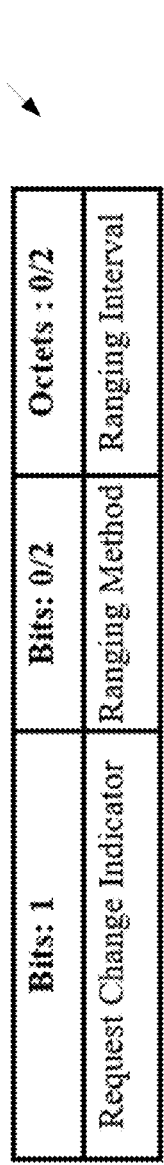
FIG. 65 illustrates another example RCR IE content fields according to embodiments of the present disclosure.

FIG. 65 illustrates another example RCR IE content fields 6500 according to embodiments of the present disclosure. The embodiment of the RCR IE content fields 6500 illustrated in FIG. 65 is for illustration only and may be used in the electronic device as illustrated in FIG. 5. FIG. 65 does not limit the scope of the present disclosure to any particular implementation.

In one embodiment, a controller and controlee that may be one of nodes in a group 1 and/or group 2 as illustrated in FIG. 6 may use the RCR IE content fields 6500. In one embodiment, an initiator and responder may use the RCR IE content fields 6500.

Depending on the capabilities of ranging devices, there can be different variations of RCR IE. A subset of content fields in FIG. 16 can be used to form the RCR IE. For example, FIG. 65 illustrates another example of RCR IE content fields where there are three fields: a ranging change indicator, a ranging method, and a ranging interval. Meanwhile, the present disclosure does not preclude to introduce new content field(s) in FIG. 65 to reflect controlee's other preference.

Figure 66:
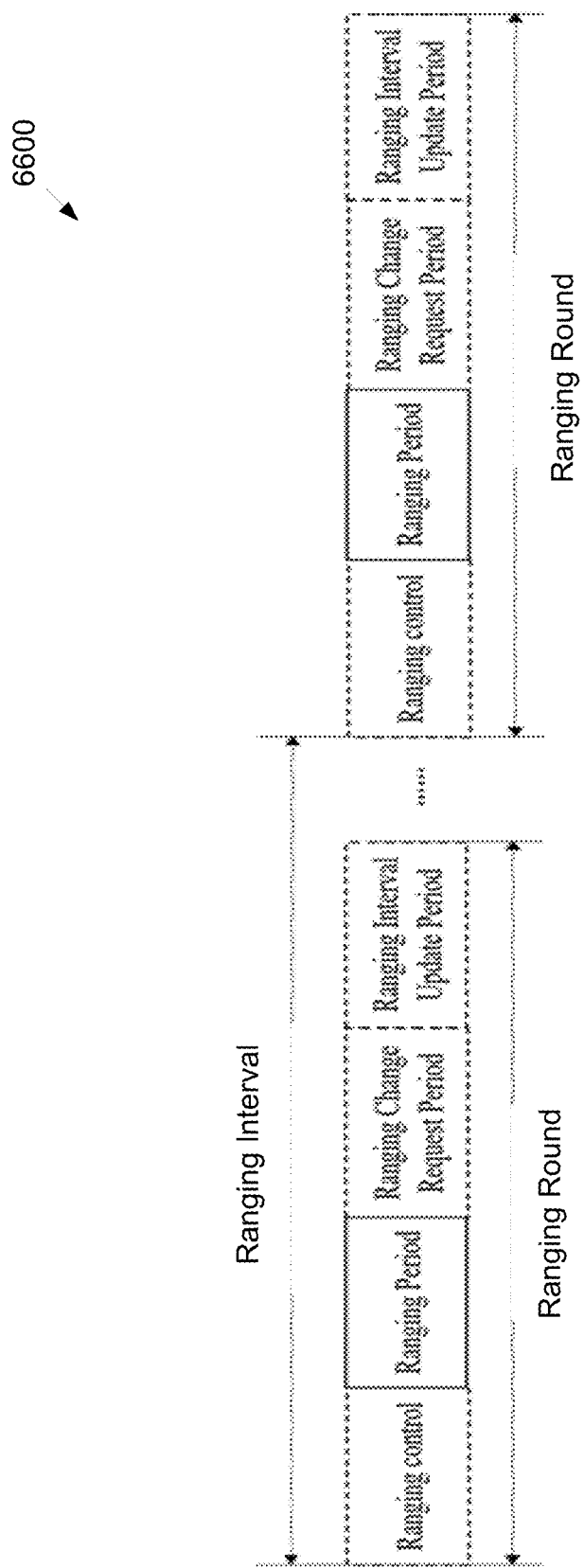
FIG. 66 illustrates an example scheduled ranging rounds with ranging change request period and ranging interval update period according to embodiments of the present disclosure.

FIG. 66 illustrates an example scheduled ranging rounds with ranging change request period and ranging interval update period 6600 according to embodiments of the present disclosure. The embodiment of the scheduled ranging rounds with ranging change request period and ranging interval update period 6600 illustrated in FIG. 66 is for illustration only and may be used in the electronic device as illustrated in FIG. 5. FIG. 66 does not limit the scope of the present disclosure to any particular implementation.

In one embodiment, a controller and controlee that may be one of nodes in a group 1 and/or group 2 as illustrated in FIG. 6 may use the scheduled ranging rounds with ranging change request period and ranging interval update period 6600. In one embodiment, an initiator and responder may use the scheduled ranging rounds with ranging change request period and ranging interval update period 6600.

All or partial of controlees can be scheduled in the ranging change request period to send the RCR IEs, respectively. The scheduling assignment can be configured by the controller and broadcast to controlees in the ranging control period. After the ranging change request period (RCRP), the controller is able to collect requests from controlees to update the setting of ranging configuration or ranging interval. Since general data frames can be used to convey the RCR IE in the RCRP, other payload or payload IE can also be conveyed by this period, e.g., timestamp or angle IEs for the ranging in the deferred mode, which is not precluded by the present disclosure.

The UWB MAC may not support the RCRP. However, depending on use cases, the RCR IE may be transmitted via the RFRAME(s).

Figure 67:
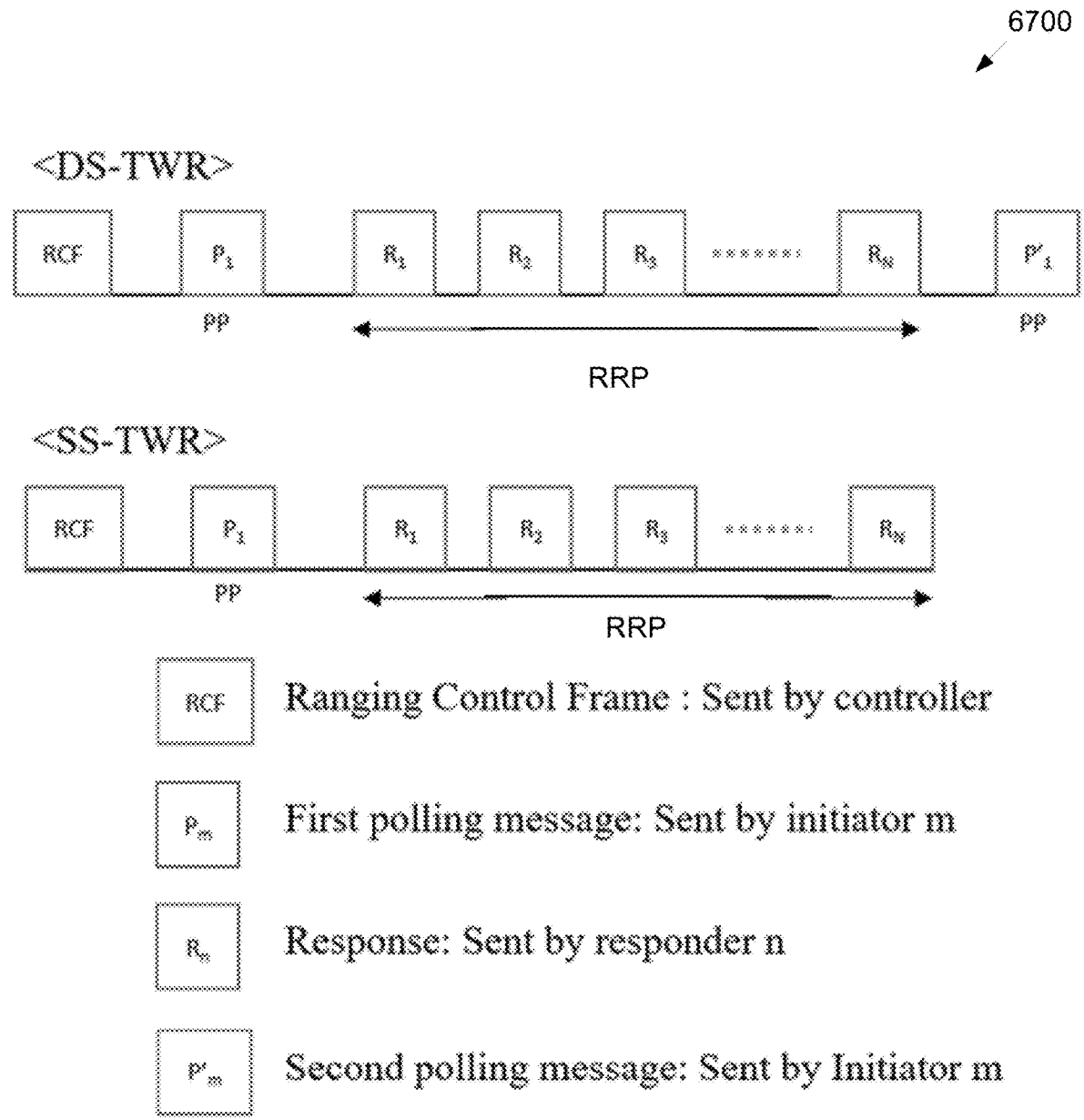
FIG. 67 illustrates an example multicast/broadcast DS-TWR and SS-TWR according to embodiments of the present disclosure.

FIG. 67 illustrates an example multicast/broadcast DS-TWR and SS-TWR 6700 according to embodiments of the present disclosure. The embodiment of the multicast/broadcast DS-TWR and SS-TWR 6700 illustrated in FIG. 67 is for illustration only and may be used in the electronic device as illustrated in FIG. 5. FIG. 67 does not limit the scope of the present disclosure to any particular implementation.

In one embodiment, a controller and controlee that may be one of nodes in a group 1 and/or group 2 as illustrated in FIG. 6 may use the multicast/broadcast DS-TWR and SS-TWR 6700. In one embodiment, an initiator and responder may use the multicast/broadcast DS-TWR and SS-TWR 6700.

For example, FIG. 67 illustrates the procedures of multicast/broadcast DS-TWR and SS-TWR between one initiator and multiple responders. If the initiator is the controller, the controlees (responders) can insert the RCR IE in the ranging response frame to inform their respective requests to the controller. Therefore, inclusion of ranging change request in the RFRAME can be realized. Similarly, for the use case with multiple initiators and one responder, if the responder is the controller, controlees (initiators) can also send their respective requests in the polling messages.

Figures 68, 69:
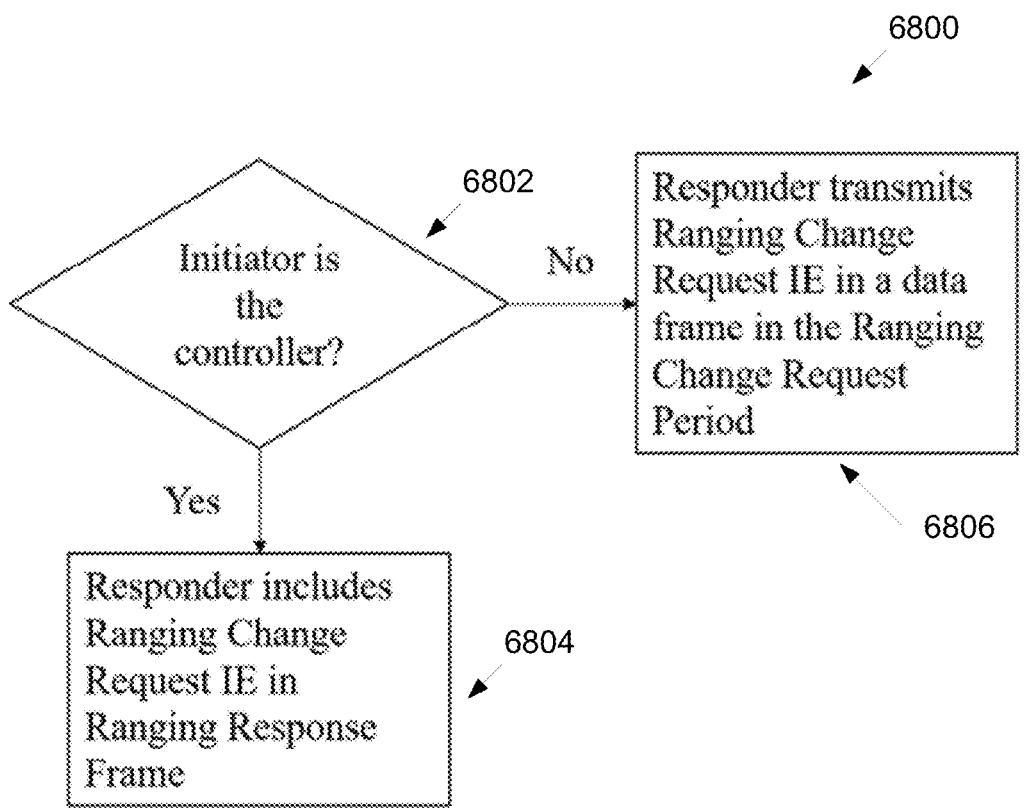
FIG. 68 illustrates a flow chart of a method for determining scheme for a responder according to embodiments of the present disclosure.
FIG. 69 illustrates a flow chart of a method for determining scheme for an initiator according to embodiments of the present disclosure.

FIG. 68 illustrates a flow chart of a method 6800 for determining scheme for a responder according to embodiments of the present disclosure, as may be performed by an electronic device (e.g., 111-116 and/or 101-103 as illustrated in FIGS. 1 and 500 as illustrated in FIG. 5). The embodiment of the method 6800 illustrated in FIG. 68 is for illustration only and may be used in the electronic device as illustrated in FIG. 5. FIG. 68 does not limit the scope of the present disclosure to any particular implementation.

In one embodiment, a controller and controlee that may be one of nodes in a group 1 and/or group 2 as illustrated in FIG. 6 may perform the method 6800. In one embodiment, an initiator and responder may perform the method 6800.

As illustrated in FIG. 68, the method 6800 begins at step 6802. In step 6802, an electronic device determines whether an initiator is the controller. In step 6802, if the initiator is not the controller, a responder transmits ranging change request IE in a data frame in the ranging change request period. In step 6802, if the initiator is the controller, the method 6800 performs the step 6804. In step 6804, a responder includes a ranging change request IE in a ranging response frame.

In one embodiment, for a responder who is not the controller, a ranging change request IE is included in the ranging response frame, if the corresponding initiator is the controller; and the corresponding initiator transmits the ranging change request IE in a data frame in a ranging change request period otherwise. This is illustrated in FIG. 68. Similarly, for an initiator who is not the controller, a ranging change request IE is included in a polling message, if the corresponding responder is the controller; and the corresponding responder transmits ranging change request IE in a data frame in a ranging change request period otherwise it. This is illustrated in FIG. 69.

FIG. 69 illustrates a flow chart of a method 6900 for determining scheme for an initiator according to embodiments of the present disclosure, as may be performed by an electronic device (e.g., 111-116 and/or 101-103 as illustrated in FIGS. 1 and 500 as illustrated in FIG. 5). The embodiment of the method 6900 illustrated in FIG. 69 is for illustration only and may be used in the electronic device as illustrated in FIG. 5. FIG. 69 does not limit the scope of the present disclosure to any particular implementation.

In one embodiment, a controller and controlee that may be one of nodes in a group 1 and/or group 2 as illustrated in FIG. 6 may perform the method 6900. In one embodiment, an initiator and responder may perform the method 6900.

As illustrated in FIG. 69, the method 6900 begins at step 6902. In step 6902, an electronic device determines whether a responder is the controller. In step 6902, if the responder is not the controller, the initiator transmits ranging change request IE in a data frame in the ranging change request period. In step 6902, if the responder is the controller, the method 6800 performs the step 6804. In step 6804, the initiator includes a ranging change request IE in a polling message.

A mix of above two schemes can be implemented. The ranging round structure is illustrated in FIG. 66. However, the time slots of ranging change request period may not be enough to let all controlees send the respective requests. After the ranging control period, some ranging controlees know that the controlees are not scheduled for the RCRP. Some controlees can still respectively insert RCR IEs in the RFRAME(s) if the RFRAME(s) can be received and decoded by the controller as the use cases described above.

FIG. 70 illustrates a flowchart of a method 7000 for secure ranging operation according to embodiments of the present disclosure, as may be performed by an electronic device (e.g., 111-116 and/or 101-103 as illustrated in FIGS. 1 and 500 as illustrated in FIG. 5). The embodiment of the method 7000 illustrated in FIG. 70 is for illustration only. FIG. 70 does not limit the scope of the present disclosure to any particular implementation.

In one embodiment, a controller and controlee that may be one of nodes in a group 1 and/or group 2 as illustrated in FIG. 6 may perform the method 7000. In one embodiment, an initiator and responder may perform the method 7000.

In one embodiment, the method is performed by a transmit apparatus.

As illustrated in FIG. 70, the method 7000 begins at step 7002. In step 7002, a transmit apparatus identifies whether a medium access control (MAC) common part sublayer (CPS) data request (MCPS-DATA.request) primitive received from a higher layer of the transmit apparatus includes a ranging configuration information element (IE) or a ranging IE.

Subsequently, in step 7004, the transmit apparatus transmits, to a receive apparatus, a ranging control message (RCM) in response to the MCPS-DATA.request primitive including the ranging configuration IE.

Subsequently, in step 7006, the transmit apparatus transmits, to the receive apparatus, a ranging initiation message (RIM) in response to the MCPS-DATA.request primitive including the ranging IE.

Next, in step 7008, the transmit apparatus receives, from the receive apparatus, MAC data including a ranging message non-receipt information element (RIVINR IE) that indicates a reception failure of the RIM.

In one embodiment, in step 7008, the RMNR IE included in the MAC data does not include a content field to indicate the reception failure of the RIM.

In one embodiment, in step 7008, the RMNR IE included in the MAC data includes a frame control field, a control procedure number field including a poll signal field and a reserved field, a frame check sequence (FCS) field, a MAC header field, and a MAC footer field to indicate the reception failure of the RIM.

In one embodiment, in step 7008, the RMNR IE included in the MAC data includes a frame control field, a control procedure number field including a poll signal field and a reserved field, an acknowledgement/negative-acknowledgement (ACK/NACK) field, a frame check sequence (FCS) field, a MAC header field, and a MAC footer field, and wherein the ACK/NACK field is used to indicate the reception failure of the RIM.

In one embodiment, in step 7010, the RMNR IE included in the MAC data includes a control procedure number field including a poll signal field and a reserved field and an acknowledgement/negative-acknowledgement (ACK/NACK) field, wherein the ACK/NACK field is used to indicate the reception failure of the RIM.

Finally, in step 7010, the transmit apparatus identifies the RMNR IE via an MCPS-DATA.indication primitive.

In one embodiment, the transmit apparatus receives the MAC data on a time slot that is assigned to a ranging response message (RRM) to be received from the receive apparatus.

In one embodiment, the transmit apparatus identifies that the receive apparatus is not in an idle state and identifies that the RCM is successfully received by the receive apparatus.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope

What is claimed is:

1. A transmit apparatus in a wireless communication system supporting ranging capability, the transmit apparatus comprising:
   a processor configured to identify whether a medium access control (MAC) common part sublayer (CPS) data request (MCPS-DATA.request) primitive received from a higher layer of the transmit apparatus includes a ranging configuration information element (IE) or a ranging IE;
   a transceiver operably connected to the processor, the transceiver configured to:
   transmit, to a receive apparatus, a ranging control message (RCM) in response to the MCPS-DATA.request primitive including the ranging configuration IE;
   transmit, to the receive apparatus, a ranging initiation message (RIM) in response to the MCPS-DATA.request primitive including the ranging IE; and
   receive, from the receive apparatus, MAC data including a ranging message non-receipt information element (RMNR IE) that indicates a reception failure of the RIM,
   wherein the processor is configured to identify the RMNR IE via an MCPS-DATA.indication primitive.

2. The transmit apparatus of claim 1, wherein the transceiver is further configured to receive the MAC data on a time slot that is assigned to a ranging response message (RRM) to be received from the receive apparatus.

3. The transmit apparatus of claim 1, wherein the processor is further configured to:
   identify that the receive apparatus is not in an idle state; and
   identify that the RCM is successfully received by the receive apparatus.

4. The transmit apparatus of claim 1, wherein the RIVINR IE included in the MAC data does not include a content field to indicate the reception failure of the RIM.

5. The transmit apparatus of claim 1, wherein the RIVINR IE included in the MAC data includes a frame control field, a control procedure number field including a poll signal field and a reserved field, a frame check sequence (FCS) field, a MAC header field, and a MAC footer field to indicate the reception failure of the RIM.

6. The transmit apparatus of claim 1, wherein the RIVINR IE included in the MAC data includes a frame control field, a control procedure number field including a poll signal field and a reserved field, an acknowledgement/negative-acknowledgement (ACK/NACK) field, a frame check sequence (FCS) field, a MAC header field, and a MAC footer field, and wherein the ACK/NACK field is used to indicate the reception failure of the RIM.

7. The transmit apparatus of claim 1, wherein the RIVINR IE included in the MAC data includes a control procedure number field including a poll signal field and a reserved field and an acknowledgement/negative-acknowledgement (ACK/NACK) field, wherein the ACK/NACK field is used to indicate the reception failure of the RIM.

8. A receive apparatus in a wireless communication system supporting ranging capability, the receive apparatus comprising:
a transceiver, and a processor operably connected to the transceiver,
the transceiver configured to:
receive, from a transmit apparatus, a ranging control message (RCM), wherein the RCM is transmitted, by the transmit apparatus, in response to a medium access control (MAC) common part sublayer (CPS) data request (MCPS-DATA.request) primitive including a ranging configuration information element (IE);
receive, from the transmit apparatus, a ranging initiation message (RIM), wherein the RIM is transmitted, by the transmit apparatus, in response to the MCPS-DATA.request primitive including the ranging IE; and
transmit, to the transmit apparatus, MAC data including a ranging message non-receipt information element (RIVINR IE) that indicates a reception failure of the RIM,
wherein the processor is configured to identify the RCM or the RIM via an MCPS-DATA.indication primitive.

9. The receive apparatus of claim 8, wherein the transceiver is further configured to transmit the MAC data on a time slot that is assigned to a ranging response message (RRM) to be received from the receive apparatus.

10. The receive apparatus of claim 8, wherein the RMNR IE included in the MAC data does not include a content field to indicate the reception failure of the RIM.

11. The receive apparatus of claim 8, wherein the RMNR IE included in the MAC data includes a frame control field, a control procedure number field including a poll signal field and a reserved field, a frame check sequence (FCS) field, a MAC header field, and a MAC footer field to indicate the reception failure of the RIM.

12. The receive apparatus of claim 8, wherein the RMNR IE included in the MAC data includes a frame control field, a control procedure number field including a poll signal field and a reserved field, an acknowledgement/negative-acknowledgement (ACK/NACK) field, a frame check sequence (FCS) field, a MAC header field, and a MAC footer field, and wherein the ACK/NACK field is used to indicate the reception failure of the RIM.

13. The receive apparatus of claim 8, wherein the RMNR IE included in the MAC data includes a control procedure number field including a poll signal field and a reserved field and an acknowledgement/negative-acknowledgement (ACK/NACK) field, wherein the ACK/NACK field is used to indicate the reception failure of the RIM.

14. A method of a transmit apparatus in a wireless communication system supporting ranging capability, the method comprising:
identifying whether a medium access control (MAC) common part sublayer (CPS) data request (MCPS-DATA.request) primitive received from a higher layer of the transmit apparatus includes a ranging configuration information element (IE) or a ranging IE;
transmitting, to a receive apparatus, a ranging control message (RCM) in response to the MCPS-DATA.request primitive including the ranging configuration IE;
transmitting, to the receive apparatus, a ranging initiation message (RIM) in response to the MCPS-DATA.request primitive including the ranging IE;
receiving, from the receive apparatus, MAC data including a ranging message non-receipt information element (RMNR IE) that indicates a reception failure of the RIM; and
identifying the RMNR IE via an MCPS-DATA.indication primitive.

15. The method of claim 14, further comprising receiving the MAC data on a time slot that is assigned to a ranging response message (RRM) to be received from the receive apparatus.

16. The method of claim 14, further comprising:
identifying that the receive apparatus is not in an idle state; and
identifying that the RCM is successfully received by the receive apparatus.

17. The method of claim 14, wherein the RMNR IE included in the MAC data does not include a content field to indicate the reception failure of the RIM.

18. The method of claim 14, wherein the RMNR IE included in the MAC data includes a frame control field, a control procedure number field including a poll signal field and a reserved field, a frame check sequence (FCS) field, a MAC header field, and a MAC footer field to indicate the reception failure of the RIM.

19. The method of claim 14, wherein the RMNR IE included in the MAC data includes a frame control field, a control procedure number field including a poll signal field and a reserved field, an acknowledgement/negative-acknowledgement (ACK/NACK) field, a frame check sequence (FCS) field, a MAC header field, and a MAC footer field, and wherein the ACK/NACK field is used to indicate the reception failure of the RIM.

20. The method of claim 14, wherein the RMNR IE included in the MAC data includes a control procedure number field including a poll signal field and a reserved field and an acknowledgement/negative-acknowledgement (ACK/NACK) field, wherein the ACK/NACK field is used to indicate the reception failure of the RIM.

* * * * *